United States Patent
Kumar et al.

(10) Patent No.: US 11,852,740 B2
(45) Date of Patent: Dec. 26, 2023

(54) SYSTEMS AND METHODS FOR POSITIONING ENHANCEMENTS USING BEAM RELATION CROWDSOURCING

(71) Applicant: QUALCOMM Incorporated, San Diego, CA (US)

(72) Inventors: Akash Kumar, Hyderabad (IN); Amit Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 17/098,189

(22) Filed: Nov. 13, 2020

(65) Prior Publication Data
US 2022/0155404 A1    May 19, 2022

(51) Int. Cl.
*H04W 24/00*    (2009.01)
*G01S 5/02*    (2010.01)
(Continued)

(52) U.S. Cl.
CPC .......... *G01S 5/0236* (2013.01); *G01S 5/0242* (2013.01); *G01S 5/02213* (2020.05);
(Continued)

(58) Field of Classification Search
CPC .. G01S 5/0236; G01S 5/02213; G01S 5/0242; G01S 5/0252; G01S 5/0284; G01S 5/0263; G01S 5/02; G01S 5/0294; H04B 17/327; H04B 7/043; H04B 7/086; H04B 17/318; H04B 17/27; H04B 1/385; H04B 10/1129; H04W 4/029; H04W 4/02;
(Continued)

(56) References Cited

U.S. PATENT DOCUMENTS 5,732,387 A  *  3/1998  Armbruster ..........  H04B 7/1855
                                                 455/13.2
10,517,061 B1 * 12/2019 Kumar ................... H04B 7/088
(Continued)

FOREIGN PATENT DOCUMENTS

WO    WO-2019199935 A1    10/2019
WO    WO-2020091970 A1    5/2020

OTHER PUBLICATIONS

International Search Report and Written Opinion—PCT/US2021/053797—ISA/EPO—dated Mar. 11, 2022.

*Primary Examiner* — Stephen M D Agosta
(74) *Attorney, Agent, or Firm* — Thien T. Nguyen

(57) ABSTRACT

In a wireless network in which beams are transmitted by base stations, a beam relation database may be produced by crowdsourcing known positions of UEs and associated information related to beams received by the UEs at these positions. The beam information, for example, may include a beam identifier and cell identifier, and may further include measured signal parameters, such as Reference Signal Received Power (RSRP) or Reference Signal Received Quality (RSRQ). The beam relation database may be used by a network or the UE to determine a position of a UE based on beams that are detected by the UE. The position fix may be an initial position fix that may be used to generate assistance data for the UE. Additionally, the beam relation database may be used to identify relevant measurement objects in the assistance data based on beams that are detected by the UE.

30 Claims, 15 Drawing Sheets

(51) Int. Cl.
*H04B 17/327* (2015.01)
*H04B 7/0426* (2017.01)
*H04B 7/08* (2006.01)

(52) U.S. Cl.
CPC ............ *H04B 7/043* (2013.01); *H04B 7/086* (2013.01); *H04B 17/327* (2015.01)

(58) Field of Classification Search
CPC ....... H04W 4/023; H04W 4/21; H04W 64/00; G06Q 50/01; G06Q 10/10; G06Q 30/02; G06Q 30/06; H04M 1/72412; H04M 1/72415; H04M 2250/64; H04M 2250/10; G01C 21/206; G01C 21/3691; G01C 21/32; G01C 21/3602; G01C 21/3815; G01C 21/20; H04H 60/58; H04H 60/27; H04H 60/33; H04H 60/372; H04H 60/61

See application file for complete search history.

(56) References Cited

U.S. PATENT DOCUMENTS

| | | | | |
|---|---|---|---|---|
| 2002/0193121 A1* | 12/2002 | Nowak | ................ | H04W 76/50 455/456.1 |
| 2003/0179134 A1* | 9/2003 | Lampert | ............... | G01S 5/0264 342/357.31 |
| 2004/0002363 A1* | 1/2004 | Cuffaro | ................ | H04W 16/28 455/562.1 |
| 2006/0030270 A1* | 2/2006 | Cheng | ................... | H04B 17/23 455/67.11 |
| 2010/0227612 A1* | 9/2010 | Wang | ....................... | G01S 5/14 455/434 |
| 2010/0248637 A1* | 9/2010 | Sahinoglu | ............ | G01S 5/0289 455/67.11 |
| 2012/0046096 A1* | 2/2012 | Morrison | ........... | G07F 17/3237 463/25 |
| 2012/0172033 A1* | 7/2012 | Hilton | .................... | H04W 4/02 455/423 |
| 2012/0278721 A1* | 11/2012 | Beidel | ................... | G06Q 50/00 715/733 |
| 2013/0064239 A1* | 3/2013 | Yu | ....................... | H04W 72/046 370/350 |
| 2013/0235742 A1* | 9/2013 | Josiam | ................. | H04L 5/0057 370/252 |
| 2013/0288704 A1* | 10/2013 | Wirola | .................. | H04W 64/00 455/456.1 |
| 2013/0307723 A1* | 11/2013 | Garin | ....................... | G01S 5/14 342/357.29 |
| 2013/0325856 A1* | 12/2013 | Soto Matamala | .... | H04L 43/106 707/724 |
| 2013/0331119 A1* | 12/2013 | Vaccari | ................. | H04W 4/029 455/456.1 |
| 2014/0018096 A1* | 1/2014 | Jagannath | ............... | H04W 4/33 455/456.1 |
| 2014/0031055 A1* | 1/2014 | Do | ....................... | H04W 16/18 455/456.1 |
| 2014/0062784 A1* | 3/2014 | Rison | ................... | H04B 7/1555 342/368 |
| 2014/0067938 A1* | 3/2014 | Boldyrev | .............. | G01S 5/0252 709/204 |
| 2014/0122612 A1* | 5/2014 | Wu | ........................ | H04L 51/32 709/205 |
| 2014/0162704 A1 | 6/2014 | Choi et al. | | |
| 2014/0171097 A1* | 6/2014 | Fischer | ................ | G01S 5/0242 455/456.1 |
| 2014/0218236 A1* | 8/2014 | Sadeghi | .................... | H04B 7/00 342/367 |
| 2014/0221022 A1* | 8/2014 | Vaccari | ................. | H04W 4/022 455/456.6 |
| 2014/0222954 A1* | 8/2014 | Vaccari | ................. | G06F 16/951 709/217 |
| 2014/0236851 A1* | 8/2014 | Barrington | .......... | G06F 16/5866 705/321 |
| 2014/0316841 A1* | 10/2014 | Kilby | ................. | G06Q 10/0833 705/7.26 |
| 2014/0379261 A1* | 12/2014 | Karumuri | .............. | G01C 21/00 701/540 |
| 2015/0063323 A1* | 3/2015 | Sadek | ................. | H04W 56/001 370/336 |
| 2016/0029224 A1* | 1/2016 | Edge | ..................... | H04W 4/025 455/456.1 |
| 2016/0044504 A1* | 2/2016 | Edge | ..................... | H04W 4/029 455/456.3 |
| 2016/0048842 A1* | 2/2016 | Trivedi | ................ | G06Q 30/016 705/304 |
| 2016/0088490 A1* | 3/2016 | Servais | ................. | H04W 24/02 455/446 |
| 2016/0238690 A1* | 8/2016 | Colucci | ............... | G01S 5/02521 |
| 2016/0337916 A1* | 11/2016 | Deenoo | .......... | H04W 36/0088 |
| 2016/0360452 A1* | 12/2016 | Koorapaty | .......... | H04J 13/0074 |
| 2017/0070937 A1* | 3/2017 | Li | ........................ | H04B 7/0695 |
| 2017/0192102 A1* | 7/2017 | Wietfeldt | ................. | G01S 5/10 |
| 2017/0251372 A1* | 8/2017 | Belghoul | ............. | H04W 24/08 |
| 2017/0332359 A1* | 11/2017 | Tsai | ...................... | H04L 5/0053 |
| 2018/0027519 A1* | 1/2018 | Lee | ........................ | H04W 16/28 455/456.1 |
| 2018/0035258 A1* | 2/2018 | Pon | ..................... | H04W 40/005 |
| 2018/0138962 A1* | 5/2018 | Islam | .................. | H04L 5/0032 |
| 2018/0310237 A1* | 10/2018 | Kumar | ..................... | G01S 5/10 |
| 2018/0352379 A1* | 12/2018 | Kong | ................... | H04W 4/025 |
| 2018/0367947 A1* | 12/2018 | Kim | ........................ | H04W 4/02 |
| 2019/0090246 A1* | 3/2019 | Jagannath | ............. | H04W 24/02 |
| 2019/0128996 A1* | 5/2019 | Patil | ..................... | H04B 17/364 |
| 2019/0132703 A1* | 5/2019 | Ramasamy | ........... | H04W 4/029 |
| 2019/0182798 A1* | 6/2019 | Beale | .................... | H04B 7/0695 |
| 2019/0335517 A1* | 10/2019 | Reial | .................... | H04B 17/382 |
| 2019/0380056 A1* | 12/2019 | Lee | .................... | H04B 7/0695 |
| 2020/0008216 A1* | 1/2020 | Iyer | ........................ | H04W 72/04 |
| 2020/0045665 A1* | 2/2020 | Kuang | .................. | H04W 4/33 |
| 2020/0092838 A1* | 3/2020 | Koo | ..................... | H04W 64/003 |
| 2020/0175864 A1* | 6/2020 | Solmaz | ................ | H04W 64/006 |
| 2021/0267000 A1* | 8/2021 | Jain | ........................ | H04W 48/18 |
| 2021/0329416 A1* | 10/2021 | Li | ..................... | H04B 17/318 |
| 2021/0329417 A1* | 10/2021 | Priyanto | ................ | G01S 5/0009 |
| 2022/0007275 A1* | 1/2022 | Li | ..................... | H04W 72/1231 |
| 2022/0014877 A1* | 1/2022 | Stare | .................. | G01S 5/02524 |
| 2022/0022052 A1* | 1/2022 | Jarski | ................... | H04W 16/18 |

* cited by examiner

1300 ↘

```
┌─────────────────────────────────────────────────────────┐
│ Receive from a UE a position of the UE a cell identifier (ID) and │ ⟋─1302
│ a beam ID associated with the position of the UE for each of a    │
│          plurality of radio beams received by the UE              │
└─────────────────────────────────────────────────────────┘
                              │
                              ▼
┌─────────────────────────────────────────────────────────┐
│ Storing the position and the cell ID and the beam ID associated  │
│  with the position of the UE for each of the plurality of radio  │ ⟋─1304
│    beams received by the UE in a crowdsourced beam relation      │
│                           database                                │
└─────────────────────────────────────────────────────────┘
```

FIG. 13

SYSTEMS AND METHODS FOR POSITIONING ENHANCEMENTS USING BEAM RELATION CROWDSOURCING

BACKGROUND

Background

The present disclosure relates generally to positioning, and more specifically to techniques for supporting positioning services for user equipments (UEs) served by a wireless network that employs beamforming.

Relevant Background

It is often desirable to know the location of a user equipment (UE) such as a cellular phone. For example, a location services (LCS) client may desire to know the location of a terminal in the case of an emergency services call or to provide some service to the user of the terminal such as navigation assistance or direction finding. The terms "location" and "position" are synonymous and are used interchangeably herein.

The location of a mobile device may be estimated based on information gathered from various systems. For example, a UE may determine its position using a constellation of satellites, such as the Global Positioning System (GPS). In a cellular network implemented according to 4G (also referred to as Fourth Generation) Long Term Evolution (LTE) radio access or 5G (also referred to as Fifth Generation) "New Radio" (NR), for example, a base station may transmit a reference signals, such as positioning reference signal (PRS), that may be received and measured by the mobile device. For example, a UE may generate positioning measurements from the downlink (DL) reference signals such as Reference Signal Time Difference (RSTD), Reference Signal Received Power (RSRP), and reception and transmission (Rx-Tx) time difference measurements, which may be used in downlink positioning methods, such as DL-Time Difference of Arrival (TDOA), DL-Angle of Departure (AoD). Similarly, a mobile device may transmit reference signals, for example, sounding reference signals (SRS), that are received and measured by base stations. A base station may generate positioning measurements from the uplink (UL) SRS such as RSTD and Rx-Tx, which may be used in uplink positioning methods, such as UL-TDOA, UL-AoA. Additionally, combined measurements using PRS and SRS, such as Rx-Tx, may be used for combined DL and UL based positioning included, e.g., round-trip time (RTT), which may be with one or more neighboring base stations (multi-RTT). Improvements and enhancements to positioning that benefit the UE as well as network entities, such as the location server, are possible.

SUMMARY

In a wireless network in which beams are transmitted by base stations, a beam relation database may be produced by crowdsourcing known positions of UEs and associated information related to beams received by the UEs at these positions. The beam information, for example, may include a beam identifier and cell identifier, and may further include measured signal parameters, such as Reference Signal Received Power (RSRP) or Reference Signal Received Quality (RSRQ). The beam relation database may be used by a network or the UE to determine a position of a UE based on beams that are detected by the UE. The position fix may be an initial position fix that may be used to generate assistance data for the UE. Additionally, the beam relation database may be used to identify relevant measurement objects in the assistance data based on beams that are detected by the UE.

In one implementation, a method for supporting location services performed by a user equipment (UE) includes receiving a plurality of radio beams transmitted by a plurality of base stations; determining a cell identifier (ID) and a beam ID for each of the plurality of radio beams; determining a position of the UE; and providing the position of the UE and the cell ID and the beam ID associated with the position of the UE for each of the plurality of radio beams to a crowdsourced beam relation database.

In one implementation, a user equipment (UE) configured for supporting location services includes at least one wireless transceiver configured to wirelessly communicate with entities in a wireless network; at least one memory; and at least one processor coupled to the at least one wireless transceiver and the at least one memory and configured to: receive a plurality of radio beams transmitted by a plurality of base stations; determine a cell identifier (ID) and a beam ID for each of the plurality of radio beams; determine a position of the UE; and provide the position of the UE and the cell ID and the beam ID associated with the position of the UE for each of the plurality of radio beams to a crowdsourced beam relation database.

In one implementation, a user equipment (UE) configured for supporting location services includes means for receiving a plurality of radio beams transmitted by a plurality of base stations; means for determining a cell identifier (ID) and a beam ID for each of the plurality of radio beams; means for determining a position of the UE; and means for providing the position of the UE and the cell ID and the beam ID associated with the position of the UE for each of the plurality of radio beams to a crowdsourced beam relation database.

In one implementation, a non-transitory storage medium including program code stored thereon, the program code is operable to configure at least one processor in a user equipment (UE) for supporting location services includes program code to receive a plurality of radio beams transmitted by a plurality of base stations; program code to determine a cell identifier (ID) and a beam ID for each of the plurality of radio beams; program code to determine a position of the UE; and program code to provide the position of the UE and the cell ID and the beam ID associated with the position of the UE for each of the plurality of radio beams to a crowdsourced beam relation database.

In one implementation, a method for supporting location services for user equipment (UE) performed by a server in a wireless network, includes receiving from a UE a position of the UE and a cell identifier (ID) and a beam ID associated with the position of the UE for each of a plurality of radio beams received by the UE; and storing the position and the cell ID and the beam ID associated with the position of the UE for each of the plurality of radio beams received by the UE in a crowdsourced beam relation database.

In one implementation, a server configured for supporting location services for user equipment (UE) in a wireless network, includes an external interface configured to communicate with a plurality of UEs in the wireless network; at least one memory; and at least one processor coupled to the external interface and the at least one memory and configured to: receive from a UE a position of the UE and a cell identifier (ID) and a beam ID associated with the position of the UE for each of a plurality of radio beams received by the each UE; and store the position and the cell ID and the beam ID associated with the position of the UE for each of the plurality of radio beams received by the UE in a crowdsourced beam relation database.

In one implementation, a server configured for supporting location services for user equipment (UE) in a wireless network, includes means for receiving from a UE a position of the UE and a cell identifier (ID) and a beam ID associated with the position of the UE for each of a plurality of radio beams received by the each UE; and means for storing the position and the cell ID and the beam ID associated with the position of the UE for each of the plurality of radio beams received by the UE in a crowdsourced beam relation database.

In one implementation, a non-transitory storage medium including program code stored thereon, the program code is operable to configure at least one processor in a server for supporting location services for user equipment (UE) in a wireless network, includes program code to receive from a UE a position of the UE and a cell identifier (ID) and a beam ID associated with the position of the UE for each of a plurality of radio beams received by the UE; and program code to store the position and the cell ID and the beam ID associated with the position of the UE for each of the plurality of radio beams received by the UE in a crowdsourced beam relation database.

In one implementation, a method for supporting location services for a user equipment (UE) includes receiving a plurality of radio beams transmitted by a plurality of base stations; determining a cell identifier (ID) and a beam ID for each of the plurality of radio beams; and determining a position of the UE based on the cell ID and the beam ID for each of the plurality of radio beams using a crowdsourced beam relation database that comprises a plurality of positions associated with cell IDs and beam IDs for radio beams.

In one implementation, a user equipment (UE) configured for supporting location services includes at least one wireless transceiver configured to wirelessly communicate with entities in a wireless network; at least one memory; and at least one processor coupled to the at least one wireless transceiver and the at least one memory and configured to: receive a plurality of radio beams transmitted by a plurality of base stations; determine a cell identifier (ID) and a beam ID for each of the plurality of radio beams; and determine a position of the UE based on the cell ID and the beam ID for each of the plurality of radio beams using a crowdsourced beam relation database that comprises a plurality of positions associated with cell IDs and beam IDs for radio beams.

In one implementation, user equipment (UE) configured for supporting location services includes means for receiving a plurality of radio beams transmitted by a plurality of base stations; means for determining a cell identifier (ID) and a beam ID for each of the plurality of radio beams; and means for determining a position of the UE based on the cell ID and the beam ID for each of the plurality of radio beams using a crowdsourced beam relation database that comprises a plurality of positions associated with cell IDs and beam IDs for radio beams.

In one implementation, a non-transitory storage medium including program code stored thereon, the program code is operable to configure at least one processor in a user equipment (UE) for supporting location services includes program code to receiving a plurality of radio beams transmitted by a plurality of base stations; program code to determine a cell identifier (ID) and a beam ID for each of the plurality of radio beams; and program code to determine a position of the UE based on the cell ID and the beam ID for each of the plurality of radio beams using a crowdsourced beam relation database that comprises a plurality of positions associated with cell IDs and beam IDs for radio beams.

In one implementation, a method for supporting location services for a user equipment (UE) in a wireless network performed by a location server includes receiving from the UE a position information message comprising a cell identifier (ID) and a beam ID for each of a plurality of radio beams received by the UE; and determining a position of the UE based on the cell ID and the beam ID for each of the plurality of radio beams using a crowdsourced beam relation database that comprises a plurality of positions associated with cell IDs and beam IDs for radio beams.

In one implementation, a location server configured for supporting location services for a user equipment (UE) in a wireless network includes an external interface configured to communicate with a UE in the wireless network; at least one memory; and at least one processor coupled to the external interface and the at least one memory and configured to: receive from the UE a position information message comprising a cell identifier (ID) and a beam ID for each of a plurality of radio beams received by the UE; and determine a position of the UE based on the cell ID and the beam ID for each of the plurality of radio beams using a crowdsourced beam relation database that comprises a plurality of positions associated with cell IDs and beam IDs for radio beams.

In one implementation, a location server configured for supporting location services for a user equipment (UE) in a wireless network includes means for receiving from the UE a position information message comprising a cell identifier (ID) and a beam ID for each of a plurality of radio beams received by the UE; and means for determining a position of the UE based on the cell ID and the beam ID for each of the plurality of radio beams using a crowdsourced beam relation database that comprises a plurality of positions associated with cell IDs and beam IDs for radio beams.

In one implementation, a non-transitory storage medium including program code stored thereon, the program code is operable to configure at least one processor in a location server for supporting location services for a user equipment (UE) in a wireless network includes program code to receive from the UE a position information message comprising a cell identifier (ID) and a beam ID for each of a plurality of radio beams received by the UE; and program code to determine a position of the UE based on the cell ID and the beam ID for each of the plurality of radio beams using a crowdsourced beam relation database that comprises a plurality of positions associated with cell IDs and beam IDs for radio beams.

BRIEF DESCRIPTION OF THE DRAWINGS

An understanding of the nature and advantages of various embodiments may be realized by reference to the following figures.

FIG. 13 shows a flowchart for an exemplary method for supporting location services performed by a server including generation of a crowdsourced beam relation database.

Figure 1:
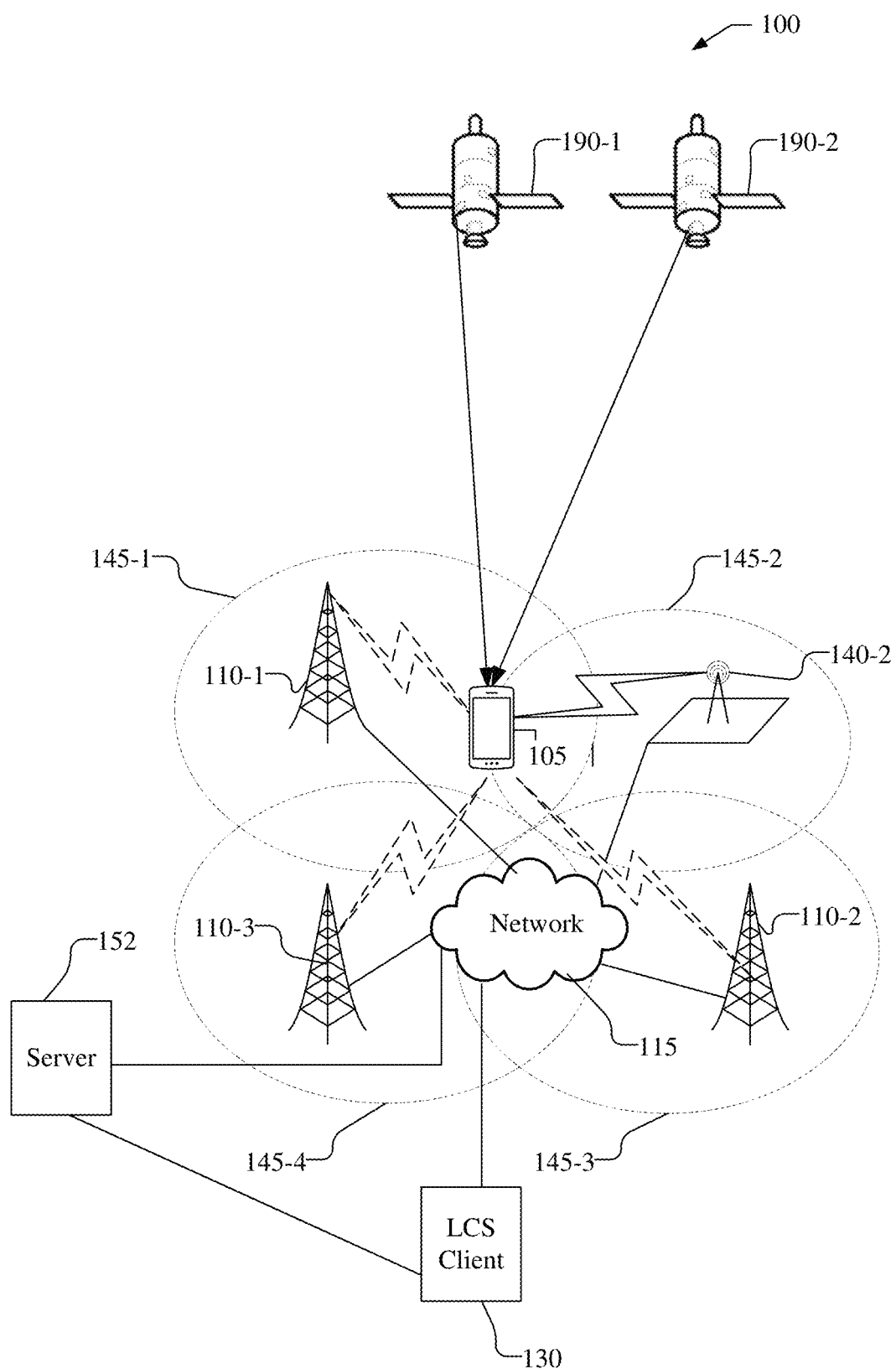
FIG. 1 shows an architecture of a system capable of providing location services to a User Equipment.

Like reference numbers and symbols in the various figures indicate like elements, in accordance with certain example implementations. In addition, multiple instances of an element may be indicated by following a first number for the element with a letter or with a hyphen and a second number. For example, multiple instances of an element 110 may be indicated as either 110-1, 110-2, 110-3 etc. When referring to such an element using only the first number, any instance of the element is to be understood (e.g. elements 110 in the previous example may refer to elements 110-1, 110-2 and 110-3).

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by at least one processor, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, consumer asset tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical Transmission and Reception Points (TRPs) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring.

To support positioning of a UE, two broad classes of location solution have been defined: control plane and user plane. With control plane (CP) location, signaling related to positioning and support of positioning may be carried over existing network (and UE) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE or NR.

Both CP and UP location solutions may employ a location server to support positioning. The location server may be part of or accessible from a serving network or a home network for a UE or may simply be accessible over the Internet or over a local Intranet. If positioning of a UE is needed, a location server may instigate a session (e.g. a location session or a SUPL session) with the UE and coordinate location measurements by the UE and determination of an estimated location of the UE. During a location session, a location server may request positioning capabilities of the UE (or the UE may provide them without a request), may provide assistance data to the UE (e.g. if requested by the UE or in the absence of a request) and may request a location estimate or location measurements from a UE for various positioning techniques, e.g. for the Global Navigation Satellite System (GNSS), Time Difference of Arrival (TDOA), Angle of Departure (AoD), Round Trip Time (RTT) or multi cell RTT (Multi-RTT), and/or Enhanced Cell ID (ECID) position methods. Assistance data may be used by a UE to acquire and measure GNSS and/or reference signals (e.g. by providing expected characteristics of these signals such as frequency, expected time of arrival, signal coding, signal Doppler). Additionally or alternatively, the UE may be provided with SRS configuration information and instructed to transmit SRS for positioning. One or more base stations may receive and process the transmitted SRS based on the configuration information and perform various positioning measurements of the SRS, which may be provided to a network entity, such as the location server or the UE, for position estimation, e.g., using UL-TDOA or RTT or Multi-RTT.

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using, e.g., TDOA, AoD, Multi-RTT, etc.).

In a UE assisted mode of operation, a UE may return location measurements to a location server which may determine an estimated location of the UE based on these measurements and possibly based also on other known or configured data (e.g. satellite ephemeris data for GNSS location or base station characteristics including base station locations and possibly PRS timing in the case of terrestrial positioning using, e.g., TDOA, AoD, Multi-RTT, etc.).

In another standalone mode of operation, a UE may make location related measurements without any positioning assistance data from a location server and may further compute a location or a change in location without any positioning assistance data from a location server. Position methods that may be used in a standalone mode include GPS and GNSS (e.g. if a UE obtains satellite orbital data from data broadcast by GPS and GNSS satellites themselves) as well as sensors.

In the case of 3GPP CP location, a location server may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, a location server may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

During a location session, a location server and UE may exchange messages defined according to some positioning protocol in order to coordinate the determination of an estimated location. Possible positioning protocols may include, for example, the LTE Positioning Protocol (LPP) defined by 3GPP in 3GPP TS 36.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE or NR access, in which case LPP or LPP/LPPe messages are exchanged between a UE and E-SMLC or between a UE and LMF. LPP or LPPe messages may be exchanged between a UE and E-SMLC via a serving Mobility Management Entity (MME) and a serving eNodeB for the UE. LPP or LPPe messages may also be exchanged between a UE and LMF via a serving Access and Mobility Management Function (AMF) and a serving NR Node B (gNB) for the UE. LPP and LPP/LPPe may also be used to help support the OMA SUPL solution for many types of wireless access that support IP messaging (such as LTE, NR and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message.

A location server and a base station (e.g. an eNodeB for LTE access) may exchange messages to enable the location server to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol may be used to transfer such messages between a base station that is an eNodeB and a location server that is an E-SMLC. In the case of NR access, the NRPPA protocol may be used to transfer such messages between a base station that is a gNodeB and a location server that is an LMF. It is noted that the terms "parameter" and "information element" (IE) are synonymous and are used interchangeably herein.

During positioning of a UE, e.g., UE assisted positioning or UE based positioning, several different positioning methods may be used. For example, downlink (DL) reference signal (RS) based positioning may be used. In DL RS based positioning, the UE may receive DL RSs, such as PRS, from one or more base stations and may generate positioning measurements such as Reference Signal Time Difference (RSTD), Reference Signal Received Power (RSRP), and reception and transmission (Rx-Tx) time difference measurements, that may be used in DL positioning methods, such as DL-Time Difference of Arrival (TDOA), DL-Angle of Departure (AoD).

Another example of a positioning method that may be used is uplink (UL) RS based positioning. In UL RS based positioning, the UE may transmit RSs, such as SRS, that are received and measured by base stations. By way of example, the base stations may generate positioning measurements from UL RSs, such as RSTD and Rx-Tx, which may be used in UL positioning methods, such as UL-TDOA, UL-Angle of Arrival (AoA).

Another example of a positioning method that may be used is combined DL and UL RS based positioning. In a combined DL and UL RS based positioning, the UE may receive and measure DL RSs, such as PRS, from one or more base stations and may transmit UL RSs, such as SRS, that are received and measured by base stations. For example, the UE and base stations may generate Rx-Tx measurements from the received DL and UL RSs, respectively, which may be used to generate a single round-trip time (RTT) measurement for one base station or RTT measurements for multiple base stations (multi-cell RTT).

Different positioning methods, e.g., DL, UL, or DL+UL reference signal based positioning methods may affect the UE in different ways. There are many UE specific considerations under which it may be preferable to use one positioning method over another. In current systems, however, if the location server and network support multiple different types of positioning methods, the decision to use on positioning method over another does not consider UE based preferences. For example, current positioning protocols do not provide a manner with which the UE can indicate a preference for one positioning method over others based on the UE's specific considerations.

Positioning in 5G NR it extends the traditional legacy positioning methods from LTE. There are specifics of 5G NR that may further enhance positioning relative to current positioning methods, such as those used with LTE. For example, one distinct mechanism used in 5G NR is the use spatial filtering, otherwise known as beamforming. For example, for 5G Frequency Range 1 (FR1), which includes sub-6 GHz frequency bands, supports of up to 4 beams in frequency bands of less than 2.4 GHz and up to 8 beams in frequency bands of less than 6 GHz, and Frequency Range 2 (FR2), which includes frequency bands from 24.25 GHz to 52.6 GHz, supports up to 64 beams for in frequency bands greater than 24 GHz.

The exact beam deployment is communicated to UEs in Information Elements (IEs). The information regarding beam deployment may be used in addition to the regular beam search process across cells to build a beam relation database, which may be used for UE position fixes in a low complexity manner. For example, with the beam relation database, a UE position fix may be generated simply based on the particular beams from various cells that are received by the UE. Additional refinements for positioning are possible, e.g. using measured parameters, such as Reference Signal Received Power (RSRP), Reference Signal Received Quality (RSRQ) of the beams.

In one implementation, the beam relation database may be produced by crowdsourcing known positions of UEs along with information related to beams received by the UEs at these positions. The beam data and associated positions may be provided by the UEs to a server, which may build and continuously maintain the crowdsourced beam relation database. The crowdsourced beam relation database may be downloaded and used by the UE for low complexity UE based positioning for obtaining position fixes.

In another implementation, the crowdsourced beam relation database may be used by a network, e.g., a location server within the network, to determine a position fix for the UE, e.g., based on beam data provided to the location server from the UE for beams received by the UE. The position fix may be an initial coarse position that the location server may use along with other positioning methods, or to generate assistance data for the UE with good geometry for the UE. Additionally, the UE may use the crowdsourced beam relation database to filter measurement objects from assistance data.

FIG. 1 shows an architecture of a system 100 capable of supporting location services for UE 105 using crowdsourced beam relation data, which associates beam information of beams received by the UE 105 with a position of the UE 105. The location services, for example, may include the transfer of location assistance data, including configuration parameters for multiple positioning methods, using messages such as Long Term Evolution (LTE) Positioning Protocol (LPP) or LPP extensions (LPPe) messages between a UE 105 and a server 152, which, in some instances, may take the form of a server for crowdsourcing beam relation data or a location server. Although server 152 is sometimes described herein as being used for both generation of the crowdsourced beam relation data and for positioning using the crowdsourced beam relation data, it should be understood that in some instances separate servers may be used for crowdsourcing beam relation data and for positioning. LPP is well-known and described in various publicly available technical specifications from 3GPP. LPPe has been defined by the Open Mobile Alliance (OMA) and may be used in combination with LPP such that each combined LPP/LPPe message would be an LPP message comprising an embedded LPPe message.

For simplicity, only one UE 105 and location server 152 are shown in FIG. 1. In general, system 100 may comprise multiple cells indicated by 145-$k$ ($0 \leq k \leq N_{cells}$, where $N_{cells}$ is the number of cells) with one or more networks 115, external clients 130, UEs 105, base stations 110 with antennas, and Space Vehicles (SVs) 190. System 100 may further comprise a mix of cells including macrocells such as cells 145-1, 145-3, and 145-4 along with femtocells such as cell 145-2 in a manner consistent with embodiments disclosed herein.

UE 105 may be capable of wirelessly communicating with location server 152 through network 115 (or through multiple networks 115) that support positioning and location services. For example, location services (LCS) may be performed on behalf of LCS Client 130, sometimes referred to as an external client 130, that accesses location server 152 and/or network 115 and issues a request for the location of UE 105. Location server 152 or network 115 may then respond to LCS client 130 with a location estimate for UE 105. LCS Client 130 may also be known as a Secure User Plane Location (SUPL) Agent—e.g. when the location solution used by location server 152 and UE 105 is the SUPL solution defined by OMA. In some embodiments, UE 105 may also include an LCS Client or a SUPL agent that may issue a location request to some positioning capable function within UE 105 and later receive back a location estimate for UE 105. The LCS Client or SUPL Agent within UE 105 may perform location services for the user of UE 105—e.g. provide navigation directions or identify points of interest within the vicinity of UE 105.

As illustrated in FIG. 1, the UE 105 may communicate with location server 152 through network 115 and base stations 110, which may be associated with network 115. UE 105 may receive and measure signals from antennas for base stations 110, which may be used for position determination. For example, UE 105 may receive and measure signals from antennas for one or more of base stations 110-1, 110-2, 110-3 and/or 110-4, which may be associated with cells 145-1, 145-2, 145-3 and 145-4, respectively. In some embodiments, base stations 110 may form part of a wireless communication network, which may be a wireless wide area network (WWAN), wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on.

UE 105 may also receive signals from one or more Earth orbiting Space Vehicles (SVs) 190-1 or 190-2 collectively referred to as SVs 190, which may be part of a satellite positioning system (SPS). SVs 190, for example, may be in a constellation of Global Navigation Satellite System (GNSS) such as the US Global Positioning System (GPS), the European Galileo system, the Russian Glonass system or the Chinese BeiDou system. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Figure 2:
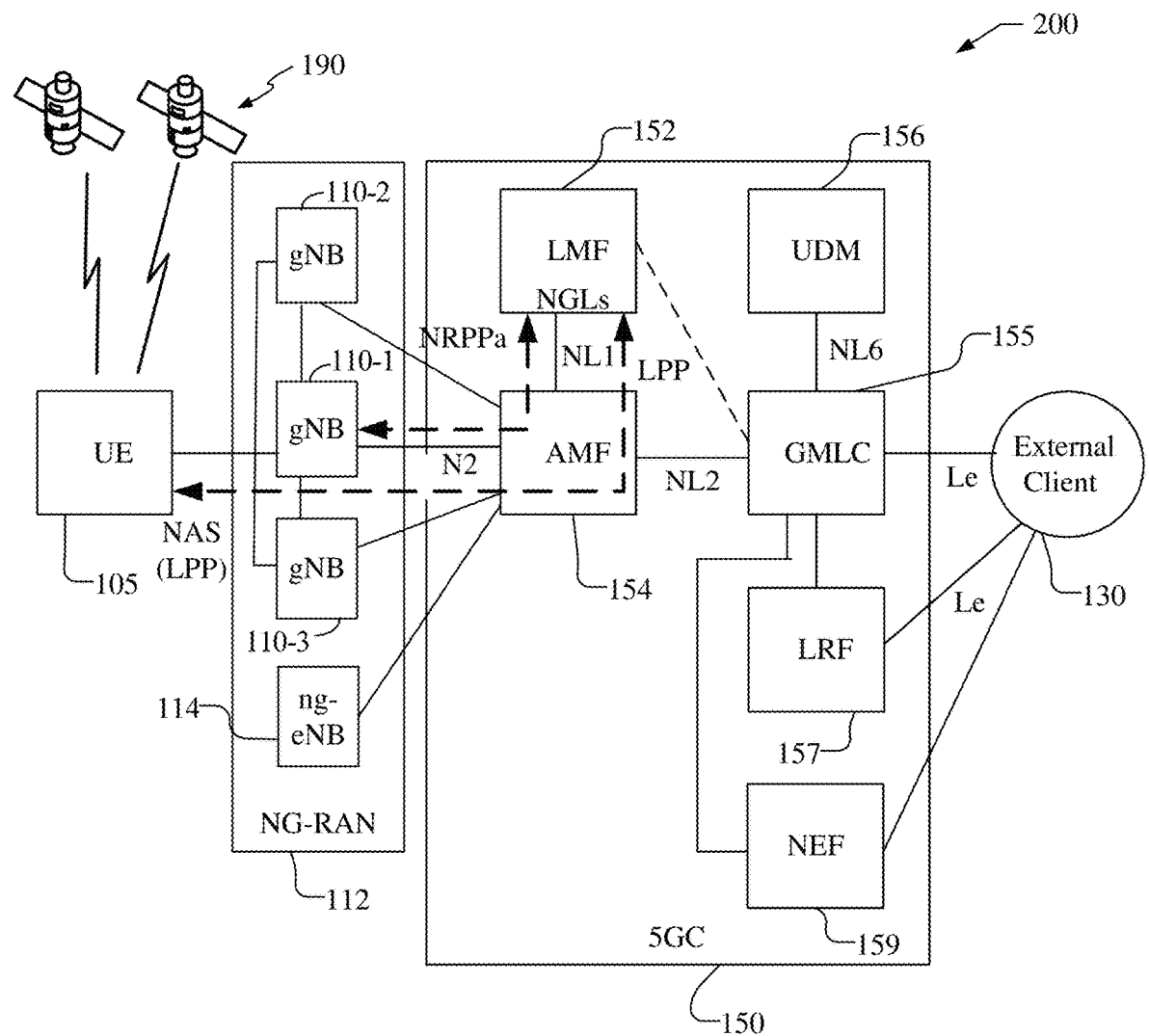
FIG. 2 is a block diagram illustrating a non-roaming reference architecture for UE location services.

FIG. 2 is a simplified block diagram illustrating a communication system 200 for non-roaming support of UE 105 location services based on crowdsourced beam relation data, as discussed herein. Communication system 200 may be one example of the system 100 in FIG. 1, like designated elements being the same. The non-roaming communication system 200 comprises a UE 105 and components of a Fifth Generation (5G) network comprising a Next Generation Radio Access Network (NG-RAN) 112, which includes base stations (BSs) sometimes referred to as New Radio (NR) NodeBs or gNBs 110-1, 110-2 and 110-3 (collectively and generically referred to herein as gNBs 110), and a 5G Core Network (5GC) 150 that is in communication with an external client 130. A 5G network may also be referred to as a New Radio (NR) network; NG-RAN 112 may be referred to as an NR RAN or a 5G RAN; and 5GC 150 may be referred to as an Next Generation (NG) Core network (NGC). As an example, NG-RAN 112 may include one or more next generation eNBs (ng-eNBs) 114 which provide LTE wireless access to UE 105. Standardization of an NG-RAN and 5GC has been performed by 3GPP. The communication system 200 may further utilize information from satellite vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 200 are described below. The communication system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 200. Similarly, the communication system 200 may include a larger or smaller number of SVs 190, gNBs 110, ng-eNBs 114, external clients 130, and/or other components. The illustrated connections that connect the various components in the communication system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 2 illustrates a 5G-based network, similar network implementations and configurations may be used for other communication technologies, such as 3G, Long Term Evolution (LTE), IEEE 802.11 WiFi etc., if beams are transmitted.

The UE 105, as used herein, may be any electronic device and may be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a smart watch, digital glasses, fitness monitor, smart car, smart appliance, cellphone, smartphone, laptop, tablet, PDA, tracking device, control device or some other portable or moveable device. The UE 105 may include a single entity or may include multiple entities such as in a personal area network where a user may employ audio, video and/or data I/O devices and/or body sensors and a separate wireline or wireless modem. Typically, though not necessarily, the UE 105 may support wireless communication using one or more Radio Access Technologies (RATs) such as GSM, Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 112 and 5GC 150), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may allow the UE 105 to communicate with an external client 130 (e.g. via elements of 5GC 150 not shown in FIG. 2, or possibly via a Gateway Mobile Location Center (GMLC) 155) and/or allow the external client 130 to receive location information regarding the UE 105 (e.g., via the GMLC 155).

The UE 105 may enter a connected state with a wireless communication network that may include the NG-RAN 112. In one example, the UE 105 may communicate with a cellular communication network by transmitting wireless signals to, or receiving wireless signals from a cellular transceiver, in the NG-RAN 112, such as a gNB 110 or ng-eNB 114. A transceiver provides user and control planes protocol terminations toward the UE 105 and may be referred to as a base station, a base transceiver station, a radio base station, a radio transceiver, a radio network controller, a transceiver function, a base station subsystem (BSS), an extended service set (ESS), or by some other suitable terminology.

In particular implementations, the UE 105 may have circuitry and processing resources capable of obtaining location related measurements. Location related measurements obtained by UE 105 may include measurements of signals received from satellites 190 belonging to an SPS or Global Navigation Satellite System (GNSS) such as GPS, GLONASS, Galileo or Beidou and/or may include measurements of signals received from terrestrial transmitters fixed at known locations (e.g., such as gNBs 110 or ng-eNB 114). UE 105 or a separate location server (e.g. LMF 152), to which UE 105 may send the measurements, may then obtain a location estimate for the UE 105 based on these location related measurements using any one of several position methods such as, for example, GNSS, Assisted GNSS (A-GNSS), Advanced Forward Link Trilateration (AFLT), Observed Time Difference Of Arrival (OTDOA), WLAN (also referred to as WiFi) positioning, or Enhanced Cell ID (ECID) or combinations thereof. In some of these techniques (e.g. A-GNSS, AFLT and OTDOA), pseudoranges or timing differences may be measured by UE 105 relative to three or more terrestrial transmitters (e.g. gNBs 110) fixed at known locations or relative to four or more satellites 190 with accurately known orbital data, or combinations thereof, based at least in part, on pilots, reference signals (RS), such as positioning reference signals (PRS), or other reference signals transmitted by the transmitters or satellites and received at the UE 105. Here, a location server, such as the LMF 152, may be capable of providing positioning assistance data to UE 105 including, for example, information regarding signals to be measured (e.g., expected signal timing, signal coding, signal frequencies, signal Doppler, muting configuration), locations and identities of terrestrial transmitters (e.g. gNBs 110) and/or signal, timing and orbital information for GNSS satellites 190 to facilitate positioning methods, such as DL RS based positioning methods, UL RS based positioning methods, and combined DL and UL RS based positioning methods. The facilitation may include improving signal acquisition and measurement accuracy by UE 105 and, in some cases, enabling UE 105 to compute its estimated location based on the location measurements. For example, location servers may comprise an almanac which indicates locations and identities of cellular transceivers and/or local transceivers in a particular region or regions such as a particular venue, and may provide information descriptive of signals transmitted by a cellular base station or access point (AP) (e.g. a gNB 110) such as transmission power and signal timing.

A UE 105 may measure RSTD, RSRP, Rx-Tx, or other positioning measurements for DL RS based positioning methods, such as DL-TDOA and DL-AoD. The UE 105 may transmit UL RS, and one or more gNBs 110 may measure, e.g., the RSTD and Rx-Tx for UL RS based positioning methods, such as UL-TDOA, UL-AoA. Additionally, both the UE 105 and gNBs 110 may measure, e.g., Rx-Tx, for received DL RS and UL RS, respectively, for combined DL and UL RS based positioning methods such as RTT and multi-cell RTT. A UE 105 and gNBs 110 may transfer these measurements to a location server, such as LMF 152, to determine a location for UE 105, or in some implementations, may the UE 105 may use these measurements together with assistance data (e.g. terrestrial almanac data or GNSS satellite data such as GNSS Almanac and/or GNSS Ephemeris information) received from a location server (e.g. LMF 152) or broadcast by a base station (e.g. a gNB 110 or ng-eNB 114) in NG-RAN 112 to determine a location for UE 105.

An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

Wireless communications system 200 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features. However, the waves may penetrate structures sufficiently for a macro cell to provide service to UEs 105 located indoors. Transmission of UHF waves may be associated with smaller antennas and shorter range (for example, less than 100 km) compared to transmission using the smaller frequencies and longer waves of the high frequency (HF) or very high frequency (VHF) portion of the spectrum below 300 MHz.

Wireless communications system 200 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 200 may also operate in an extremely high frequency (EHF) region of the spectrum (for example, from 30 GHz to 300 GHz), also known as the millimeter band. In some examples, wireless communications system 200 may support millimeter wave (mmW) communications between UEs 105 and base stations 110, and EHF antennas of the respective devices may be even smaller and more closely spaced than UHF antennas. In some examples, this may facilitate use of antenna arrays within a UE 105. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, base station 110 or UE 105 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (for example, a base station 110) and a receiving device (for example, a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (for example, the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (for example, a base station 110 or a UE 105) to shape or steer an antenna beam (for example, a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (for example, with respect to the antenna array of the transmitting device or receiving device, or with respect to some other orientation).

In one example, a base station 110 may use multiple antennas or antenna arrays to conduct beamforming operations for directional communications with a UE 105. For instance, some signals (for example synchronization signals, reference signals, beam selection signals, or other control signals) may be transmitted by a base station 110 multiple times in different directions, which may include a signal being transmitted according to different beamforming weight sets associated with different directions of transmission. Transmissions in different beam directions may be used to identify (for example, by the base station 110 or a receiving device, such as a UE 105) a beam direction for subsequent transmission or reception by the base station 110.

Some signals, such as data signals associated with a particular receiving device, may be transmitted by a base station 110 in a single beam direction (for example, a direction associated with the receiving device, such as a UE 105). In some examples, the beam direction associated with transmissions along a single beam direction may be determined based on a signal that was transmitted in different beam directions. For example, a UE 105 may receive one or more of the signals transmitted by the base station 110 in different directions, and the UE 105 may report to the base station 110 an indication of the signal it received with a highest signal quality, or an otherwise acceptable signal quality. Although these techniques are described with reference to signals transmitted in one or more directions by a base station 110, a UE 105 may employ similar techniques for transmitting signals multiple times in different directions (for example, for identifying a beam direction for subsequent transmission or reception by the UE 105), or transmitting a signal in a single direction (for example, for transmitting data to a receiving device).

A receiving device (for example, a UE 105, which may be an example of a mmW receiving device) may try multiple receive beams when receiving various signals from the base station 110, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (for example, when receiving a data signal). The single receive beam may be aligned in a beam direction determined based on listening according to different receive beam directions (for example, a beam direction determined to have a highest signal strength, highest signal-to-noise ratio, or otherwise acceptable signal quality based on listening according to multiple beam directions).

In some examples, the antennas of a base station 110 or UE 105 may be located within one or more antenna arrays, which may support MIMO operations, or transmit or receive beamforming. For example, one or more base station antennas or antenna arrays may be co-located at an antenna assembly, such as an antenna tower. In some examples, antennas or antenna arrays associated with a base station 110 may be located in diverse geographic locations. A base station 110 may have an antenna array with a number of rows and columns of antenna ports that the base station 110 may use to support beamforming of communications with a UE 105. Likewise, a UE 105 may have one or more antenna arrays that may support various MIMO or beamforming operations.

As shown in FIG. 2, pairs of base stations 110, e.g., gNBs, in NG-RAN 112 may be connected to one another, e.g., directly as shown in FIG. 2 or indirectly via other gNBs 110. Access to the 5G network is provided to UE 105 via wireless communication between the UE 105 and one or more of the gNBs 110, which may provide wireless communication access to the 5GC 150 on behalf of the UE 105 using 5G (e.g. NR). In FIG. 2, the serving gNB for UE 105 is assumed to be gNB 110-1, although other gNBs (e.g. gNB 110-2 and/or gNB 110-3) may act as a serving gNB if UE 105 moves to another location or may act as a secondary gNB to provide additional throughout and bandwidth to UE 105. Some gNBs 110 in FIG. 2 (e.g. gNB 110-2 or gNB 110-3) may be configured to function as positioning-only beacons which may transmit signals (e.g. directional PRS) to assist positioning of UE 105 but may not receive signals from UE 105 or from other UEs.

As noted, while FIG. 2 depicts nodes configured to communicate according to 5G communication protocols, nodes configured to communicate according to other communication protocols, such as, for example, the LTE protocol, may be used. Such nodes, configured to communicate using different protocols, may be controlled, at least in part, by the 5GC 150. Thus, the NG-RAN 112 may include any combination of gNBs, eNBs, or other types of base stations or access points. As an example, NG-RAN 112 may include one or more next generation eNBs (ng-eNBs) 114 which provide LTE wireless access to UE 105 and may connect to entities in 5GC 150 such as AMF 154.

The gNBs 110 and/or the ng-eNB 114 can communicate with the Access and Mobility Management Function (AMF) 154, which, for positioning functionality, communicates with a Location Management Function (LMF) 152. The AMF 154 may support mobility of the UE 105, including cell change and handover and may participate in supporting a signaling connection to the UE 105 and possibly helping establish and release Protocol Data Unit (PDU) sessions for UE 105. Other functions of AMF 154 may include: termination of a control plane (CP) interface from NG-RAN 112; termination of Non-Access Stratum (NAS) signaling connections from UEs such as UE 105, NAS ciphering and integrity protection; registration management; connection management; reachability management; mobility management; access authentication and authorization.

The LMF 152 may support positioning of the UE 105 when UE 105 accesses the NG-RAN 112 and may support position procedures/methods such as Assisted GNSS (A-GNSS), DL-TDOA, DL-AoD, UL-TDOA, UL-AoA, RTT, multi-cell RTT, Observed Time Difference of Arrival (OTDOA), Real Time Kinematics (RTK), Precise Point Positioning (PPP), Differential GNSS (DGNSS), Enhanced Cell ID (ECID), WLAN positioning, and/or other position methods. The LMF 152 may also process location services requests for the UE 105, e.g., received from the AMF 154. In some embodiments, a node/system that implements the LMF 152 may additionally or alternatively implement other types of location-support modules, such as an Enhanced Serving Mobile Location Center (E-SMLC) or a Secure User Plane Location (SUPL) Location Platform (SLP). It will be noted that in some embodiments, at least part of the positioning functionality (including derivation of UE 105's location) may be performed at the UE 105 (e.g., using measurements of signals transmitted by wireless nodes, and assistance data provided to the UE 105). The LMF 152 may be referred to by other names such as a Location Manager (LM), Location Function (LF), commercial LMF (CLMF) or value added LMF (VLMF).

The GMLC 155 may support a location request for the UE 105 received from an external client 130 and may forward such a location request to the AMF 154, which may in turn forward the location request to the LMF 152. A location response from the LMF 152 (e.g. containing a location estimate for the UE 105) may be similarly returned to the GMLC 155 via the AMF 154, and the GMLC 155 may then return the location response (e.g., containing the location estimate) to the external client 130. GMLC 155 may contain subscription information for an external client 130 and may authenticate and authorize a location request for UE 105 from external client 130. GMLC 155 may further initiate a location session for UE 105 by sending a location request for UE 105 to AMF 154 and may include in the location request an identity for UE 105 and the type of location being requested (e.g. such as a current location or a sequence of periodic or triggered locations).

As further illustrated in FIG. 2, the LMF 152 and the gNBs 110 may communicate using a New Radio Positioning Protocol A (which may be referred to as NPPa or NRPPa). NRPPa may be defined in 3GPP Technical Specification (TS) 38.455, with NRPPa messages being transferred between the gNBs 110 and the LMF 152 via the AMF 154. As further illustrated in FIG. 2, LMF 152 and UE 105 may communicate using the LTE Positioning Protocol (LPP) defined in 3GPP TS 36.355, where LPP messages are transferred between the UE 105 and the LMF 152 via the AMF 154 and a serving gNB 110-1 for UE 105. For example, LPP messages may be transferred between the LMF 152 and the AMF 154 using service based operations and may be transferred between the AMF 154 and the UE 105 using a 5G Non-Access Stratum (NAS) protocol. The LPP protocol may be used to support positioning of UE 105 using UE assisted and/or UE based position methods such as A-GNSS, RTK, WLAN, OTDOA, DL-TDOA, DL-AoD, UL-TDOA, UL-AoA, RTT, multi-cell RTT, and/or ECID. The NRPPa protocol may be used to support positioning of UE 105 using network based position methods such as ECID (when used with measurements obtained by a gNB 110) and/or may be used by LMF 152 to obtain location related information from gNBs 110 such as parameters defining DL RS transmission, such as PRS, from gNBs 110 for support of positioning and receive UL measurements from the gNBs used for positioning methods such as UL-TDOA, UL-AoA, RTT, and multi-cell RTT.

With a UE assisted position method, UE 105 may obtain location measurements (e.g. measurements of RSSI, RSTD, Rx-Tx, AOA, RSRP and/or RSRQ for gNBs 110, ng-eNBs 114 or WLAN APs, or measurements of GNSS pseudorange, code phase and/or carrier phase for SVs 190) and send the measurements to a location server (e.g. LMF 152) for computation of a location estimate for UE 105. With a UE based position method, UE 105 may obtain location measurements (e.g. which may be the same as or similar to location measurements for a UE assisted position method and may include UL measurements performed by gNBs 110) and may compute a location of UE 105 (e.g. with the help of assistance data received from a location server such as LMF 152 or broadcast by gNBs 110, ng-eNBs 114 or other base stations or APs). With a network based position method, one or more base stations (e.g. gNBs 110 and/or ng-eNBs 114) or APs may obtain location measurements (e.g. measurements of RSSI, Rx-Tx, RSRP, RSRQ or TOA for signals transmitted by UE 105) and/or may receive measurements obtained by UE 105, and may send the measurements to a location server (e.g. LMF 152) for computation of a location estimate for UE 105.

Information provided by the gNBs 110 to the LMF 152 using NRPPa may include timing and configuration information for PRS transmission and location coordinates of the gNBs 110. The LMF 152 can then provide some or all of this information to the UE 105 as assistance data in an LPP message via the NG-RAN 112 and the 5GC 150.

An LPP message sent from the LMF 152 to the UE 105 may instruct the UE 105 to do any of a variety of things, depending on desired functionality. For example, the LPP message could contain an instruction for the UE 105 to obtain measurements for GNSS (or A-GNSS), WLAN, DL RS based positioning methods, UL RS based positioning methods, combined DL and UL RS based positioning methods, (or some other position method). The LPP message may provide the UE 105 with configuration parameters for obtaining the one or more measurements necessary for the positioning methods. The UE 105 may send positioning information, e.g., the measurements or location estimate, back to the LMF 152 in an LPP message (e.g. inside a 5G NAS message) via the serving gNB 110-1 and the AMF 154.

In some embodiments, LPP may be augmented by or replaced by an NR or NG positioning protocol (NPP or NRPP) which supports position methods such as OTDOA and ECID for NR radio access. For example, an LPP message may contain an embedded NPP message or may be replaced by an NPP message.

When NG-RAN 112 includes one or more ng-eNBs 114, an ng-eNB 114 may communicate with LMF 152 using NRPPa in order to support positioning of UE 105 (e.g. using a network based position method) and/or may enable transfer of LPP and/or NPP messages between UE 105 and LMF 152 via the ng-eNB 114 and AMF 154. An ng-eNB 114 and/or a gNB 110 in NG-RAN 112 may also broadcast positioning assistance data to UEs such as UE 105.

As illustrated, a Unified Data Management (UDM) 156 may be connected to the GMLC 155. The UDM 156 is analogous to a Home Subscriber Server (HSS) for LTE access, and if desired, the UDM 156 may be combined with an HSS. The UDM 156 is a central database that contains user-related and subscription-related information for UE 105 and may perform the following functions: UE authentication, UE identification, access authorization, registration and mobility management, subscription management and Short Message Service management. Additionally, the GMLC 155 is connected to a Location Retrieval Function (LRF) 157, which handles retrieval of location information for the UE 105 and may be used to provide location information for UE 105 to an external client 130 that is a Public Safety Answering Point, e.g. following an emergency call from UE 105 to the PSAP.

To support services including location services from external clients 130 for Internet of Things (IoT) UEs, a Network Exposure Function (NEF) 159 may be included. The NEF 159, for example, may function to obtain a current or last known location for a UE 105, may obtain an indication of a change in location for a UE 105, or an indication of when a UE 105 becomes available (or reachable). An external client 130 (e.g. an external Client 130 that is an Application Function) may access NEF 159 in order to obtain location information for UE 105. The NEF 159 may be connected to the GMLC 155 to support last known location, current location and/or deferred periodic and triggered location for the UE 105. If desired, the NEF 159 may include, or may be combined with, the GMLC 155, and may then obtain location information for UE 105 from LMF 152 via AMF 154.

As noted, while the communication systems 100 and 200 are described in relation to 5G technology, the communication systems may be implemented to support other communication technologies, such as GSM, WCDMA, LTE, WiFi IEEE 802.11 etc., that are used for supporting and interacting with mobile devices such as the UE 105 (e.g., to implement voice, data, positioning, and other functionalities). For example, in some embodiments, 5GC 150 may be connected to a WLAN using a Non-3GPP InterWorking Function (N3IWF, not shown) in the 5GC 150. For example, the WLAN may support IEEE 802.11 WiFi access for UE 105. Here, the N3IWF may connect to the WLAN and to other elements in the 5GC 150 such as AMF 154.

In other embodiments, the 5GC core 150 may be configured to control different air interfaces, such as the Evolved Universal Terrestrial Radio Access Network (E-UTRAN) comprising one or more evolved NodeBs (eNBs) in place of the gNBs 110 and ng-eNB 114. In some other embodiments, both the NG-RAN 112 and the 5GC 150 may be replaced by other RANs and other core networks. For example, in an Evolved Packet System (EPS) defined by 3GPP to support LTE access: the UE 105 may access the EPS rather than the NG-RAN 112 and 5GC 150; the NG-RAN 112 may be replaced by an E-UTRAN containing eNBs in place of the gNBs 110 an ng-eNB 114; and the 5GC 150 may be replaced by an Evolved Packet Core (EPC) comprising a Mobility Management Entity (MME) in place of the AMF 154, an Enhanced Serving Mobile Location Center (E-SMLC) in place of the LMF 152 and a GMLC that may be similar or identical to the VGMLC 155. In such an EPS, the E-SMLC may use an LTE Positioning Protocol A (LPPa) in place of NRPPa to send and receive location information to and from the eNBs in the E-UTRAN and may use LPP to support positioning of UE 105. In addition, in some implementations, base stations (e.g. similar to or based on a gNB 110 or ng-eNB 114) may function as positioning only beacons and transmit signals (e.g. PRS) to assist positioning of a UE 105 but not receive signals.

Figure 3:
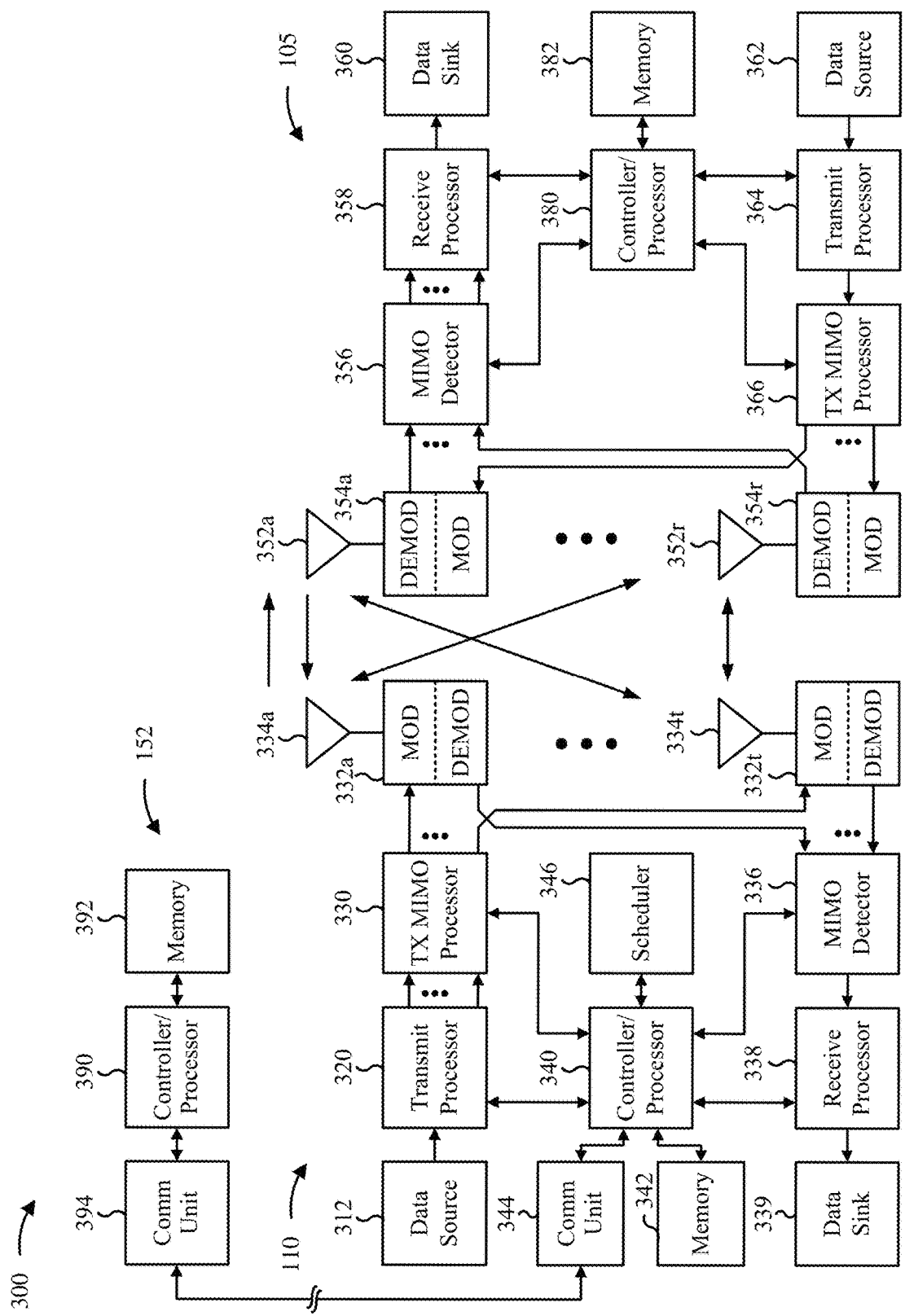
FIG. 3 shows a block diagram of a design of base station and UE.

FIG. 3 shows a block diagram of a design 300 of base station 110 and UE 105, which may be one of the base stations and one of the UEs in FIG. 1. Base station 110 may be equipped with T antennas 334a through 334t, and UE 105 may be equipped with R antennas 352a through 352r, where in general T≥1 and R≥1.

At base station 110, a transmit processor 320 may receive data from a data source 312 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 320 may also process system information (e.g., for semi-static resource partitioning information (SRPI) and/or the like) and control information (e.g., CQI requests, grants, upper layer signaling, and/or the like) and provide overhead symbols and control symbols. Transmit processor 320 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 330 may perform spatial processing (e.g., precoding) on the data symbols, the control symbols, the overhead symbols, and/or the reference symbols, if applicable, and may provide T output symbol streams to T modulators (MODs) 332a through 332t. Each modulator 332 may process a respective output symbol stream (e.g., for OFDM and/or the like) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively. According to various aspects described in more detail below, the synchronization signals can be generated with location encoding to convey additional information.

At UE 105, antennas 352a through 352r may receive the downlink signals from base station 110 and/or other base stations and may provide received signals to demodulators (DEMODs) 354a through 354r, respectively. Each demodulator 354 may condition (e.g., filter, amplify, down convert, and digitize) a received signal to obtain input samples. Each demodulator 354 may further process the input samples (e.g., for OFDM and/or the like) to obtain received symbols. A MIMO detector 356 may obtain received symbols from all R demodulators 354a through 354r, perform MIMO detection on the received symbols if applicable, and provide detected symbols. A receive processor 358 may process (e.g., demodulate and decode) the detected symbols, provide decoded data for UE 105 to a data sink 360, and provide decoded control information and system information to a controller/processor 380. A channel processor may determine reference signal received power (RSRP), received signal strength indicator (RSSI), reference signal received quality (RSRQ), channel quality indicator (CQI), and/or the like. In some aspects, one or more components of UE 105 may be included in a housing.

On the uplink, at UE 105, a transmit processor 364 may receive and process data from a data source 362 and control information (e.g., for reports comprising RSRP, RSSI, RSRQ, CQI, and/or the like) from controller/processor 380. Transmit processor 364 may also generate reference symbols for one or more reference signals. The symbols from transmit processor 364 may be precoded by a TX MIMO processor 366 if applicable, further processed by modulators 354a through 354r (e.g., for DFT-s-OFDM, CP-OFDM, and/or the like), and transmitted to base station 110. At base station 110, the uplink signals from UE 105 and other UEs may be received by antennas 334, processed by demodulators 332, detected by a MIMO detector 336 if applicable, and further processed by a receive processor 338 to obtain decoded data and control information sent by UE 105. Receive processor 338 may provide the decoded data to a data sink 339 and the decoded control information to controller/processor 340. Base station 110 may include communication unit 344 and communicate to server 152 via communication unit 344. Server 152 may include communication unit 394, controller/processor 390, and memory 392.

Controller/processor 340 of base station 110, controller/processor 380 of UE 105, controller 390 of server 152, which may be a server for generating a crowdsourced beam relation data and/or using a crowdsourced beam relation data for positioning, and/or any other component(s) of FIG. 3 may perform one or more techniques, as described in detail herein. For example, controller/processor 380 of UE 105, controller/processor 340 of base station 110, controller 390 of server 152, and/or any other component(s) of FIG. 3 may perform or direct operations of, for example, processes 1200, 1300, 1400, and 1500 of FIGS. 12, 13, 14, and 15, and/or other processes as described herein. Memories 342, 382, and 392 may store data and program codes for base station 110, UE 105, and server 152, respectively. In some aspects, memory 342 and/or memory 382 and/or memory 392 may comprise a non-transitory computer-readable medium storing one or more instructions for wireless communication. For example, the one or more instructions, when executed by one or more processors of the UE 105, the base station 110, and/or server 152, may perform or direct operations of, for example, processes 1200, 1300, 1400, and 1500 of FIGS. 12, 13, 14, and 15 and/or other processes as described herein. A scheduler 346 may schedule UEs for data transmission on the downlink and/or uplink.

As indicated above, FIG. 3 is provided as an example. Other examples may differ from what is described with regard to FIG. 3.

Figure 4:
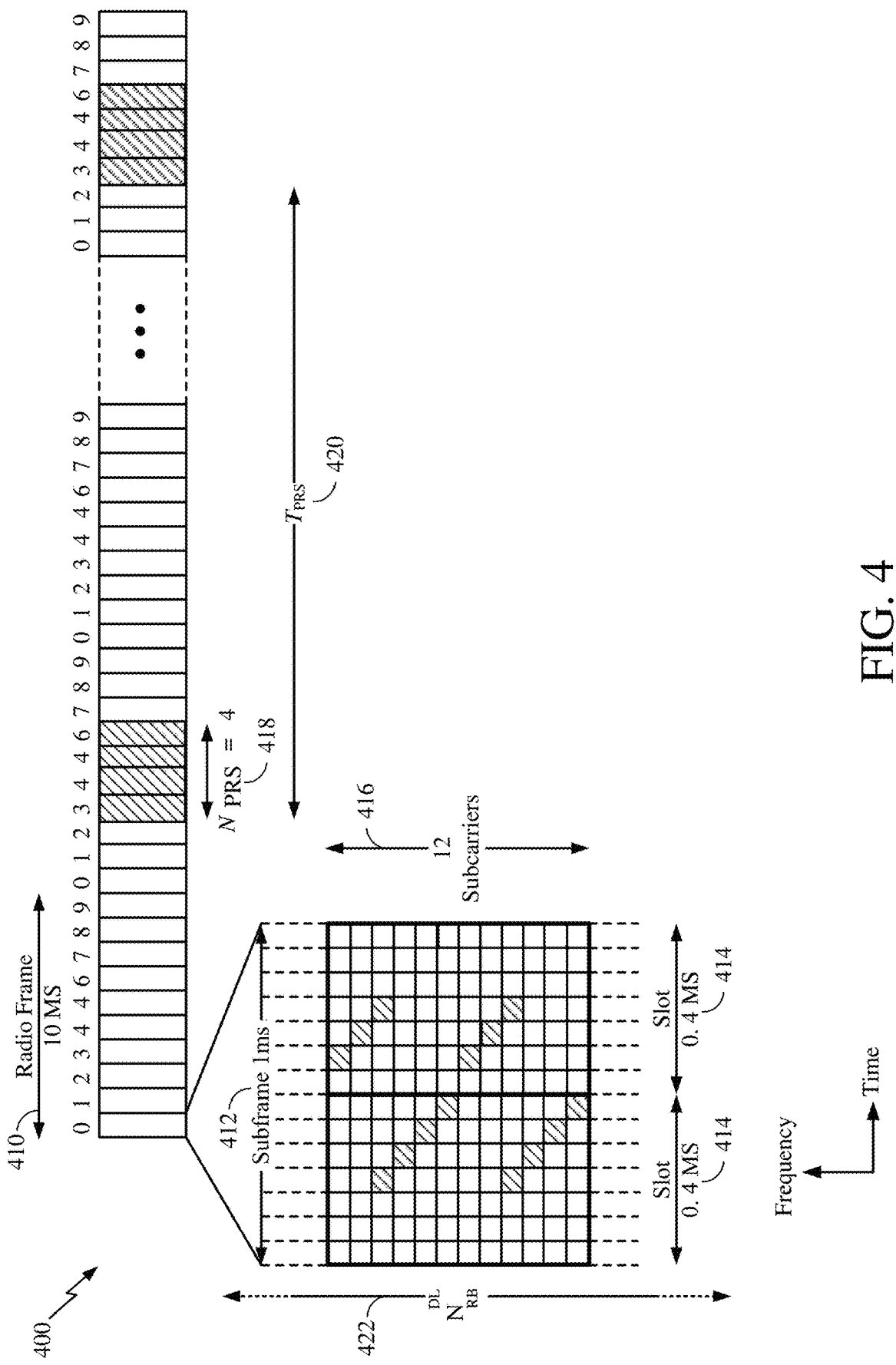
FIG. 4 shows a structure of an exemplary subframe sequence with positioning reference signal (PRS) positioning occasions.

FIG. 4, by way of example, shows a structure of an exemplary subframe sequence 400 with positioning reference signal (PRS) positioning occasions, which may be used by the UE for cellular based positioning. Subframe sequence 400 may be applicable to the broadcast of PRS signals from a base station (e.g., any of the base stations described herein) or other network node. The subframe sequence 400 may be used in LTE systems, and the same or similar subframe sequence may be used in other communication technologies/protocols, such as 5G and NR. In FIG. 4, time is represented horizontally (e.g., on the X axis) with time increasing from left to right, while frequency is represented vertically (e.g., on the Y axis) with frequency increasing (or decreasing) from bottom to top. As shown in FIG. 4, downlink and uplink radio frames 410 may be of 10 millisecond (ms)

duration each. For downlink frequency division duplex (FDD) mode, radio frames 410 are organized, in the illustrated example, into ten subframes 412 of 1 ms duration each. Each subframe 412 comprises two slots 414, each of, for example, 0.5 ms duration.

In the frequency domain, the available bandwidth may be divided into uniformly spaced orthogonal subcarriers 416 (also referred to as "tones" or "bins"). For example, for a normal length cyclic prefix (CP) using, for example, 15 kHz spacing, subcarriers 416 may be grouped into a group of twelve (12) subcarriers. A resource of one OFDM symbol length in the time domain and one subcarrier in the frequency domain (represented as a block of subframe 412) is referred to as a resource element (RE). Each grouping of the 12 subcarriers 416 and the 14 OFDM symbols is termed a resource block (RB) and, in the example above, the number of subcarriers in the resource block may be written as $N_{SC}^{RB}=12$. For a given channel bandwidth, the number of available resource blocks on each channel 422, which is also called the transmission bandwidth configuration 422, is indicated as $N_{RB}^{DL}$. For example, for a 3 MHz channel bandwidth in the above example, the number of available resource blocks on each channel 422 is given by $N_{RB}^{DL}=15$. Note that the frequency component of a resource block (e.g., the 12 subcarriers) is referred to as a physical resource block (PRB).

A base station may transmit radio frames (e.g., radio frames 410), or other physical layer signaling sequences, supporting PRS signals (i.e. a downlink (DL) PRS) according to frame configurations either similar to, or the same as that, shown in FIG. 4, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 4.

A collection of resource elements that are used for transmission of PRS signals is referred to as a "PRS resource." The collection of resource elements can span multiple PRBs in the frequency domain and N (e.g., 1 or more) consecutive symbol(s) within a slot 414 in the time domain. For example, the cross-hatched resource elements in the slots 414 may be examples of two PRS resources. A "PRS resource set" is a set of PRS resources used for the transmission of PRS signals, where each PRS resource has a PRS resource identifier (ID). In addition, the PRS resources in a PRS resource set are associated with the same transmission-reception point (TRP). A PRS resource ID in a PRS resource set is associated with a single beam transmitted from a single TRP (where a TRP may transmit one or more beams). Note that this does not have any implications on whether the TRPs and beams from which signals are transmitted are known to the UE.

PRS may be transmitted in special positioning subframes that are grouped into positioning occasions. A PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number NPRS of consecutive positioning subframes. The PRS positioning occasions for a cell supported by a base station may occur periodically at intervals, denoted by a number TPRS of milliseconds or subframes. As an example, FIG. 4 illustrates a periodicity of positioning occasions where NPRS equals 4 418 and TPRS is greater than or equal to 20 420. In some aspects, TPRS may be measured in terms of the number of subframes between the start of consecutive positioning occasions. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a jth positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes (NPRS) per positioning occasion and a particular periodicity (TPRS). In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to the UE to enable the UE to perform PRS positioning measurements. The UE is not expected to blindly perform detection of PRS configurations.

Note that the terms "positioning reference signal" and "PRS" may sometimes refer to specific reference signals that are used for positioning in LTE/NR systems. However, as used herein, unless otherwise indicated, the terms "positioning reference signal" and "PRS" refer to any type of reference signal that can be used for positioning, such as but not limited to, PRS signals in LTE/NR, navigation reference signals (NRS), transmitter reference signals (TRS), cell-specific reference signals (CRS), channel state information reference signals (CSI-RS), primary synchronization signals (PSS), secondary synchronization signals (SSS), etc.

Similar to DL PRS transmitted by base stations, discussed above, a UE may transmit UL PRS for positioning. The UL PRS may be, e.g., sounding reference signals (SRS) for positioning. Using received DL PRS from base stations, the UE may perform various positioning measurement, such as RSTD, RSRP, and Rx-Tx measurements that may be used in DL positioning methods, such as DL-TDOA, and DL AoD, and in combined DL and UL positioning methods such as RTT and multi-cell RTT. Using received UL PRS (e.g. SRS) from the UE, the base stations may perform various positioning measurements, such as RSTD and Rx-Tx, which may be used in UL positioning methods, such as UL-TDOA, UL-AoA, and in combined DL and UL positioning methods such as RTT and multi-cell RTT.

The assistance data provided to the UE 105 includes configuration parameters for the positioning methods such as the time and frequency resources for DL and UL reference signals (e.g., DL PRS and UL SRS) to be used for positioning, such as configuration parameters for various base stations/TRPs and associated bands and frequency layers, resource sets and resources, including beams, to be measured or the time and frequency of resources for UL reference signals (such as SRS) to be transmitted for the positioning methods.

Figure 5:
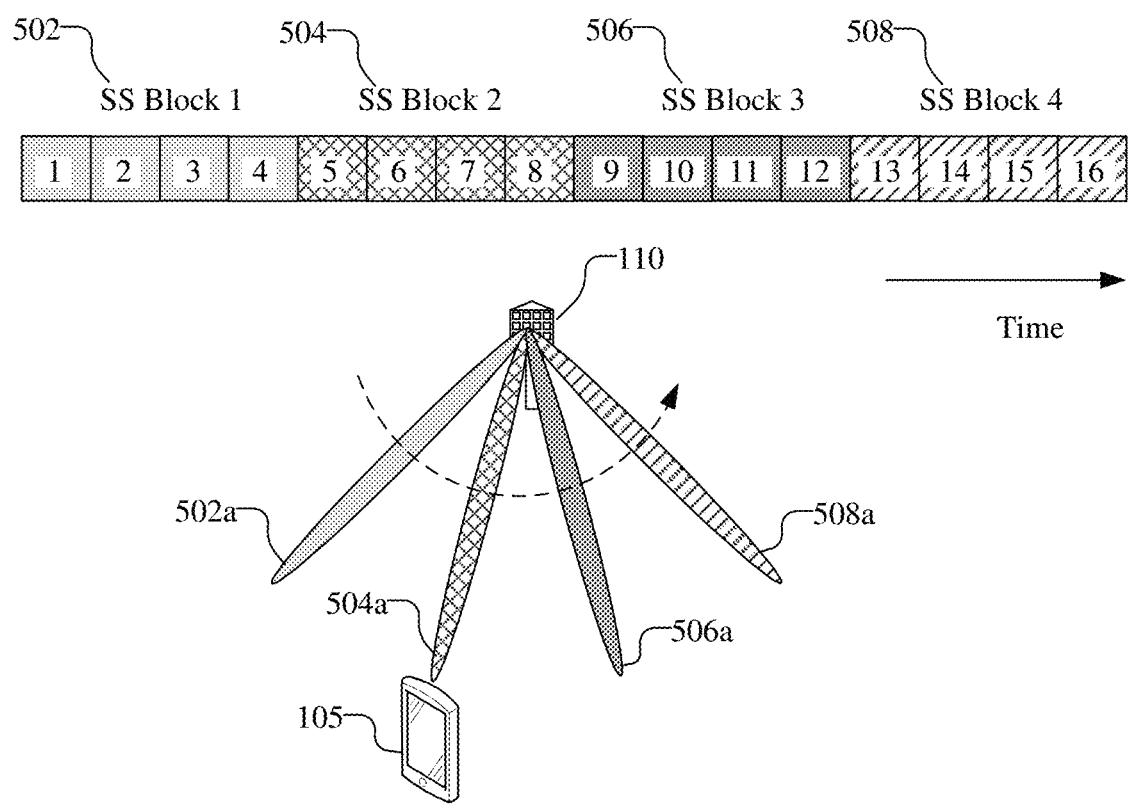
FIG. 5 illustrates an example of a plurality of beams produced by a base station that are received by a UE.

FIG. 5 illustrates an example of a plurality of beams produced by a base station 110 that are received by a UE 105. The base station 110, for example, may include a number of separate antennas which are provided RF current from the transmitter with the correct phase relationship so that the radio waves from the separate antennas add together to increase the radiation in a desired direction, while cancelling to suppress radiation in undesired directions, to produce a beam. The beam can be steered to point in different directions, e.g., changing the azimuth angle and elevation angle, without moving the antenna panel of the base station 110. The antenna panel of the base station 110 may be controlled to produce beams at various angles, illustrated as beams 502a, 504a, 506a, and 508a. In general, the antenna panel of the base station 110 may produce an azimuth span of 120° and an elevation span of 60°. By increasing the number of individual antennas present and used in an antenna panel, the width of the beams produced may be reduced.

As illustrated in FIG. 5, the directional beams transmitted from a base station 110 may be based on a synchronization signal (SS) burst. The SS Burst includes a plurality of SS blocks such as a first SS Block 502, a second SS Block 504, a third SS Block 506, and a fourth SS Block 508. An SS burst may include additional SS blocks. Each SS block 502, 504, 506, 508 may be mapped to an angular direction and a specific beam ID, as well as the cell ID of the base station 110. For example, the first SS block 502 is mapped to a first beam 502a with the beam identification value (e.g., index) of 1, the second SS block 504 is mapped to the second beam 504a with a beam identification value of 5, the third SS block 506 is mapped to the third beam 506a with a beam identification value of 9, and the fourth SS block 508 is mapped to the fourth beam 508a with a beam identification value of 13. The base station 110 sweeps the beam horizontally (azimuth) and vertically (elevation) over time. For example, the beams may be swept over a 120° azimuth span and a 60° elevation span. Thus, individual narrow beams are swept over a spatial extent that is related to the base station 110 by azimuth angle and elevation angle.

During an initial signal acquisition procedure, a UE 105 may receive one or more beam identification values from base stations (e.g., gNB) in a wireless network, along with the cell ID.

Figure 6:
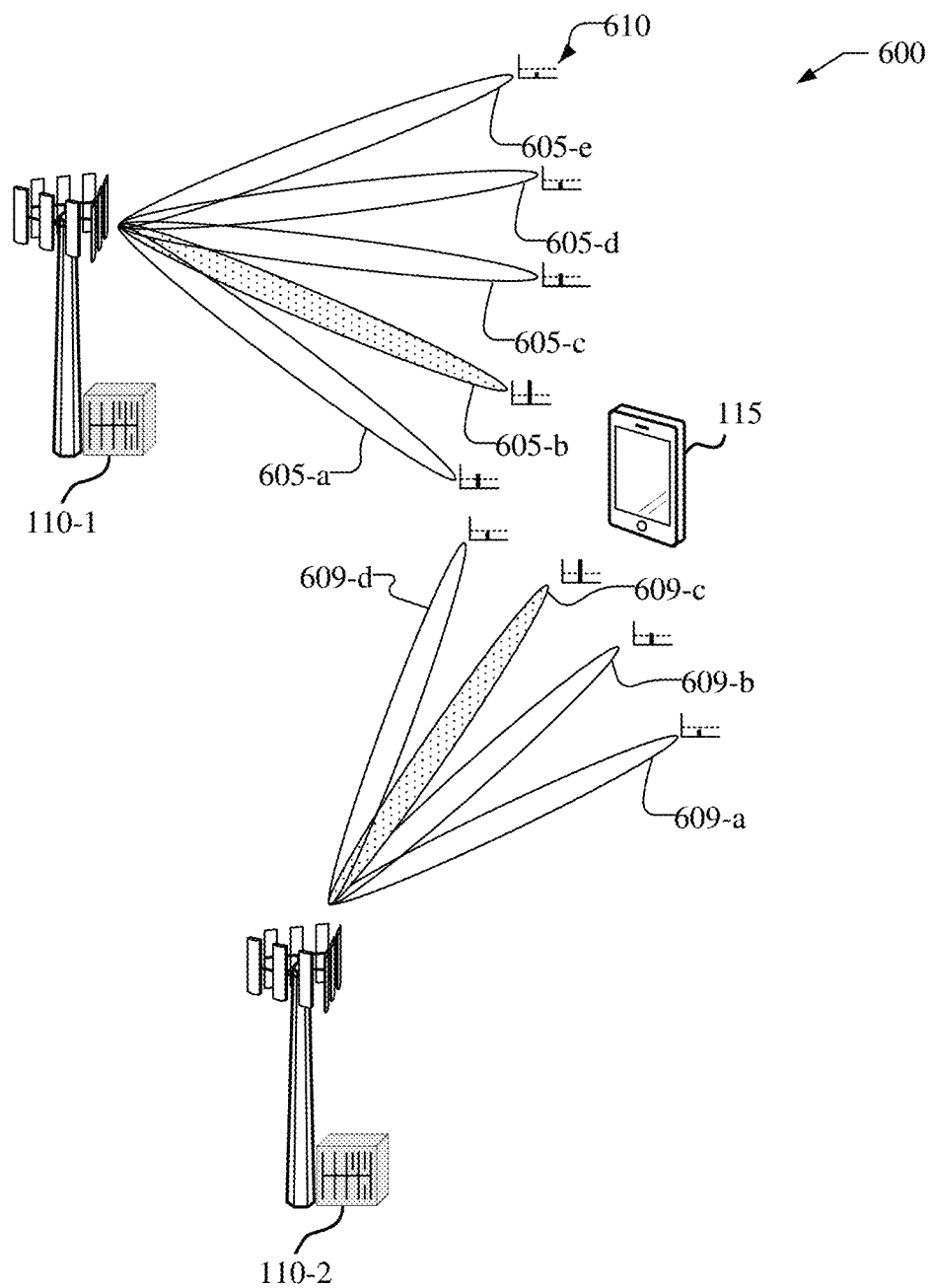
FIG. 6 illustrates a simplified environment including two base stations producing directional beams received by a UE.

FIG. 6, by way of example, illustrates a simplified environment 600 including two base stations 110-1 and 110-2, producing directional beams received by a UE 105. Base station 110-1, for example, produces beams 605-a 605-b, 605-c, 605-d, and 605-e (collectively referred to as beams 605), and base station 110-2 produces beams 609-a, 609-b, 609-c, and 609-d (collectively referred to as beams 609). Each beam is associated with a beam ID and a cell ID.

The UE 105 may receive one or more of the beams from each of the base stations 110-1 and 110-2. For example, as illustrated by the graph 610 associated with each beam, the UE 105 may measure a Reference Signal Receive Power (RSRP) for each beam, where the height of the bars in graphs 610 illustrates the RSRP measured by the UE 105 for each respective beam. As illustrated, beam 605-b has the highest RSRP for beams produced by base station 110-1 and beam 609-c has the highest RSRP for beams produced by base station 110-2, and thus, may be considered received beams for the UE 105. As indicated by the graphs 610, however, the UE 105 receives other beams from the base station 110-1 and beam 609-c. The UE 105, for example, may use a predetermined threshold, e.g., as indicated by the dotted line in the graphs 610, to identify beams that are received with sufficient quality that they may be used for position determination. In some implementations, other parameters may be measured, such as Signal-to-Interference-plus-Noise Ratio (SINR), Reference Signal Received Quality (RSRQ), etc. and used instead of or in addition to RSRP.

Thus, the UE 105 may identify each beam that is received from the base stations 110-1 and 110-2. The UE 105 may determine whether a beam is "received" by measuring one or more parameters of the beam, e.g., RSRP, SINR, or RSRQ, and comparing the measured parameter to a predetermined threshold, where beams with measured parameters that exceed the threshold are determined to be received.

In an implementation, the beam information for beams received by the UE 105 may be leveraged for positioning. For example, at any given position of the UE 105, the UE 105 will detect a subset of the total beams transmitted by one or more cells, e.g., base stations 110. Because each beam from a base station 110 is steered to a specific direction, e.g., a fixed azimuth angle and elevation angle, the detection of one or more beams from a base station may provide a coarse indication of the position of the UE. Moreover, while the UE 105 may detect only a subset of the beams from a single base station 110, e.g., the serving base station, the UE 105 may also detect a subset of beams from other neighbor base stations. The intersection of multiple beams from multiple base stations that the UE 105 is able to detect may be used to further reduce uncertainty in the position of the UE 105 and to further refine a position estimate for the UE 105.

Accordingly, in one implementation, UE 105 may receive a plurality of beams from one or more base stations and may determine an identifier for each received beam, e.g., a cell ID and beam ID pair. The UE 105 may further determine its current position, e.g., using a satellite positioning system, such as GNSS, shown in FIG. 1, and/or using cellular positioning techniques. The UE 105 may report the beam identifier, e.g., the cell ID and beam ID pair, of each received beam associated with the UE position, e.g., latitude and longitude, at which the beams were received by the UE 105 to a crowdsourcing server, e.g., server 152 shown in FIG. 1.

With the information provided by UE 105, as well as other UEs, regarding the beams that are received at various locations, the server may generate a crowdsourced beam relation database. The subsets of beams that may be received at different locations serves as a fingerprint by which a position of UE may be determined using received beam identification information.

Additionally, measured parameters, such as RSRP and/or RSRQ may be measured by the UE and associated with the beam information and position of the UE, which may be reported to the server and included in the crowdsourced beam relation database. The inclusion of measured parameters may provide a finer fingerprinting in the crowdsourced beam relation database.

In addition, as a further enhancement, the UE 105 may determine a beam width parameter that is associated with each received beam and may provide this information, along with beam identification and position, to the server for inclusion in the crowdsourced beam relation database. Narrow beams may be given a higher weight for positioning than wider beams, e.g., because the narrow beams will provide more precise position information.

The UE 105 may determine the beam width of received beams, e.g., based on the number of beams transmitted by a base station as determined from the SSB-InBurstPosition IE from each base station 110. For example, at any position, the UE 105 may see multiple cells. Each cell is allowed a maximum number of downlink beams that can be transmitted, which are based on the frequency of operation. For example, base stations 110 operating in a frequency range of less than 2.4 GHz may transmit up to 4 beams, while base stations 110 operating in a frequency range of less than 6 GHz may transmit up to 8 beams, and base stations 110 operating in the FR2 frequency range, e.g., greater than 24 GHz, may transmit up to 64 beams.

Base stations 110, however, are not required to transmit at their maximum number of beams. The SSB-PositionsIn-Burst IE from the System Information Block (SIB) transmitted by the base stations 110 may be used to determine the actual number of beams used by a specific base station 110. For example, the SSB-PositionsInBurst IE may indicate the beams transmitted by the base station as a bit map, e.g., such as "1110" for a low-band base station, and "11110000" for a mid-band base station thereby indicating transmission of 3 beams and 4 beams respectively. Using this information, the UE 105 may determine an approximate beam width of each beam. A higher number of beams employed by a base station 110, for example, indicates that each beam transmitted by the base station 110 is narrower than beams transmitted by a base station with a lower number of beams. The beam width, for example, may be estimated based on the estimated azimuth span divided by the number of beams formed in the horizontal plane, and may depend on the antenna opening as well, because beams will likely not have 360° coverage. Beam height may be similarly estimated based on estimated elevation span divided by the number of beams formed in the vertical direction. In some implementations, the UE 105 may represent the beam width of a beam simply as the actual number of beams transmitted by the base station, e.g., as indicated in the SSB-PositionsInBurst IE transmitted by the base station 110.

Additionally, a UE 105 may generate angular measurements of the beam, such as the Angle of Arrival (AoA) of the receive Rx beam used by the UE 105 to receive the DL beam or the Angle of Departure (AoD) of the Tx beam from the base station, which may provide, e.g., the DL beam arrival direction. For example, the UE 105 may measure the angle at which a DL beam from a base station is received by the UE 105, e.g., using AoA based on a measure orientation of the UE 105 (e.g., determined from inertial sensors, such as magnetometers, gyroscopes, accelerometers, etc.) or using AoD. The angular measurement for a DL beam may be included in the report of beam identification and position (e.g., associated with the beam ID and cell ID). The server 152 may include the angular measurement in the crowdsourced beam relation database. Inclusion of the angular measurement in the beam relation database may be used, e.g., for the selection of the measurement objects (for any positioning method) that needs to be measured when only a limited number of measurement objects from the assistance data can be measured before a timeout period. Additionally, by providing the angular measurement information to a UE 105 in a beam relation database, the UE 105 may select measurement objects, e.g., cells and beams, for measurement that would provide good geometric dilution of precision (GDOP).

Figure 7:
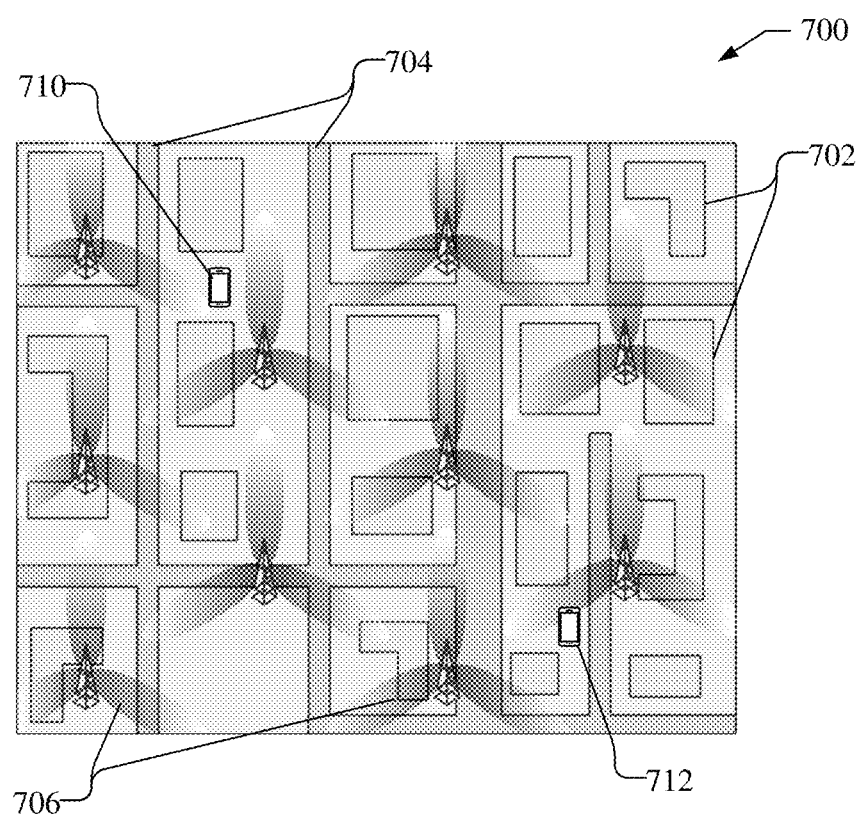
FIG. 7 illustrates a geographic area with an overlaid fingerprint of beams produced by base stations.

FIG. 7, by way of example, illustrates a geographic area 700 including a number of buildings 702 and streets 704, and a number of base stations 110. Laid over the geographic area 700 is a fingerprint of beams 706 that may be received at each location of the geographic area 700, illustrated as shaded beams from each base station 110. UEs 710 and 712, for example, may crowdsource the different beams from different base stations 110 using beam ID and cell ID for received beams and measured positions of the UEs, in order to build the crowdsourced beam relation database. The UEs 710 and 712 may further associate measured parameters, such as RSRP or RSRQ values and a metric of beam widths with each beam as well. Once the crowdsourced beam relation database is formed, UEs 710 and 712 (or other UEs not shown) may determine their position within the geographic area 700 based on the identification of beams that are received at a particular location, as well as any additional measured parameters, e.g., RSRP, RSRQ, beam width, etc. While FIG. 7 illustrates a sample case of symmetric and equal number of beams, in practice, the deployment of base stations 110, the number of beams, the beam widths of each beam will not be symmetric.

The crowdsourced beam relation database may be used for UE based positioning. For example, the UE 105 may download the crowdsourced beam relation database, or a portion thereof, from the server 152 as part of the positioning session, e.g., as assistance data. The UE 105 may receive a plurality of beams from one or more base stations and determine identifiers for the subset of received beams, e.g., cell ID and beam ID, which may be compared to the crowdsourced beam relation database to determine a position associated with the matching subset of received beams, which is the UE position. Thus, the position of the UE 105 may be determined using identifiers of beams without requiring more complex measurements, such as RSTD, RTT, Rx-Tx, etc.

In another implementation, the crowdsourced beam relation database may be used for UE assisted positioning. For example, the UE 105 may receive a plurality of beams from one or more base stations and determine identifiers for the subset of received beams, e.g., cell ID and beam ID, which the UE may report to a location server 152 during the positioning session. The location server may compare the identifiers for the subset of received beams to the crowdsourced beam relation database to determine a position associated with the matching subset of received beams, which is the UE position.

In one implementation, the crowdsourced beam relation database may be used to generate a position fix for a UE 105, e.g., based on the identification of cells and the subset of beams that the UE 105 is able to receive. For example, a set of cell ID and beam ID pairs for beams received by the UE 105 may be compared to crowdsourced beam relation database to find a matching set of cell ID and beam ID pairs for beams, and the position associate with the matching set in the crowdsourced beam relation database may be determined as the position of the UE 105. In some implementations, additional parameters, such as RSRP, or RSRQ, may be measured and used in conjunction with the identification of the received beams to determine a position of the UE 105.

In one implementation, the crowdsourced beam relation database may be used by the location server 152 to obtain an initial estimation of the position of the UE 105, which may be significantly better than simply using a serving cell ID. The location server 152 may use the initial estimation. Additionally, the crowdsourced beam relation database may be used to generate assistance data for the UE 105 during a positioning session. Due to the use of a relatively accurate initial estimation of position, assistance data generated in this manner will have better geometric dilution of precision (GDOP) than conventionally generated assistance data. Moreover, the assistance data generated using the crowdsourced beam relation database may include only measurement objects, e.g., cells and beams, that are known to be discoverable at the current position of the UE 105.

In another implementation, the crowdsourced beam relation database may be used by UE 105 itself on assistance data received by the UE 105. For example, the UE 105 may use the crowdsourced beam relation database to filter relevant measurement objects from a number of measurement objects that may be specified in assistance data received by the UE 105. For example, the UE may identify relevant measurement objects in assistance data based on relationships identified in the crowdsourced beam relation database for the current serving cell and beam ID received by the UE 105 and other cells and beam IDs. In other words, the crowdsourced beam relation database will identify cells and beam IDs that may be detectable along with the UE's 105 current serving cell and beam ID, which the UE 105 may then use to identify relevant measurement objects in received assistance data.

Figure 8:
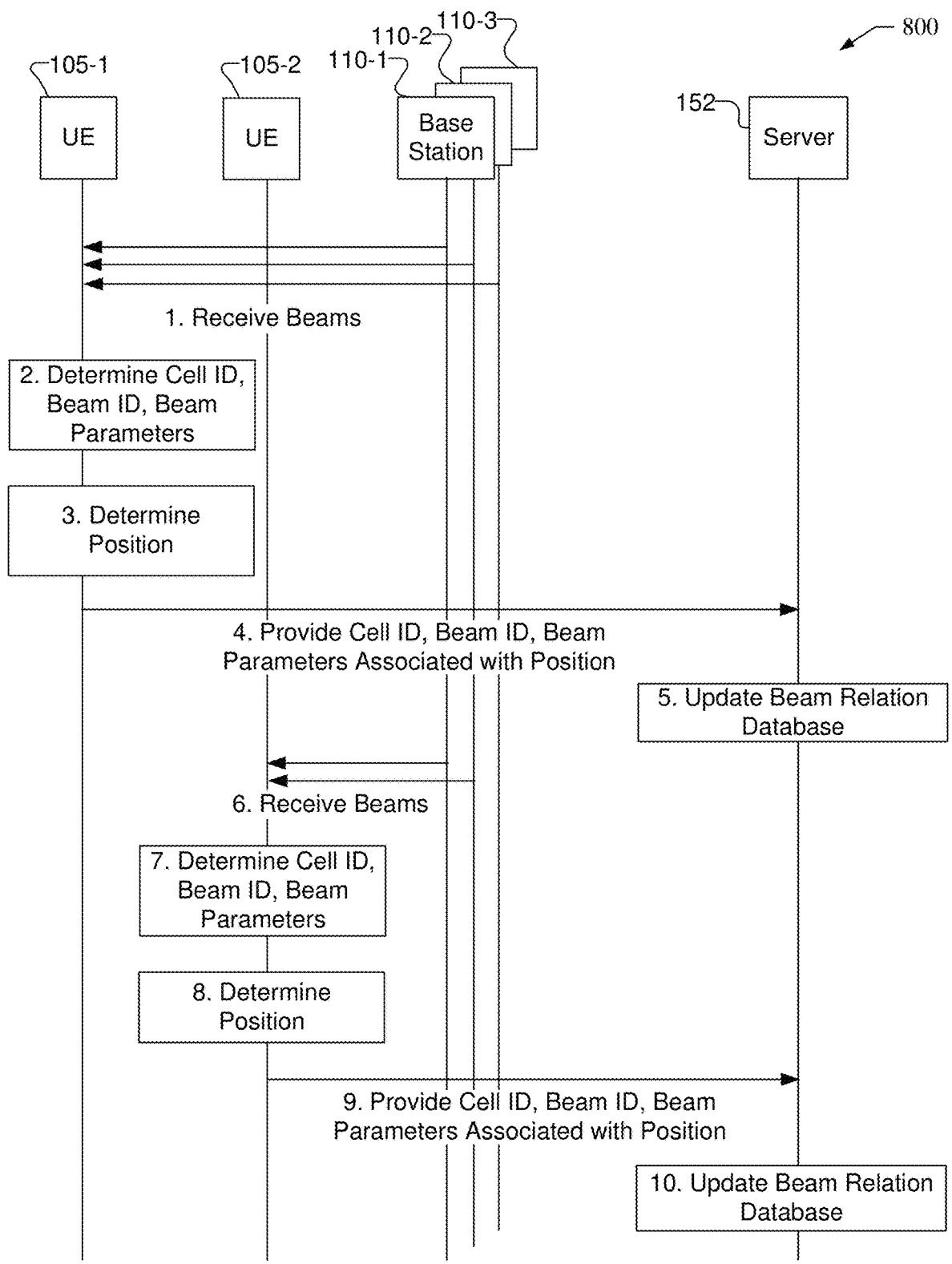
FIG. 8 is a message flow illustrating the messaging between the server, base stations, and UEs for generation of a crowdsourced beam relation database.

FIG. 8 is a message flow 800 illustrating the messaging between the server 152, base stations 110, and UEs 105-1 and 105-2 (sometimes collectively referred to as UEs 105) for generation of a crowdsourced beam relation database. The base stations may include a serving base station 110-1 and neighboring base stations 110-2 and 110-3, which are collectively referred to as base stations 110. The base stations 110 transmit beams, e.g., using beamforming, as well as identifiers of the beams, e.g., beam ID and cell ID. The base stations 110, for example, may be gNBs. Other types of beam stations, that transmit beams, may be used if desired. While two UEs 105-1 and 105-2 are illustrated in FIG. 8, it should be understood that many additional UEs may be used for crowdsourcing.

At stage 1 in FIG. 8, UE 105-1 receives beams transmitted by base stations 110-1, 110-2, and 110-3. As discussed above, the beams are transmitted by base stations 110 using beam forming. The base stations 110 further transmit identification of each beam, including a cell ID and beam ID, e.g., either in each beam itself, or in scheduling information.

At stage 2, the UE 105-1 determines the cell ID and beam ID for each received beam. The cell ID and beam ID, for example, may be included in the beam transmission or scheduling information. The cell ID, for example, may be the unique global cell ID and the beam ID is the SSB index provided in the cell SIB. As discussed above in reference to FIG. 6, the UE 105-1 may detect several beams transmitted by each base station 110. The UE 105-1 may measure one or more parameters of each beam, e.g., the RSRP, RSRQ, SINR, or a combination thereof, and may compare the measured parameter to a predetermined threshold to determine whether each beam should be included in the crowdsourced beam relation database. The UE 105-1 may further determine an estimate of the beam width, e.g. based on the number of beams transmitted by the base station, as indicated in the SSB-PositionsInBurst IE from the SIB transmitted by the base stations 110. The UE 105-1 may further determine the AoA of the received beams.

At stage 3, the UE 105-1 may determine the position of the UE 105-1 at the time of reception of the beams transmitted at stage 1. The position of the UE may be determined based on measurements of signals received from a satellite positioning system (SPS) such as GPS/GNSS, a cellular network, a WiFi network, a wireless personal area network (WPAN) (e.g., Bluetooth) network, sensors measurements, or any combinations thereof. Additionally, or alternatively, the position of the UE 105-1 may be determined using cellular location technology. For example, the UE 105-1 may perform positioning measurements using reference signals transmitted by the base stations 110, e.g., at stage 1 or separately transmitted (not shown). For example, the UE 105-1 may perform RSTD, Rx-Tx, TOA, DL AoD or other similar positioning measurements, which may be used for TDOA, Multi-RTT, DL AoD positioning methods, which may be UE based or UE assisted.

At stage 4, the UE 105-1 provides to the server 152 the position of the UE 105-1 as determined at stage 3 and identification of the received beams, e.g. cell ID and beam ID pairs, as determined at stage 2 associated with the UE position. The UE 105-1 may further provide measured parameters, such as RSRP, RSRQ, of each beam and may further provide an estimated beam width and/or AoA of each beam.

At stage 5, the server 152 updates the beam reference database using the information provided by the UE 105-1 at stage 4. The UE 105-1 may provide multiple sets of beam identification and associated position to the server 152. Moreover, other UEs, such as UE 105-2 may similarly provide the identification of received beams (and any measured parameters) associated position to the server 152, e.g., as illustrated by stages 6-10.

For example, at stage 6, UE 105-2 receives beams transmitted by base stations 110-1 and 110-2. It should be noted that UE 105-2 may be at a different location than UE 105-2 and thus may receive beams from a different set of base stations than received by UE 105-1 in stage 1. Moreover, while both UEs 105-1 and 105-2 receive beams from base stations 110-1 and 110-2 in stages 1 and 6, the UEs 105-1 and 105-2 may receive a different subset of beams from each of the base stations. As discussed above, the beams are transmitted by base stations 110 using beam forming. The base stations 110 further transmit identification of each beam, including a cell ID and beam ID, e.g., either in each beam itself, or in scheduling information.

At stage 7, the UE 105-2 determines the cell ID and beam ID for each received beam. The cell ID and beam ID, for example, may be included in the beam transmission or scheduling information. As discussed above in reference to FIG. 6, the UE 105-2 may detect several beams transmitted by each base station 110. The UE 105-2 may measure one or more parameters of each beam, e.g., the RSRP, RSRQ, SINR, or a combination thereof, and may compare the measured parameter to a predetermined threshold to determine whether each beam should be included in the crowdsourced beam relation database. The UE 105-2 may further determine an estimate of the beam width, e.g. based on the number of beams transmitted by the base station, as indicated in the SSB-PositionslnBurst IE from the SIB transmitted by the base stations 110. The UE 105-2 may further determine the AoA of the received beams.

At stage 8, the UE 105-2 may determine the position of the UE 105-2 at the time of reception of the beams transmitted at stage 6. The position of the UE may be determined based on measurements of signals received from a satellite positioning system (SPS) such as GPS/GNSS, a cellular network, a WiFi network, a wireless personal area network (WPAN) (e.g., Bluetooth) network, sensors measurements, or any combinations thereof. Additionally, or alternatively, the position of the UE 105-2 may be determined using cellular location technology, as discussed above. The UE 105-2 need not determine its position in the same manner 105-1.

At stage 9, the UE 105-2 provides to the server 152 the position of the UE 105-2 as determined at stage 8 and identification of the received beams, e.g. cell ID and beam ID pairs, as determined at stage 7 associated with the UE position. The UE 105-2 may further provide measured parameters, such as RSRP, RSRQ, of each beam and may further provide an estimated beam width and/or AoA of each beam.

At stage 10, the server 152 updates the beam reference database using the information provided by the UE 105-2 at stage 9. The UEs 105-1 and 105-2, and additional UEs may provide sets of beam identification and associated position to the server 152 to build up the beam relation database.

Figure 9:
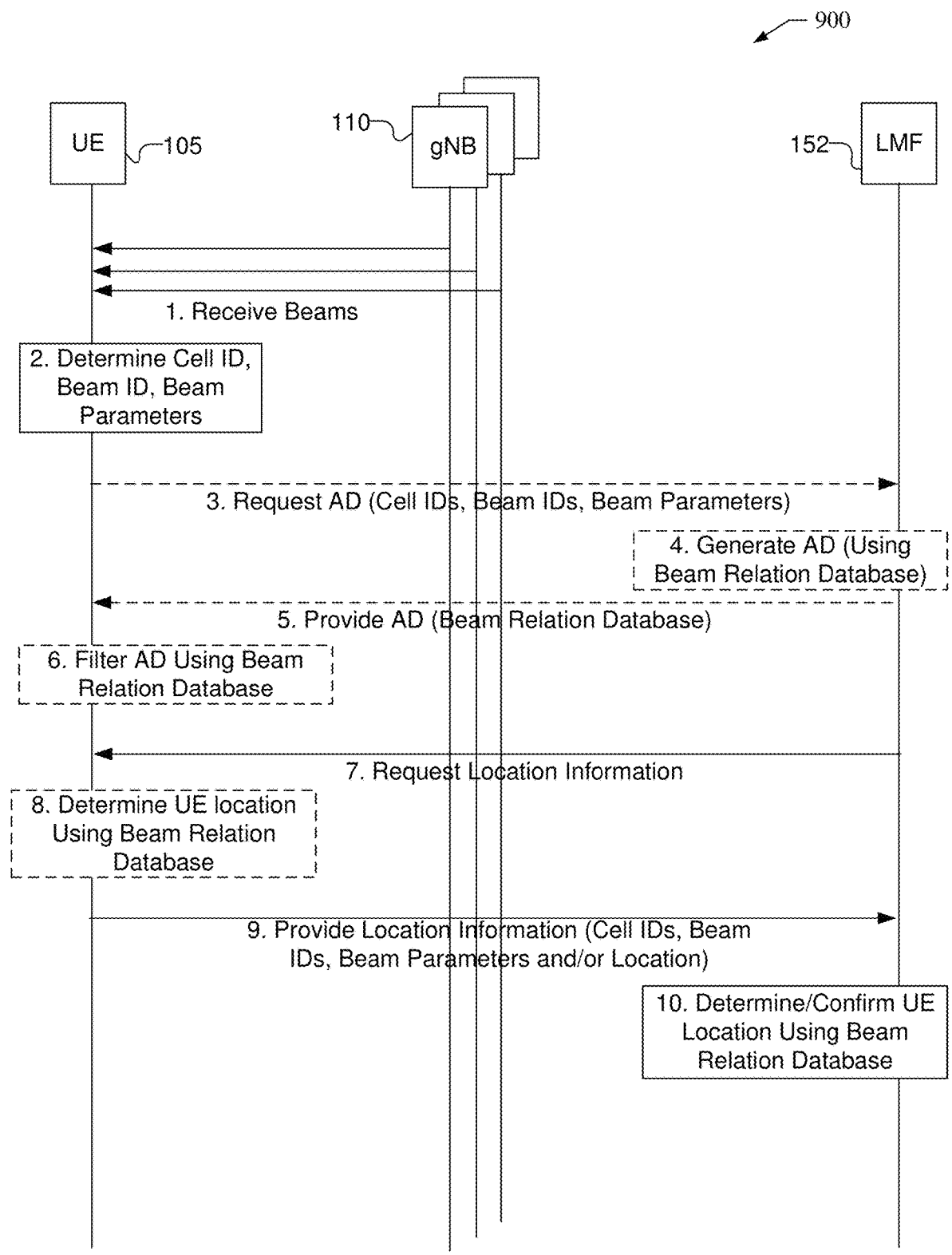
FIG. 9 is a message flow illustrating the messaging between the server, base stations, and UE for using a crowdsourced beam relation database to assist in positioning.

FIG. 9 is a message flow 900 illustrating the messaging between the server 152, base stations 110, and UE 105 for using a crowdsourced beam relation database to assist in positioning. The base stations may include a serving base station 110-1 and neighboring base stations 110-2 and 110-3, which are collectively referred to as base stations 110. The base stations 110 transmit beams, e.g., using beamforming, as well as identifiers of the beams, e.g., beam ID and cell ID. The base stations 110, for example, may be gNBs. Other types of beam stations, that transmit beams, may be used if desired. A number of stages illustrated in FIG. 9 may be optional and may be included/used in various combinations. Additional, different, or fewer messages that shown in message flow 900 may be used for positioning. For example, additional messages may be used to initiate and end the positioning session, e.g., in a Mobile Terminating Location Request (MT-LR) or a Mobile Originated Location Request (MO-LR), or periodic or triggered positioning procedures.

At stage 1 in FIG. 9, UE 105 receives beams transmitted by base stations 110-1, 110-2, and 110-3. As discussed above, the beams are transmitted by base stations 110 using beam forming. The base stations 110 further transmit identification of each beam, including a cell ID and beam ID, e.g., either in each beam itself, or in scheduling information.

At stage 2, the UE 105 determines the cell ID and beam ID for each received beam. The cell ID and beam ID, for example, may be included in the beam transmission or scheduling information. The cell ID, for example, may be the unique global cell ID and the beam ID is the SSB index provided in the cell SIB. As discussed above in reference to FIG. 6, the UE 105 may detect several beams transmitted by each base station 110. The UE 105 may measure one or more parameters of each beam, e.g., the RSRP, RSRQ, SINR, or a combination thereof, and may compare the measured parameter to a predetermined threshold to determine whether each beam should be used with the crowdsourced beam relation database. The UE 105 may further determine an estimate of the beam width, e.g. based on the number of beams transmitted by the base station, as indicated in the SSB-PositionslnBurst IE from the SIB transmitted by the base stations 110. The UE 105 may further determine the AoA of the received beams.

At optional stage 3, the UE 105 provide the location server 152 an identification of the received beams, e.g. cell ID and beam ID pairs, as determined at stage 2. By way of example, the UE 105 may provide the identification of received beams to the location server in a request for assistance data message, but other types of messages may be used if desired, e.g., including a provide capabilities message. The UE 105 may further provide measured parameters, such as RSRP, RSRQ, of each beam and may further provide an estimated beam width and/or AoA of each beam.

At optional stage 4, the location server 152 may generate positioning assistance data (AD) for the UE 105. The assistance data may include assistance data for the serving base station 110-1 and neighbor base station 110-2, 110-3, and any other base stations that may be detected at the estimated position of the UE 105. The assistance data may include configuration information for reference signals, e.g., PRS, transmitted by the base stations 110 for one or more positioning methods. In some implementations, the location server 152 may use a crowdsourced beam relation database and the beam information provided by the UE 105 at stage 3. For example, the location server 152 may use the beam information provided by the UE 105 to find an approximate position of the UE 105 based on the crowdsourced beam relation database. The location server 152 may produce assistance data based on the estimated position. Due to the use of a relatively accurate initial estimation of position, the assistance data generated in this manner will have better geometric dilution of precision (GDOP) than conventionally generated assistance data. In some implementations, the location server 152 may additionally determine measurement objects, e.g., cells and beams, that are known to be discoverable at the current position of the UE 105 using the crowdsourced beam relation database.

At optional stage 5, the location server 152 provides assistance data to the UE 105. In some implementations, the assistance data may include the crowdsourced beam relation database or at least a portion of the crowdsourced beam relation database that may be relevant to the UE 105, e.g., based on an initial estimate of the position of the UE 105, which may be determined using the crowdsourced beam relation database and beam information for beams received by the UE 105 or determined in other manners such as simply based on the serving cell ID. In some implementations, the assistance data itself may be generated by the location server 152 using the crowdsourced beam relation database as discussed in stage 4. In some implementations, the assistance data may be generated using the crowdsourced beam relation database and may additionally include at least a portion of the crowdsourced beam relation database.

At optional stage 6, the UE 105 may filter the assistance data received in stage 5 using the crowdsourced beam relation database. In some implementations, the crowdsourced beam relation database (or at least a portion thereof) may be received in the assistance data or may have been previously received and stored in UE 105. The UE 105, for example, may identify relevant measurement objects in the assistance data based on relationships identified in the crowdsourced beam relation database using beam information determined at stage 2. If the location server 152 filtered the assistance data using the crowdsourced beam relation database at stage 4, it may be unnecessary for the UE 105 to filter the assistance data at stage 6. In some implementations, however, the location server 152 may coarsely filter the assistance data at stage 4 and the UE 105 may more finely filter the assistance data at stage 6.

At stage 7, the location server 152 may send a Request for Location Information message to the UE 105 to request positioning information. In implementations where the UE 105 already provided beam information determined at stage 2 to the location server 152, the Request for Location Information may be a request for reference signals (e.g., PRS) measurements, such as RSTD, RSRP, Rx-Tx, etc., for TDOA, Multi-RTT, AoD, etc., obtained using the received assistance data from stages 4 and 5, or a position estimate determined therefrom by the UE 105 (which are not shown in FIG. 9). In other implementations, the Request for Location Information may be a request for location information for UE based or UE assisted positioning using the beam information for beams received by the UE 105 and the crowdsourced beam relation database.

At optional stage 8, the UE 105 may determine a UE location using the beam information determined at stage 2 and the crowdsourced beam relation database received with assistance data in stage 5 or previously received and stored in UE 105. For example, the UE 105 may use the beam information for received beams, e.g., the cell ID and beam ID pairs for received beams, to find a matching set of beams in the crowdsourced beam relation database, and the position associated with the matching set of beams in the crowdsourced beam relation database may be determined as the estimated position of the UE 105. In some implementations, additional parameters, such as RSRP, or RSRQ, may be measured and used in conjunction with the identification of the received beams to determine a position of the UE 105. Additionally, the beam width of beams, or equivalently the number of beams, if determined in stage 2, may be used. For example, the UE 105 may weigh measurements from beams from a base station 110 that has a higher beam count (i.e., narrower beams) more than measurements from beams from a base station with a lower beam count (i.e., wider beams).

At stage 9, the UE 105 sends a Provide Location Information message to the LMF 152, which may include an identification of the received beams, e.g. cell ID and beam ID pairs and any additional measured parameters, such as RSRP, RSRQ, beam width and/or AoA of each beam, as determined at stage 2, or a position estimate determined using the crowdsourced beam relation database in stage 8, or a combination thereof.

At stage 10, the location server 152 may determine (or verify) the UE location using the received location information from stage 9 using the crowdsourced beam relation database. For example, the location server 152 may use the beam information for received beams, e.g., the cell ID and beam ID pairs for received beams, to find a matching set of beams in the crowdsourced beam relation database, and the position associated with the matching set of beams in the crowdsourced beam relation database may be determined as the estimated position of the UE 105. In some implementations, additional parameters, such as RSRP, RSRQ, beamwidth/beam count, AoA, or a combination thereof, if received, may be used in conjunction with the identification of the received beams to determine a position of the UE 105.

Figure 10:
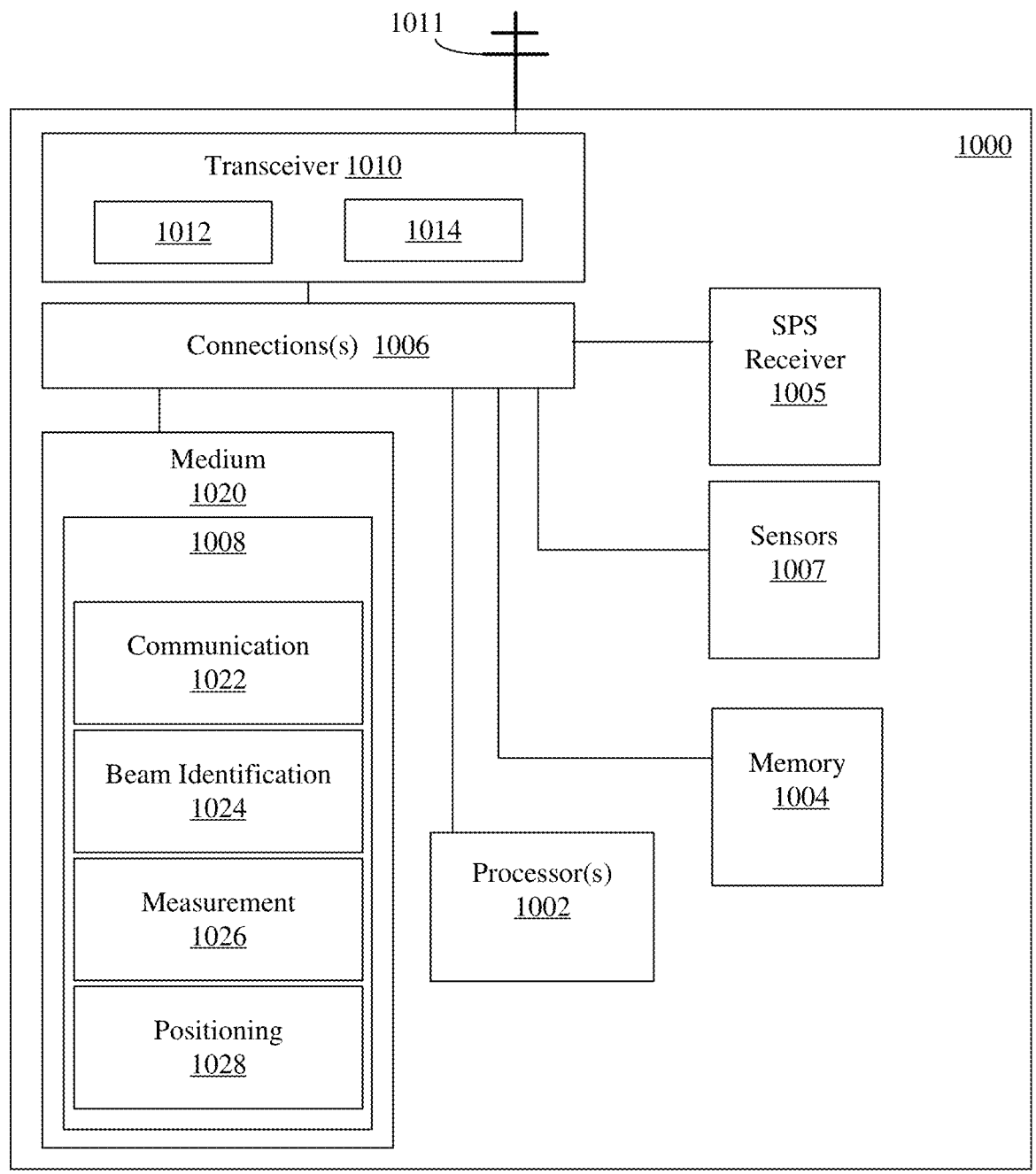
FIG. 10 shows a schematic block diagram illustrating certain exemplary features of a UE configured to support generation and use of crowdsourced beam relation database.

FIG. 10 shows a schematic block diagram illustrating certain exemplary features of a UE 1000, e.g., which may be UE 105, and configured to support generation and use of a crowdsourced beam relation database for positioning, as described herein. The UE 1000 may be configured to perform the process flows shown in FIGS. 12 and 14. UE 1000 may, for example, include at least one processor 1002, memory 1004, an SPS receiver 1005, sensors 1007, an external interface such as a transceiver 1010 (e.g., wireless network interface), which may be operatively coupled with one or more connections 1006 (e.g., buses, lines, fibers, links, etc.) to non-transitory computer readable medium 1020 and memory 1004. The sensors 1007, for example, may be one or more sensors such as accelerometers, gyroscopes, magnetometers, barometers, etc., which may be used to assist in positioning (such as using dead reckoning) including the determination of the orientation of the UE 1000, e.g., with respect to a global coordinate system. The UE 1000 may further include additional items, which are not shown, such as a user interface that may include e.g., a display, a keypad or other input device, such as virtual keypad on the display, through which a user may interface with the UE. In certain example implementations, all or part of UE 1000 may take the form of a chipset, and/or the like. Transceiver 1010 may, for example, include a transmitter 1012 enabled to transmit one or more signals over one or more types of wireless communication networks and a receiver 1014 to receive one or more signals transmitted over the one or more types of wireless communication networks.

In some embodiments, UE 1000 may include antenna 1011, which may be internal or external. UE antenna 1011 may be used to transmit and/or receive signals processed by transceiver 1010. In some embodiments, UE antenna 1011 may be coupled to transceiver 1010. In some embodiments, measurements of signals received (transmitted) by UE 1000 may be performed at the point of connection of the UE antenna 1011 and transceiver 1010. For example, the measurement point of reference for received (transmitted) RF signal measurements may be an input (output) terminal of the receiver 1014 (transmitter 1012) and an output (input) terminal of the UE antenna 1011. In a UE 1000 with multiple UE antennas 1011 or antenna arrays, the antenna connector may be viewed as a virtual point representing the aggregate output (input) of multiple UE antennas. In some embodiments, UE 1000 may measure received signals including signal strength and TOA measurements and the raw measurements may be processed by the at least one processor 1002.

The at least one processor 1002 may be implemented using a combination of hardware, firmware, and software. For example, the at least one processor 1002 may be configured to perform the functions discussed herein by implementing one or more instructions or program code 1008 on a non-transitory computer readable medium, such as medium 1020 and/or memory 1004. In some embodiments, the at least one processor 1002 may represent one or more circuits configurable to perform at least a portion of a data signal computing procedure or process related to the operation of UE 1000.

The medium 1020 and/or memory 1004 may store instructions or program code 1008 that contain executable code or software instructions that when executed by the at least one processor 1002 cause the at least one processor 1002 to operate as a special purpose computer programmed to perform the techniques disclosed herein. As illustrated in UE 1000, the medium 1020 and/or memory 1004 may include one or more components or modules that may be implemented by the at least one processor 1002 to perform the methodologies described herein. While the components or modules are illustrated as software in medium 1020 that is executable by the at least one processor 1002, it should be understood that the components or modules may be stored in memory 1004 or may be dedicated hardware either in the at least one processor 1002 or off the processors. A number of software modules and data tables may reside in the medium 1020 and/or memory 1004 and be utilized by the at least one processor 1002 in order to manage both communications and the functionality described herein. It should be appreciated that the organization of the contents of the medium 1020 and/or memory 1004 as shown in UE 1000 is merely exemplary, and as such the functionality of the modules and/or data structures may be combined, separated, and/or be structured in different ways depending upon the implementation of the UE 1000.

The medium 1020 and/or memory 1004 may include a communication module 1022 that when implemented by the at least one processor 1002 configures the at least one processor 1002 to transmit and receive, via transceiver 1010, communications, including receiving one or more radio beams transmitted by base stations.

The medium 1020 and/or memory 1004 may include a beam identification module 1024 that when implemented by the at least one processor 1002 configures the at least one processor 1002 to determining a cell identifier (ID) and a beam ID for each of the radio beams received from base stations. The beam identification, for example, may be in the beams or in scheduling information provided by the base stations to the UE.

The medium 1020 and/or memory 1004 may include a measurement module 1026 that when implemented by the at least one processor 1002 configures the at least one processor 1002 to determine one or more signal based parameters for each radio beams, such as RSRP, RSRQ, SINR, etc. The at least one processor 1002 may be configured to compare measured parameters to a predetermined threshold, e.g., where beams with measured parameter(s) that exceed the predetermined beam are considered received by the UE 1000. The at least one processor 1002 may be further configured to determine the beam width of each received beam, e.g. based on the number of beams transmitted by a base station, as discussed herein. The at least one processor 1002 may be further configured to determine an angular measurement of each beam, such as the angle of transmission of the beam e.g., using an AoA or AoD measurements. For example, the angle at which the beam arrives at the UE 1000, which may be determined using the phase difference of a received beam at multiple antennas in an antenna array 1011, and the orientation of the UE 1000 at the time of reception of the beam, which may be determined using sensors 1007.

The medium 1020 and/or memory 1004 may include a positioning module 1028 that when implemented by the at least one processor 1002 configures the at least one processor 1002 to determine a position of the UE 105, e.g., based on a satellite positioning system (GNSS) using the SPS receiver 1005, and/or based on cellular location technology using the wireless transceiver 1010. The at least one processor 1002 may be further configured to communicate with a remote server, via wireless transceiver 1010, and to provide the cell ID and beam ID for each received radio beam, as well as any measured parameters for each beam, associated with a determined position of the UE. The at least one processor 1002 may be further configured to determine a position of the UE based on the cell ID and the beam ID for each of the plurality of radio beams using a crowdsourced beam relation database that comprises a plurality of positions associated with cell IDs and beam IDs for radio beams. For example, the at least one processor 1002 may be configured to report the cell ID and the beam ID for each of the plurality of radio beams to a server that estimates the position of the UE using the crowdsourced beam relation database or to determine the position of the UE by receiving the crowdsourced beam relation database from a server and estimating the position of the UE using the crowdsourced beam relation database received from the server. The at least one processor 1002 may be configured to receive, via wireless transceiver 1010 the crowdsourced beam relation database from a server and to receive positioning assistance data that includes a number of measurement objects from one or more servers. The at least one processor 1002 may be configured to determine relevant measurement objects in the positioning assistance data using a relationship between the cell ID and the beam ID determined for each of the plurality of radio beams and the plurality of positions associated with cell IDs and beam IDs for radio beams provided in the crowdsourced beam relation database.

The methodologies described herein may be implemented by various means depending upon the application. For example, these methodologies may be implemented in hardware, firmware, software, or any combination thereof. For a hardware implementation, the at least one processor 1002 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1020 or memory 1004 that is connected to and executed by the at least one processor 1002. Memory may be implemented within the at least one processor or external to the at least one processor. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1008 on a non-transitory computer readable medium, such as medium 1020 and/or memory 1004. Examples include computer readable media encoded with a data structure and computer readable media encoded with a computer program 1008. For example, the non-transitory computer readable medium including program code 1008 stored thereon may include program code 1008 to support positioning with a crowdsourced beam relation database in a manner consistent with disclosed embodiments. Non-transitory computer readable medium 1020 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1008 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1020, instructions and/or data may be provided as signals on transmission media included in a communication apparatus. For example, a communication apparatus may include a transceiver 1010 having signals indicative of instructions and data. The instructions and data are configured to cause at least one processor to implement the functions outlined in the claims. That is, the communication apparatus includes transmission media with signals indicative of information to perform disclosed functions.

Memory 1004 may represent any data storage mechanism. Memory 1004 may include, for example, a primary memory and/or a secondary memory. Primary memory may include, for example, a random access memory, read only memory, etc. While illustrated in this example as being separate from at least one processor 1002, it should be understood that all or part of a primary memory may be provided within or otherwise co-located/coupled with the at least one processor 1002. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1020. As such, in certain example implementations, the methods and/or apparatuses presented herein may take the form in whole or part of a computer readable medium 1020 that may include computer implementable code 1008 stored thereon, which if executed by at least one processor 1002 may be operatively enabled to perform all or portions of the example operations as described herein. Computer readable medium 1020 may be a part of memory 1004.

Figure 11:
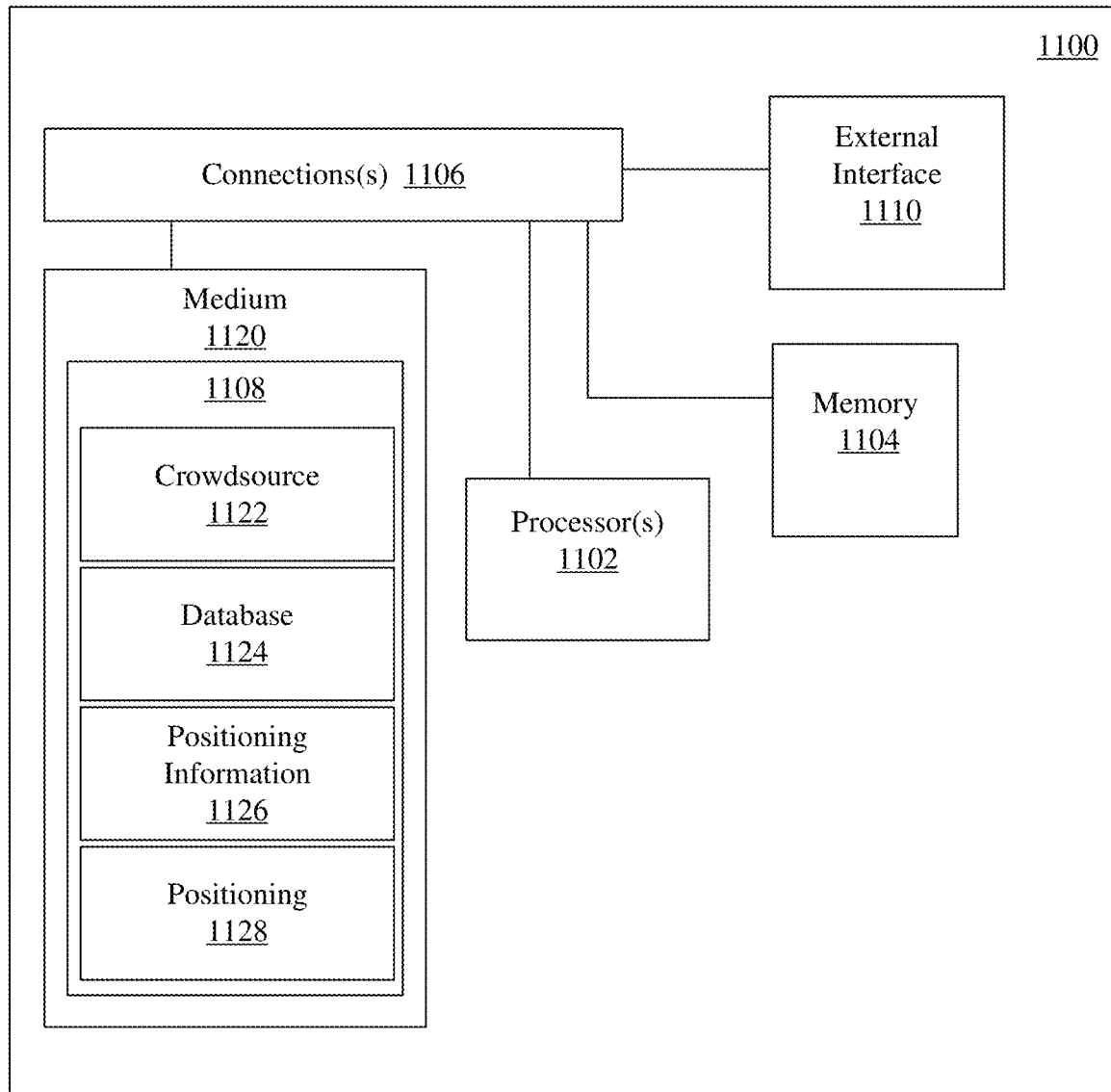
FIG. 11 shows a schematic block diagram illustrating certain exemplary features of a server configured to support generation and use of crowdsourced beam relation database.

FIG. 11 shows a schematic block diagram illustrating certain exemplary features of a server 1100, e.g., which may a server 152, configured to support generation and use of crowdsourced beam relation database for positioning, as described herein. The server 1100 may be such as crowdsourced database server or a location server, such as LMF or may be another network entity, such as an E-SMLC or SLP. The server 1100, for example, may perform the process flows shown in FIGS. 13 and 15. Server 1100 may, for example, include at least one processor 1102, memory 1104, and a communications interface 1110 (e.g., wireline or wireless network interface to other network entities, such as core network entities and base stations), which may be operatively coupled with one or more connections 1106 (e.g., buses, lines, fibers, links, etc.) to non-transitory computer readable medium 1120 and memory 1104. The server 1100 may further include additional items, which are not shown, such as a user interface that may include e.g., a display, a keypad or other input device, such as virtual keypad on the display, through which a user may interface with the server. In certain example implementations, all or part of server 1100 may take the form of a chipset, and/or the like. The communications interface 1110 may be a wired or wireless interface capable of connecting to base stations in the RAN or network entities, such as an AMF or MME.

The at least one processor 1102 may be implemented using a combination of hardware, firmware, and software. For example, the at least one processor 1102 may be configured to perform the functions discussed herein by implementing one or more instructions or program code 1108 on a non-transitory computer readable medium, such as medium 1120 and/or memory 1104. In some embodiments, the at least one processor 1102 may represent one or more circuits configurable to perform at least a portion of a data signal computing procedure or process related to the operation of server 1100.

The medium 1120 and/or memory 1104 may store instructions or program code 1108 that contain executable code or software instructions that when executed by the at least one processor 1102 cause the at least one processor 1102 to operate as a special purpose computer programmed to perform the techniques disclosed herein. As illustrated in server 1100, the medium 1120 and/or memory 1104 may include one or more components or modules that may be implemented by the at least one processor 1102 to perform the methodologies described herein. While the components or modules are illustrated as software in medium 1120 that is executable by the at least one processor 1102, it should be understood that the components or modules may be stored in memory 1104 or may be dedicated hardware either in the at least one processor 1102 or off the processors. A number of software modules and data tables may reside in the medium 1120 and/or memory 1104 and be utilized by the at least one processor 1102 in order to manage both communications and the functionality described herein. It should be appreciated that the organization of the contents of the medium 1120 and/or memory 1104 as shown in server 1100 is merely exemplary, and as such the functionality of the modules and/or data structures may be combined, separated, and/or be structured in different ways depending upon the implementation of the server 1100.

The medium 1120 and/or memory 1104 may include a crowdsource module 1122 that when implemented by the at least one processor 1102 configures the at least one processor 1102 to receive from a plurality of UEs, via the external interface, a position of each UE associated with a cell identifier (ID) and a beam ID for each of a plurality of radio beams received by each UE at that position. Along with the cell ID and beam ID for each beam, the at least one processor 1102 may be configured to receive one or more signal based parameters measured for the radio beams, such as RSRP, RSRQ, or a combination thereof. Additionally, along with the cell ID and beam ID for each beam, the at least one processor 1102 may be configured to receive a beam width related parameter and/or an AoA for the radio beams.

The medium 1120 and/or memory 1104 may include a database module 1124 that when implemented by the at least one processor 1102 configures the at least one processor 1102 to store received beam information, such as the cell ID and beam ID pairs for each beam and any measured parameters such as RSRP, RSRQ, beam width parameters, and AoA, associated with position in a crowdsourced beam relation database, which may be maintained in medium 1120 or a separate storage medium.

The medium 1120 and/or memory 1104 may include a positioning information module 1126 that when implemented by the at least one processor 1102 configures the at least one processor 1102 to receive from the UE a position information message that includes a cell ID, and beam ID for each of a plurality of radio beams received by the UE. The at least one processor 1102 may further receive, via the external interface 1110, along with the cell ID and beam ID for each beam, one or more signal based parameters measured for the radio beams, such as RSRP, RSRQ, or a combination thereof. The at least one processor 1102 may further receive, via the external interface 1110, along with the cell ID and beam ID for each beam, a beam width related parameter for each beam and/or an AoA for the radio beams.

The medium 1120 and/or memory 1104 may include a positioning module 1128 that when implemented by the at least one processor 1102 configures the at least one processor 1102 to determine a position of the UE based on the cell ID and the beam ID for each of the plurality of radio beams using a crowdsourced beam relation database that comprises a plurality of positions associated with cell IDs and beam IDs for radio beams. The at least one processor 1102 may be configured to generate positioning assistance data for the UE based on an initial estimate of the position of the UE determined using the crowdsourced beam relation database and to send the assistance data to the UE, via the external interface 1110.

The methodologies described herein may be implemented by various means depending upon the application. For example, these methodologies may be implemented in hardware, firmware, software, or any combination thereof. For a hardware implementation, the at least one processor 1102 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1120 or memory 1104 that is connected to and executed by the at least one processor 1102. Memory may be implemented within the at least one processor or external to the at least one processor. As used herein the term "memory" refers to any type of long term, short term, volatile, non-volatile, or other memory and is not to be limited to any particular type of memory or number of memories, or type of media upon which memory is stored.

If implemented in firmware and/or software, the functions may be stored as one or more instructions or program code 1108 on a non-transitory computer readable medium, such as medium 1120 and/or memory 1104. Examples include computer readable media encoded with a data structure and computer readable media encoded with a computer program 1108. For example, the non-transitory computer readable medium including program code 1108 stored thereon may include program code 1108 to support positioning with a crowdsourced beam relation database in a manner consistent with disclosed embodiments. Non-transitory computer readable medium 1120 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1108 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1120, instructions and/or data may be provided as signals on transmission media included in a communication apparatus. For example, a communication apparatus may include an communications interface 1110 having signals indicative of instructions and data. The instructions and data are configured to cause at least one processor to implement the functions outlined in the claims. That is, the communication apparatus includes transmission media with signals indicative of information to perform disclosed functions.

Memory 1104 may represent any data storage mechanism. Memory 1104 may include, for example, a primary memory and/or a secondary memory. Primary memory may include, for example, a random access memory, read only memory, etc. While illustrated in this example as being separate from at least one processor 1102, it should be understood that all or part of a primary memory may be provided within or otherwise co-located/coupled with the at least one processor 1102. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1120. As such, in certain example implementations, the methods and/or apparatuses presented herein may take the form in whole or part of a computer readable medium 1120 that may include computer implementable code 1108 stored thereon, which if executed by at least one processor 1102 may be operatively enabled to perform all or portions of the example operations as described herein. Computer readable medium 1120 may be a part of memory 1104.

Figure 12:
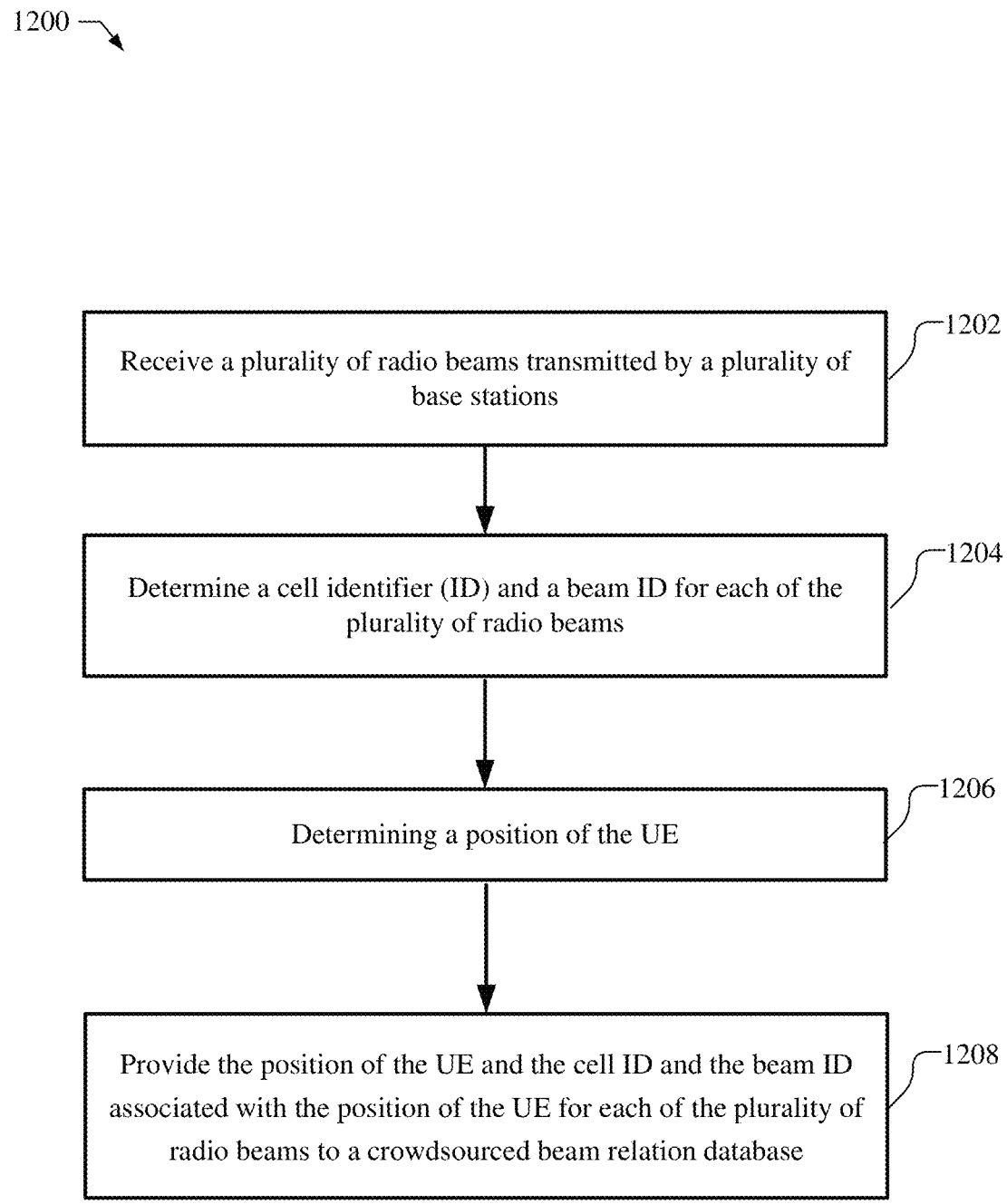
FIG. 12 shows a flowchart for an exemplary method for supporting location services performed by a UE including generation of a crowdsourced beam relation database.

FIG. 12 shows a flowchart for an exemplary method 1200 for supporting location services performed by a user equipment (UE), such as UE 105, in a manner consistent with disclosed implementations.

At block 1202, the UE may receive a plurality of radio beams transmitted by a plurality of base stations, e.g., as discussed at stage 1 in FIG. 8. A means for receiving a plurality of radio beams transmitted by a plurality of base stations may include the transceiver 1010 and at least one processor 1002 with dedicated hardware or implementing executable code or software instructions in memory 1004 and/or medium 1020, such as the communication module 1022 in UE 1000 shown in FIG. 10.

At block 1204, the UE may determine a cell identifier (ID) and a beam ID for each of the plurality of radio beams, e.g., as discussed at stage 2 in FIG. 8. A means for determining a cell identifier (ID) and a beam ID for each of the plurality of radio beams may include the transceiver 1010 and at least one processor 1002 with dedicated hardware or implementing executable code or software instructions in memory 1004 and/or medium 1020, such as the beam identification module 1024 in UE 1000 shown in FIG. 10.

At block 1206, the UE may determine a position of the UE, e.g., as discussed at stage 3 in FIG. 8. For example, the position of the UE may be determined based on measurements of signals received from a satellite positioning system (SPS) such as GPS or GNSS, a cellular network, a WiFi network, a wireless personal area network (WPAN) network, sensor measurements, or any combination thereof. A means for determining a position of the UE may include the transceiver 1010 and/or the SPS receiver 1005, and at least one processor 1002 with dedicated hardware or implementing executable code or software instructions in memory 1004 and/or medium 1020, such as the positioning module 1028 in UE 1000 shown in FIG. 10.

At block 1208, the UE may provide the position of the UE and the cell ID and the beam ID associated with the position of the UE for each of the plurality of radio beams to a crowdsourced beam relation database, e.g., as discussed at stage 4 in FIG. 8. For example, the cell ID and the beam ID associated with the position of the UE for each of the plurality of radio beams is provided to the crowdsourced beam relation database by sending a report to a remote server. A means for providing the position of the UE and the cell ID and the beam ID associated with the position of the UE for each of the plurality of radio beams to a crowdsourced beam relation database may include the transceiver 1010 and at least one processor 1002 with dedicated hardware or implementing executable code or software instructions in memory 1004 and/or medium 1020, such as the positioning module 1028 in UE 1000 shown in FIG. 10.

In one implementation, the UE may determine one or more signal based parameters for each of the plurality of radio beams, and providing the one or more signal based parameters with the cell ID and the beam ID associated with the position of the UE for each of the plurality of radio beams to the crowdsourced beam relation database, e.g., as discussed at stage 2 in FIG. 8. For example, the one or more signal based parameters for each of the plurality of radio beams may comprise at least one of Reference Signal Received Power (RSRP), Reference Signal Received Quality (RSRQ), or a combination thereof. A means for determining one or more signal based parameters for each of the plurality of radio beams, and providing the one or more signal based parameters with the cell ID and the beam ID associated with the position of the UE for each of the plurality of radio beams to the crowdsourced beam relation database may include the transceiver 1010 and at least one processor 1002 with dedicated hardware or implementing executable code or software instructions in memory 1004 and/or medium 1020, such as the measurement module 1026 in UE 1000 shown in FIG. 10.

In one implementation, the UE may determine a beam width related parameter for each of the plurality of radio beams, and provide the beam width related parameter with the cell ID and the beam ID associated with the position of the UE for each of the plurality of radio beams to the crowdsourced beam relation database, e.g., as discussed at stages 2 and 4 in FIG. 8. A means for determining a beam width related parameter for each of the plurality of radio beams, and means for providing the beam width related parameter with the cell ID and the beam ID associated with the position of the UE for each of the plurality of radio beams to the crowdsourced beam relation database may include the transceiver 1010 and at least one processor 1002 with dedicated hardware or implementing executable code or software instructions in memory 1004 and/or medium 1020, such as the measurement module 1026 and the positioning module 1028 in UE 1000 shown in FIG. 10.

In one implementation, the UE may determine an angular measurement parameter for each of the plurality of radio beams, and provide the angular measurement parameter with the cell ID and the beam ID associated with the position of the UE for each of the plurality of radio beams to the crowdsourced beam relation database, e.g., as discussed at stages 2 and 4 in FIG. 8. For example, the angular measurement parameter may be determined using AoA or AoD. A means for determining an angular measurement parameter for each of the plurality of radio beams, and means for providing the angular measurement parameter with the cell ID and the beam ID associated with the position of the UE for each of the plurality of radio beams to the crowdsourced beam relation database may include the transceiver 1010, the sensors 1007, and at least one processor 1002 with dedicated hardware or implementing executable code or software instructions in memory 1004 and/or medium 1020, such as the measurement module 1026 and the positioning module 1028 in UE 1000 shown in FIG. 10.

In one implementation, the UE may measure a signal based parameter for each of the plurality of radio beams, e.g., as discussed at stage 2 in FIG. 8. For example, the signal based parameter for each of the plurality of radio beams may comprise at least one of Reference Signal Received Power (RSRP), Signal-to-Interference-plus-Noise Ratio (SINR), or a combination thereof. The UE may compare the signal based parameter for each of the plurality of radio beams to a predetermined threshold, e.g., as discussed at stage 2 in FIG. 8. The cell ID and the beam ID associated with the position of the UE for each of the plurality of radio beams that is provided by the UE may comprise the cell ID and the beam ID for each of the plurality of radio beams with the signal based parameter that exceed the predetermined threshold, e.g., as discussed at stage 4 in FIG. 8. A means for measuring a signal based parameter for each of the plurality of radio beams and means for comparing the signal based parameter for each of the plurality of radio beams to a predetermined threshold may include the transceiver 1010 and at least one processor 1002 with dedicated hardware or implementing executable code or software instructions in memory 1004 and/or medium 1020, such as the measurement module 1026 in UE 1000 shown in FIG. 10.

FIG. 13 shows a flowchart for an exemplary method 1300 for supporting location services performed by a server in a wireless network, such as server 152, in a manner consistent with disclosed implementations.

At block 1302, the server may receive from a UE a position of the UE a cell identifier (ID) and a beam ID associated with the position of the UE for each of a plurality of radio beams received by the UE, e.g., as discussed at stages 4 and 9 in FIG. 8. For example, the cell ID and the beam ID for each of the plurality of radio beams is from a radio beam with a measured signal based parameter that exceeds a predetermined threshold, wherein the measured signal based parameter for each of the plurality of radio beams comprises at least one of Reference Signal Received Power (RSRP), Signal-to-Interference-plus-Noise Ratio (SINR), or a combination thereof. For example, the position of the UE is determined based on measurements of signals from a Global Navigation Satellite System, a cellular network, a WiFi network, a wireless personal area network (WPAN) network, sensor measurements, or any combination thereof. A means for receiving from a UE a position of the UE and a cell identifier (ID) and a beam ID associated with the position of the UE for each of a plurality of radio beams received by the UE may include the external interface 1110 and at least one processor 1102 with dedicated hardware or implementing executable code or software instructions in memory 1104 and/or medium 1120, such as the database crowdsource module 1122 in server 1100 shown in FIG. 11.

At block 1304, the server may store the position and the cell ID and the beam ID associated with the position of the UE for each of the plurality of radio beams received by the UE in a crowdsourced beam relation database, e.g., as discussed at stages 5 and 10 in FIG. 8. A means for storing the position and the cell ID and the beam ID associated with the position of the UE for each of the plurality of radio beams received by the UE in a crowdsourced beam relation database may include the at least one processor 1102 with dedicated hardware or implementing executable code or software instructions in memory 1104 and/or medium 1120, such as the database module 1124 in server 1100 shown in FIG. 11.

In one implementation, the server may further receive with the cell ID and the beam ID from the UE one or more signal based parameters measured for each of the plurality of radio beams, and wherein the one or more signal parameters are stored with the cell ID and the beam ID for each of the plurality of radio beams in the crowdsourced beam relation database, e.g., as discussed at stages 4 and 9 in FIG. 8. For example, the one or more signal based parameters measured for each of the plurality of radio beams may comprise at least one of Reference Signal Received Power (RSRP), Reference Signal Received Quality (RSRQ), or a combination thereof. A means for receiving with the cell ID and the beam ID from the UE one or more signal based parameters measured for each of the plurality of radio beams, and wherein the one or more signal parameters are stored with the cell ID and the beam ID for each of the plurality of radio beams in the crowdsourced beam relation database may include the external interface 1110 and at least one processor 1102 with dedicated hardware or implementing executable code or software instructions in memory 1104 and/or medium 1120, such as the database crowdsource module 1122 in server 1100 shown in FIG. 11.

In one implementation, the server may further receive with the cell ID and the beam ID from the UE a beam width related parameter for each of the plurality of radio beams, and wherein the beam width related parameter is stored with the cell ID and the beam ID for each of the plurality of radio beams in the crowdsourced beam relation database, e.g., as discussed at stages 4 and 9 in FIG. 8. A means for receiving with the cell ID and the beam ID from the UE a beam width related parameter for each of the plurality of radio beams, and wherein the beam width related parameter is stored with the cell ID and the beam ID for each of the plurality of radio beams in the crowdsourced beam relation database may include the external interface 1110 and at least one processor 1102 with dedicated hardware or implementing executable code or software instructions in memory 1104 and/or medium 1120, such as the database crowdsource module 1122 in server 1100 shown in FIG. 11.

In one implementation, the server may receive with the cell ID and the beam ID from the UE an angular measurement parameter for each of the plurality of radio beams, and wherein the angular measurement parameter is stored with the cell ID and the beam ID for each of the plurality of radio beams in the crowdsourced beam relation database, e.g., as discussed at stages 4 and 9 in FIG. 8. A means for receiving with the cell ID and the beam ID from the UE an angular measurement parameter for each of the plurality of radio beams, and wherein the angular measurement parameter is stored with the cell ID and the beam ID for each of the plurality of radio beams in the crowdsourced beam relation database may include the external interface 1110 and at least one processor 1102 with dedicated hardware or implementing executable code or software instructions in memory 1104 and/or medium 1120, such as the database crowdsource module 1122 in server 1100 shown in FIG. 11.

Figure 14:
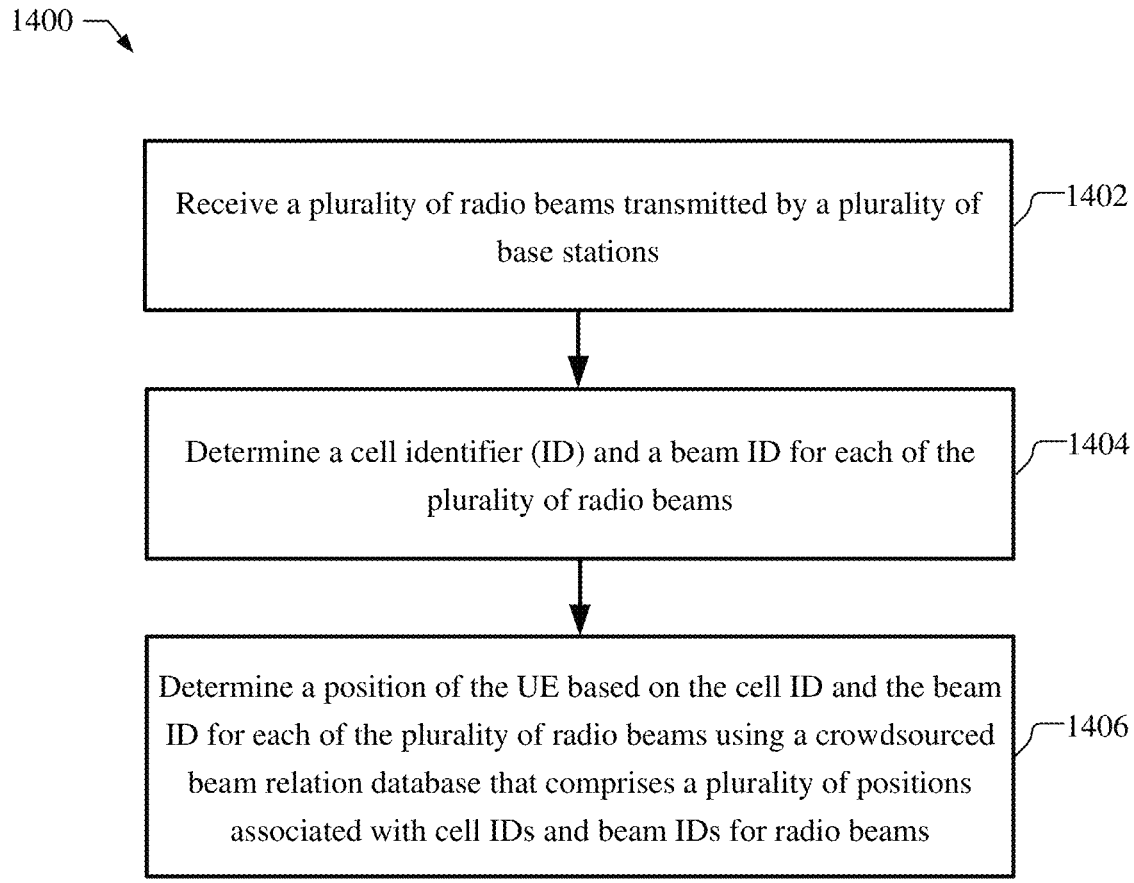
FIG. 14 shows a flowchart for an exemplary method for supporting location services performed by a UE including use of a crowdsourced beam relation database for positioning.

FIG. 14 shows a flowchart for an exemplary method 1400 for supporting location services performed by a user equipment (UE), such as UE 105, in a manner consistent with disclosed implementations.

At block 1402, the UE may receive a plurality of radio beams transmitted by a plurality of base stations, e.g., as discussed at stage 1 in FIG. 9. A means for receiving a plurality of radio beams transmitted by a plurality of base stations may include the transceiver 1010 and at least one processor 1002 with dedicated hardware or implementing executable code or software instructions in memory 1004 and/or medium 1020, such as the communication module 1022 in UE 1000 shown in FIG. 10.

At block 1404, the UE may determine a cell identifier (ID) and a beam ID for each of the plurality of radio beams, e.g., as discussed at stage 2 in FIG. 9. A means for determining a cell identifier (ID) and a beam ID for each of the plurality of radio beams may include the transceiver 1010 and at least one processor 1002 with dedicated hardware or implementing executable code or software instructions in memory 1004 and/or medium 1020, such as the beam identification module 1024 in UE 1000 shown in FIG. 10.

At block 1406, the UE may determine a position of the UE based on the cell ID and the beam ID for each of the plurality of radio beams using a crowdsourced beam relation database that comprises a plurality of positions associated with cell IDs and beam IDs for radio beams, e.g., as discussed at stages 3, 8, and 9 in FIG. 9. For example, the UE may determine the position of the UE by reporting the cell ID and the beam ID for each of the plurality of radio beams to a server that estimates the position of the UE using the crowdsourced beam relation database, e.g., as discussed at stages 3 and 9 in FIG. 9. In another example, the UE may determine the position of the UE by receiving the crowdsourced beam relation database from a server and estimating the position of the UE using the crowdsourced beam relation database received from the server, e.g., as discussed at stages 5 and 8 in FIG. 9. A means for determining a position of the UE based on the cell ID and the beam ID for each of the plurality of radio beams using a crowdsourced beam relation database that comprises a plurality of positions associated with cell IDs and beam IDs for radio beams may include the transceiver 1010 and at least one processor 1002 with dedicated hardware or implementing executable code or software instructions in memory 1004 and/or medium 1020, such as the positioning module 1028 in UE 1000 shown in FIG. 10.

In one implementation, the UE may measure one or more signal based parameters for each of the plurality of radio beams, wherein determining the position of the UE is further based on the one or more signal based parameters, e.g., as discussed at stage 2 in FIG. 9. For example, the one or more signal based parameters for each of the plurality of radio beams may comprise at least one of Reference Signal Received Power (RSRP), Reference Signal Received Quality (RSRQ), or a combination thereof. A means for measuring one or more signal based parameters for each of the plurality of radio beams, wherein determining the position of the UE is further based on the one or more signal based parameters may include the transceiver 1010 and at least one processor 1002 with dedicated hardware or implementing executable code or software instructions in memory 1004 and/or medium 1020, such as the measurement module 1026 in UE 1000 shown in FIG. 10.

In one implementation, the UE may determine a beam width related parameter for each of the plurality of radio beams, wherein determining the position of the UE is further based on the beam width related parameter for each of the plurality of radio beams, e.g., as discussed at stage 2 in FIG. 9. For example, the UE may determine the position further based on the beam width related parameter for each of the plurality of radio beams by weighting measurements from radio beams with a higher beam count more than measurements from radio beams with a lower beam count. A means for determining a beam width related parameter for each of the plurality of radio beams, wherein determining the position of the UE is further based on the beam width related parameter for each of the plurality of radio beams may include the transceiver 1010 and at least one processor 1002 with dedicated hardware or implementing executable code or software instructions in memory 1004 and/or medium 1020, such as the measurement module 1026 in UE 1000 shown in FIG. 10.

In one implementation, the UE may determine an angular measurement parameter for each of the plurality of radio beams, wherein determining the position of the UE is further based on the angular measurement parameter for each of the plurality of radio beams, e.g., as discussed at stage 2 in FIG. 9. For example, the angular measurement parameter may be determined using Angle of Arrival (AoA) or Angle of Departure (AoD). A means for determining an angular measurement parameter for each of the plurality of radio beams, wherein determining the position of the UE is further based on the angular measurement parameter for each of the plurality of radio beams may include the transceiver 1010 and at least one processor 1002 with dedicated hardware or implementing executable code or software instructions in memory 1004 and/or medium 1020, such as the measurement module 1026 and the positioning module 1028 in UE 1000 shown in FIG. 10.

In one implementation, the UE may further receive the crowdsourced beam relation database, e.g., as discussed at stage 5 in FIG. 9. The UE may receive positioning assistance data that includes a number of measurement objects, e.g., as discussed at stages 5 and 6 in FIG. 9. The UE may determine relevant measurement objects in the positioning assistance data using a relationship between the cell ID and the beam ID determined for each of the plurality of radio beams and the plurality of positions associated with cell IDs and beam IDs for radio beams provided in the crowdsourced beam relation database, e.g., as discussed at stage 6 in FIG. 9. A means for receiving the crowdsourced beam relation database, means for receiving positioning assistance data that includes a number of measurement objects, and means for determining relevant measurement objects in the positioning assistance data using a relationship between the cell ID and the beam ID determined for each of the plurality of radio beams and the plurality of positions associated with cell IDs and beam IDs for radio beams provided in the crowdsourced beam relation database may include the transceiver 1010 and at least one processor 1002 with dedicated hardware or implementing executable code or software instructions in memory 1004 and/or medium 1020, such as the positioning module 1028 in UE 1000 shown in FIG. 10.

Figure 15:
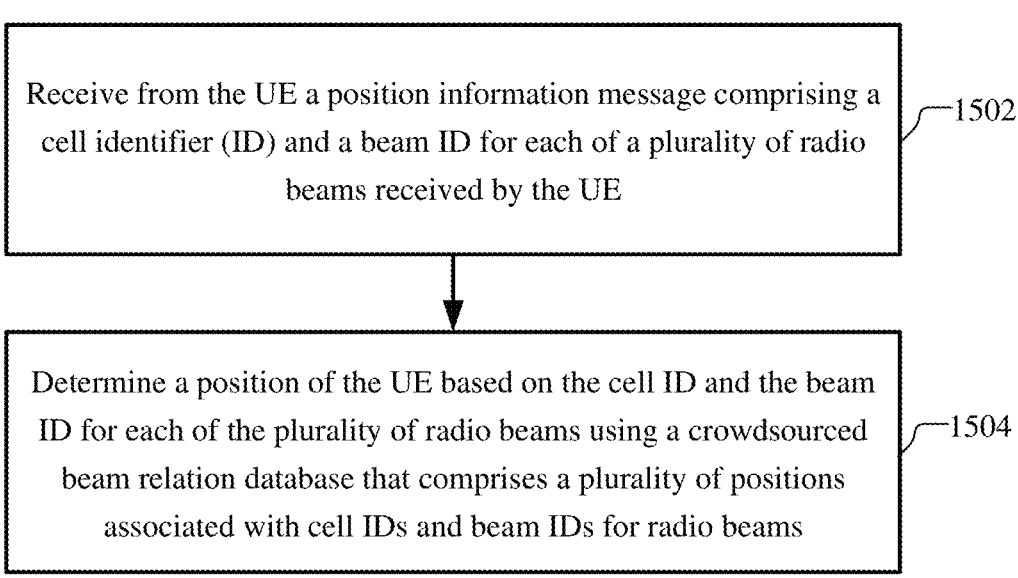
FIG. 15 shows a flowchart for an exemplary method for supporting location services performed by a location server including use of a crowdsourced beam relation database for positioning.

FIG. 15 shows a flowchart for an exemplary method 1500 for supporting location services for a user equipment (UE) in a wireless network performed by a location server, such as location server 152, in a manner consistent with disclosed implementations.

At block 1502, the location server may receive from the UE a position information message comprising a cell identifier (ID) and a beam ID for each of a plurality of radio beams received by the UE, e.g., as discussed at stages 3 and 9 in FIG. 9. A means for receiving from the UE a position information message comprising a cell identifier (ID) and a beam ID for each of a plurality of radio beams received by the UE may include the external interface 1110 and at least one processor 1102 with dedicated hardware or implementing executable code or software instructions in memory 1104 and/or medium 1120, such as the positioning information module 1126 in server 1100 shown in FIG. 11.

At block 1502, the location server may determine a position of the UE based on the cell ID and the beam ID for each of the plurality of radio beams using a crowdsourced beam relation database that comprises a plurality of positions associated with cell IDs and beam IDs for radio beams, e.g., as discussed at stages 4 and 10 in FIG. 9. A means for determining a position of the UE based on the cell ID and the beam ID for each of the plurality of radio beams using a crowdsourced beam relation database that comprises a plurality of positions associated with cell IDs and beam IDs for radio beams may include the at least one processor 1102 with dedicated hardware or implementing executable code or software instructions in memory 1104 and/or medium 1120, such as the positioning module 1128 in server 1100 shown in FIG. 11.

In one implementation, the location server may receive in the position information message one or more signal based parameters measured by the UE for each of the plurality of radio beams, wherein the position of the UE is determined further based on the one or more signal based parameters, e.g., e.g., as discussed at stages 3, 4, 9, and 10 in FIG. 9.

In one implementation, the location server may receive in the position information message one or more signal based parameters measured by the UE for each of the plurality of radio beams, wherein the position of the UE is determined further based on the one or more signal based parameters, e.g., e.g., as discussed at stages 3, 4, 9, and 10 in FIG. 9. For example, the one or more signal based parameters for each of the plurality of radio beams may comprise at least one of Reference Signal Received Power (RSRP), Reference Signal Received Quality (RSRQ), or a combination thereof.

In one implementation, the location server may receive in the position information message a beam width related parameter for each of the plurality of radio beams, wherein the position of the UE is determined further based on the beam width related parameter for each of the plurality of radio beams, e.g., as discussed at stages 3, 4, 9, and 10 in FIG. 9. For example, the position of the UE may be determined based on the beam width related parameter for each of the plurality of radio beams by weighting measurements from radio beams with a higher beam count more than measurements from radio beams with a lower beam count.

In one implementation, the location server may receive in the position information message an angular measurement parameter for each of the plurality of radio beams, wherein determining the position of the UE is further based on the angular measurement parameter for each of the plurality of radio beams, e.g., as discussed at stages 3, 4, 9, and 10 in FIG. 9.

In one implementation, the position of the UE is an initial estimate of the position of the UE, and the location server may generate positioning assistance data for the UE based on the initial estimate and the crowdsourced beam relation database to include measurement objects that are known to be discoverable at the position of the UE, e.g., as discussed at stage 4 in FIG. 9. The location server may send the positioning assistance data to the UE, e.g., as discussed at stage 5 in FIG. 9. A means for generating positioning assistance data for the UE based on the initial estimate and the crowdsourced beam relation database to include measurement objects that are known to be discoverable at the position of the UE, and a means for sending the positioning assistance data to the UE may include the at least one processor 1102 with dedicated hardware or implementing executable code or software instructions in memory 1104 and/or medium 1120, such as the positioning module 1128 in server 1100 shown in FIG. 11.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Implementation examples are described in the following numbered clauses:

1. A method for supporting location services performed by a user equipment (UE) comprising:
   receiving a plurality of radio beams transmitted by a plurality of base stations;
   determining a cell identifier (ID) and a beam ID for each of the plurality of radio beams;
   determining a position of the UE; and
   providing the position of the UE and the cell ID and the beam ID associated with the position of the UE for each of the plurality of radio beams to a crowdsourced beam relation database.

2. The method of clause 1, further comprising determining one or more signal based parameters for each of the plurality of radio beams, and providing the one or more signal based parameters with the cell ID and the beam ID associated with the position of the UE for each of the plurality of radio beams to the crowdsourced beam relation database.

3. The method of clause 2, wherein the one or more signal based parameters for each of the plurality of radio beams comprises at least one of Reference Signal Received Power (RSRP), Reference Signal Received Quality (RSRQ), or a combination thereof.

4. The method of any of clauses 1-3, further comprising determining a beam width related parameter for each of the plurality of radio beams, and providing the beam width related parameter with the cell ID and the beam ID associated with the position of the UE for each of the plurality of radio beams to the crowdsourced beam relation database.

5. The method of any of clauses 1-4, further comprising determining an angular measurement parameter for each of the plurality of radio beams, and providing the angular measurement parameter with the cell ID and the beam ID associated with the position of the UE for each of the plurality of radio beams to the crowdsourced beam relation database.

6. The method of any of clauses 1-5, further comprising:
measuring a signal based parameter for each of the plurality of radio beams; and
comparing the signal based parameter for each of the plurality of radio beams to a predetermined threshold;
wherein providing the cell ID and the beam ID associated with the position of the UE for each of the plurality of radio beams comprises providing the cell ID and the beam ID for each of the plurality of radio beams with the signal based parameter that exceed the predetermined threshold.

7. The method of clause 6, wherein the signal based parameter for each of the plurality of radio beams comprises at least one of Reference Signal Received Power (RSRP), Signal-to-Interference-plus-Noise Ratio (SINR), or a combination thereof.

8. The method of any of clauses 1-7, wherein determining the position of the UE is based on measurements from a Global Navigation Satellite System.

9. The method of any of clauses 1-8, wherein determining the position of the UE is based on measurements from a cellular location technology.

10. The method of any of clauses 1-9, wherein providing the cell ID and the beam ID associated with the position of the UE for each of the plurality of radio beams to the crowdsourced beam relation database comprises sending a report to a remote server, wherein the remote server maintains the crowdsourced beam relation database.

11. A user equipment (UE) configured for supporting location services comprising:
at least one wireless transceiver configured to wirelessly communicate with entities in a wireless network;
at least one memory; and
at least one processor coupled to the at least one wireless transceiver and the at least one memory and configured to:
receive a plurality of radio beams transmitted by a plurality of base stations;
determine a cell identifier (ID) and a beam ID for each of the plurality of radio beams;
determine a position of the UE; and
provide the position of the UE and the cell ID and the beam ID associated with the position of the UE for each of the plurality of radio beams to a crowdsourced beam relation database.

12. The UE of clause 11, wherein the at least one process is further configured to determine one or more signal based parameters for each of the plurality of radio beams, and provide the one or more signal based parameters with the cell ID and the beam ID associated with the position of the UE for each of the plurality of radio beams to the crowdsourced beam relation database.

13. The UE of clause 12, wherein the one or more signal based parameters for each of the plurality of radio beams comprises at least one of Reference Signal Received Power (RSRP), Reference Signal Received Quality (RSRQ), or a combination thereof.

14. The UE of any of clauses 11-13, wherein the at least one process is further configured to determine a beam width related parameter for each of the plurality of radio beams, and provide the beam width related parameter with the cell ID and the beam ID associated with the position of the UE for each of the plurality of radio beams to the crowdsourced beam relation database.

15. The UE of any of clauses 11-14, wherein the at least one process is further configured to determine an angular measurement parameter for each of the plurality of radio beams, and provide the angular measurement parameter with the cell ID and the beam ID associated with the position of the UE for each of the plurality of radio beams to the crowdsourced beam relation database.

16. The UE of any of clauses 11-15, wherein the at least one process is further configured to:
measure a signal based parameter for each of the plurality of radio beams; and
compare the signal based parameter for each of the plurality of radio beams to a predetermined threshold;
wherein the at least one process is configured to provide the cell ID and the beam ID associated with the position of the UE for each of the plurality of radio beams by being configured to provide the cell ID and the beam ID for each of the plurality of radio beams with the signal based parameter that exceed the predetermined threshold.

17. The UE of clause 16, wherein the signal based parameter for each of the plurality of radio beams comprises at least one of Reference Signal Received Power (RSRP), Signal-to-Interference-plus-Noise Ratio (SINR), or a combination thereof.

18. The UE of any of clauses 11-17, wherein the at least one process is configured to determine the position of the UE is based on measurements from a Global Navigation Satellite System.

19. The UE of any of clauses 11-18, wherein the at least one process is configured to determine the position of the UE is based on measurements from a cellular location technology.

20. The UE of any of clauses 11-19, wherein the at least one process is configured to provide the cell ID and the beam ID associated with the position of the UE for each of the plurality of radio beams to the crowdsourced beam relation database by being configured to send a report to a remote server, wherein the remote server maintains the crowdsourced beam relation database.

21. A user equipment (UE) configured for supporting location services comprising:
means for receiving a plurality of radio beams transmitted by a plurality of base stations;
means for determining a cell identifier (ID) and a beam ID for each of the plurality of radio beams;
means for determining a position of the UE; and
means for providing the position of the UE and the cell ID and the beam ID associated with the position of the UE for each of the plurality of radio beams to a crowdsourced beam relation database.

22. The UE of clause 21, further comprising means for determining one or more signal based parameters for each of the plurality of radio beams, and means for providing the one or more signal based parameters with the cell ID and the beam ID associated with the position of the UE for each of the plurality of radio beams to the crowdsourced beam relation database.

23. The UE of clause 22, wherein the one or more signal based parameters for each of the plurality of radio beams comprises at least one of Reference Signal Received Power (RSRP), Reference Signal Received Quality (RSRQ), or a combination thereof.

24. The UE of any of clauses 21-23, further comprising means for determining a beam width related parameter for each of the plurality of radio beams, and providing the beam width related parameter with the cell ID and the beam ID associated with the position of the UE for each of the plurality of radio beams to the crowdsourced beam relation database.

25. The UE of any of clauses 21-24, further comprising means for determining an angular measurement parameter for each of the plurality of radio beams, and providing the angular measurement parameter with the cell ID and the beam ID associated with the position of the UE for each of the plurality of radio beams to the crowdsourced beam relation database.

26. The UE of any of clauses 21-25, further comprising:
means for measuring a signal based parameter for each of the plurality of radio beams; and
means for comparing the signal based parameter for each of the plurality of radio beams to a predetermined threshold;
wherein the means for providing the cell ID and the beam ID associated with the position of the UE for each of the plurality of radio beams comprises means for providing the cell ID and the beam ID for each of the plurality of radio beams with the signal based parameter that exceed the predetermined threshold.

27. The UE of clause 26, wherein the signal based parameter for each of the plurality of radio beams comprises at least one of Reference Signal Received Power (RSRP), Signal-to-Interference-plus-Noise Ratio (SINR), or a combination thereof.

28. The UE of any of clauses 21-27, wherein the position of the UE is determined based on measurements from a Global Navigation Satellite System.

29. The UE of any of clauses 21-28, wherein the position of the UE is determined based on measurements from a cellular location technology.

30. The UE of any of clauses 21-29, wherein the means for providing the cell ID and the beam ID associated with the position of the UE for each of the plurality of radio beams to the crowdsourced beam relation database comprises means for sending a report to a remote server, wherein the remote server maintains the crowdsourced beam relation database.

31. A non-transitory storage medium including program code stored thereon, the program code is operable to configure at least one processor in a user equipment (UE) for supporting location services comprising:
program code to receive a plurality of radio beams transmitted by a plurality of base stations;
program code to determine a cell identifier (ID) and a beam ID for each of the plurality of radio beams;
program code to determine a position of the UE; and
program code to provide the position of the UE and the cell ID and the beam ID associated with the position of the UE for each of the plurality of radio beams to a crowdsourced beam relation database.

32. The non-transitory storage medium of clause 31, further comprising program code to determine one or more signal based parameters for each of the plurality of radio beams, and program code to provide the one or more signal based parameters with the cell ID and the beam ID associated with the position of the UE for each of the plurality of radio beams to the crowdsourced beam relation database.

33. The non-transitory storage medium of clause 32, wherein the one or more signal based parameters for each of the plurality of radio beams comprises at least one of Reference Signal Received Power (RSRP), Reference Signal Received Quality (RSRQ), or a combination thereof.

34. The non-transitory storage medium of any of clauses 31-33, further comprising program code to determine a beam width related parameter for each of the plurality of radio beams, and program code to provide the beam width related parameter with the cell ID and the beam ID associated with the position of the UE for each of the plurality of radio beams to the crowdsourced beam relation database.

35. The non-transitory storage medium of any of clauses 31-34, further comprising program code to determine an angular measurement parameter for each of the plurality of radio beams, and program code to provide the angular measurement parameter with the cell ID and the beam ID associated with the position of the UE for each of the plurality of radio beams to the crowdsourced beam relation database.

36. The non-transitory storage medium of any of clauses 31-35, further comprising:
program code to measure a signal based parameter for each of the plurality of radio beams; and
program code to compare the signal based parameter for each of the plurality of radio beams to a predetermined threshold;
wherein the program code to provide the cell ID and the beam ID associated with the position of the UE for each of the plurality of radio beams comprises program code to provide the cell ID and the beam ID for each of the plurality of radio beams with the signal based parameter that exceed the predetermined threshold.

37. The non-transitory storage medium of clause 36, wherein the signal based parameter for each of the plurality of radio beams comprises at least one of Reference Signal Received Power (RSRP), Signal-to-Interference-plus-Noise Ratio (SINR), or a combination thereof.

38. The non-transitory storage medium of any of clauses 31-37, wherein the position of the UE is determined based on measurements from a Global Navigation Satellite System.

39. The non-transitory storage medium of any of clauses 31-38, wherein the position of the UE is determined based on measurements from a cellular location technology.

40. The non-transitory storage medium of any of clauses 31-39, wherein the program code to provide the cell ID and the beam ID associated with the position of the UE for each of the plurality of radio beams to the crowdsourced beam relation database comprises program code to send a report to a remote server, wherein the remote server maintains the crowdsourced beam relation database.

41. A method for supporting location services for user equipment (UE) performed by a server in a wireless network, comprising:
receiving from a UE a position of the UE and a cell identifier (ID) and a beam ID associated with the position of the UE for each of a plurality of radio beams received by the UE; and
storing the position and the cell ID and the beam ID associated with the position of the UE for each of the plurality of radio beams received by the UE in a crowdsourced beam relation database.

42. The method of clause 41, further comprising receiving with the cell ID and the beam ID from the UE one or more signal based parameters measured for each of the plurality of radio beams, and wherein the one or more signal parameters are stored with the cell ID and the beam ID for each of the plurality of radio beams in the crowdsourced beam relation database.

43. The method of clause 42, wherein the one or more signal based parameters measured for each of the plurality of radio beams comprises at least one of Reference Signal Received Power (RSRP), Reference Signal Received Quality (RSRQ), or a combination thereof.

44. The method of any of clauses 41-43, further comprising receiving with the cell ID and the beam ID from the UE a beam width related parameter for each of the plurality of radio beams, and wherein the beam width related parameter are stored with the cell ID and the beam ID for each of the plurality of radio beams in the crowdsourced beam relation database.

45. The method of any of clauses 41-44, further comprising receiving with the cell ID and the beam ID from the UE an angular measurement parameter for each of the plurality of radio beams, and wherein the angular measurement parameter is stored with the cell ID and the beam ID for each of the plurality of radio beams in the crowdsourced beam relation database.

46. The method of any of clauses 41-45, wherein the cell ID and the beam ID for each of the plurality of radio beams is from a radio beam with a measured signal based parameter that exceeds a predetermined threshold, wherein the measured signal based parameter for each of the plurality of radio beams comprises at least one of Reference Signal Received Power (RSRP), Signal-to-Interference-plus-Noise Ratio (SINR), or a combination thereof.

47. The method of any of clauses 41-46, wherein the position of the UE is determined based on measurements of signals received from a Global Navigation Satellite System, a cellular network, a WiFi network, a wireless personal area network (WPAN) network, sensor measurements, or any combination thereof.

48. A server configured for supporting location services for user equipment (UE) in a wireless network, comprising:
an external interface configured to communicate with a plurality of UEs in the wireless network;
at least one memory; and
at least one processor coupled to the external interface and the at least one memory and configured to:
receive from a UE a position of the UE and a cell identifier (ID) and a beam ID associated with the position of the UE for each of a plurality of radio beams received by the UE; and
store the position and the cell ID and the beam ID associated with the position of the UE for each of the plurality of radio beams received by the UE in a crowdsourced beam relation database.

49. The server of clause 48, wherein the at least one process is further configured to receive with the cell ID and the beam ID from the UE one or more signal based parameters measured for each of the plurality of radio beams, and wherein the one or more signal parameters are stored with the cell ID and the beam ID for each of the plurality of radio beams in the crowdsourced beam relation database.

50. The server of clause 49, wherein the one or more signal based parameters measured for each of the plurality of radio beams comprises at least one of Reference Signal Received Power (RSRP), Reference Signal Received Quality (RSRQ), or a combination thereof.

51. The server of any of clauses 48-50, wherein the at least one process is further configured to receive with the cell ID and the beam ID from the UE a beam width related parameter for each of the plurality of radio beams, and wherein the beam width related parameter are stored with the cell ID and the beam ID for each of the plurality of radio beams in the crowdsourced beam relation database.

52. The server of any of clauses 48-51, wherein the at least one process is further configured to receive with the cell ID and the beam ID from the UE an angular measurement parameter for each of the plurality of radio beams, and wherein the angular measurement parameter is stored with the cell ID and the beam ID for each of the plurality of radio beams in the crowdsourced beam relation database.

53. The server of any of clauses 48-52, wherein the cell ID and the beam ID for each of the plurality of radio beams is from a radio beam with a measured signal based parameter that exceeds a predetermined threshold, wherein the measured signal based parameter for each of the plurality of radio beams comprises at least one of Reference Signal Received Power (RSRP), Signal-to-Interference-plus-Noise Ratio (SINR), or a combination thereof.

54. The server of any of clauses 48-53, wherein the position of the UE is determined based on measurements of signals received from a Global Navigation Satellite System, a cellular network, a WiFi network, a wireless personal area network (WPAN) network, sensor measurements, or any combination thereof.

55. A server configured for supporting location services for user equipment (UE) in a wireless network, comprising:
means for receiving from a UE a position of the UE and a cell identifier (ID) and a beam ID associated with the position of the UE for each of a plurality of radio beams received by the UE; and
means for storing the position and the cell ID and the beam ID associated with the position of the UE for each of the plurality of radio beams received by the UE in a crowdsourced beam relation database.

56. The server of clause 55, further comprising means for receiving with the cell ID and the beam ID from the UE one or more signal based parameters measured for each of the plurality of radio beams, and wherein the one or more signal parameters are stored with the cell ID and the beam ID for each of the plurality of radio beams in the crowdsourced beam relation database.

57. The server of clause 56, wherein the one or more signal based parameters measured for each of the plurality of radio beams comprises at least one of Reference Signal Received Power (RSRP), Reference Signal Received Quality (RSRQ), or a combination thereof.

58. The server of any of clauses 55-57, further comprising means for receiving with the cell ID and the beam ID from the UE a beam width related parameter for each of the plurality of radio beams, and wherein the beam width related parameter are stored with the cell ID and the beam ID for each of the plurality of radio beams in the crowdsourced beam relation database.

59. The server of any of clauses 55-58, further comprising means for receiving with the cell ID and the beam ID from the UE an angular measurement parameter for each of the plurality of radio beams, and wherein the angular measurement parameter is stored with the cell ID and the beam ID for each of the plurality of radio beams in the crowdsourced beam relation database.

60. The server of any of clauses 55-59, wherein the cell ID and the beam ID for each of the plurality of radio beams is from a radio beam with a measured signal based parameter that exceeds a predetermined threshold, wherein the measured signal based parameter for each of the plurality of radio beams comprises at least one of Reference Signal Received Power (RSRP), Signal-to-Interference-plus-Noise Ratio (SINR), or a combination thereof.

61. The server of any of clauses 55-60, wherein the position of the UE is determined based on measurements of signals received from a Global Navigation Satellite System, a cellular network, a WiFi network, a wireless personal area network (WPAN) network, sensor measurements, or any combination thereof.

62. A non-transitory storage medium including program code stored thereon, the program code is operable to configure at least one processor in a server for supporting location services for user equipment (UE) in a wireless network, comprising:
program code to receive from a UE a position of the UE and a cell identifier (ID) and a beam ID associated with the position of the UE for each of a plurality of radio beams received by the UE; and
program code to store the position and the cell ID and the beam ID associated with the position of the UE for each of the plurality of radio beams received by the UE in a crowdsourced beam relation database.

63. The non-transitory storage medium of clause 62, further comprising program code to receive with the cell ID and the beam ID from the UE one or more signal based parameters measured for each of the plurality of radio beams, and wherein the one or more signal parameters are stored with the cell ID and the beam ID for each of the plurality of radio beams in the crowdsourced beam relation database.

64. The non-transitory storage medium of clause 63, wherein the one or more signal based parameters measured for each of the plurality of radio beams comprises at least one of Reference Signal Received Power (RSRP), Reference Signal Received Quality (RSRQ), or a combination thereof.

65. The non-transitory storage medium of any of clauses 62-64, further comprising program code to receive with the cell ID and the beam ID from the UE a beam width related parameter for each of the plurality of radio beams, and wherein the beam width related parameter are stored with the cell ID and the beam ID for each of the plurality of radio beams in the crowdsourced beam relation database.

66. The non-transitory storage medium of any of clauses 62-65, further comprising program code to receive with the cell ID and the beam ID from the UE an angular measurement parameter for each of the plurality of radio beams, and wherein the angular measurement parameter is stored with the cell ID and the beam ID for each of the plurality of radio beams in the crowdsourced beam relation database.

67. The non-transitory storage medium of any of clauses 62-66, wherein the cell ID and the beam ID for each of the plurality of radio beams is from a radio beam with a measured signal based parameter that exceeds a predetermined threshold, wherein the measured signal based parameter for each of the plurality of radio beams comprises at least one of Reference Signal Received Power (RSRP), Signal-to-Interference-plus-Noise Ratio (SINR), or a combination thereof.

68. The non-transitory storage medium of any of clauses 62-67, wherein the position of the UE is determined based on measurements of signals received from a Global Navigation Satellite System, a cellular network, a WiFi network, a wireless personal area network (WPAN) network, sensor measurements, or any combination thereof.

69. A method for supporting location services for a user equipment (UE) comprising:
receiving a plurality of radio beams transmitted by a plurality of base stations;
determining a cell identifier (ID) and a beam ID for each of the plurality of radio beams; and
determining a position of the UE based on the cell ID and the beam ID for each of the plurality of radio beams using a crowdsourced beam relation database that comprises a plurality of positions associated with cell IDs and beam IDs for radio beams.

70. The method of clause 69, wherein determining the position of the UE comprises reporting the cell ID and the beam ID for each of the plurality of radio beams to a server that estimates the position of the UE using the crowdsourced beam relation database.

71. The method of any of clauses 69-70, wherein determining the position of the UE comprises receiving the crowdsourced beam relation database from a server and estimating the position of the UE using the crowdsourced beam relation database received from the server.

72. The method of any of clauses 69-71, further comprising measuring one or more signal based parameters for each of the plurality of radio beams, wherein determining the position of the UE is further based on the one or more signal based parameters.

73. The method of clause 72, wherein the one or more signal based parameters for each of the plurality of radio beams comprises at least one of Reference Signal Received Power (RSRP), Reference Signal Received Quality (RSRQ), or a combination thereof.

74. The method of any of clauses 69-73, further comprising determining a beam width related parameter for each of the plurality of radio beams, wherein determining the position of the UE is further based on the beam width related parameter for each of the plurality of radio beams.

75. The method of clause 74, wherein determining the position of the UE further based on the beam width related parameter for each of the plurality of radio beams comprises weighting measurements from radio beams with a higher beam count more than measurements from radio beams with a lower beam count.

76. The method of any of clauses 69-75, further comprising determining an angular measurement parameter for each of the plurality of radio beams, wherein determining the position of the UE is further based on the angular measurement parameter for each of the plurality of radio beams.

77. The method of any of clauses 69-76, further comprising:
receiving the crowdsourced beam relation database;
receiving positioning assistance data that includes a number of measurement objects;
determining relevant measurement objects in the positioning assistance data using a relationship between the cell ID and the beam ID determined for each of the plurality of radio beams and the plurality of positions associated with cell IDs and beam IDs for radio beams provided in the crowdsourced beam relation database.

78. A user equipment (UE) configured for supporting location services comprising:
at least one wireless transceiver configured to wirelessly communicate with entities in a wireless network;
at least one memory; and
at least one processor coupled to the at least one wireless transceiver and the at least one memory and configured to:
receive a plurality of radio beams transmitted by a plurality of base stations;
determine a cell identifier (ID) and a beam ID for each of the plurality of radio beams; and
determine a position of the UE based on the cell ID and the beam ID for each of the plurality of radio beams using a crowdsourced beam relation database that comprises a plurality of positions associated with cell IDs and beam IDs for radio beams.

79. The UE of clause 78, wherein the at least one process is configured to determine the position of the UE by being configured to report the cell ID and the beam ID for each of the plurality of radio beams to a server that estimates the position of the UE using the crowdsourced beam relation database.

80. The UE of any of clauses 78-79, wherein the at least one process is configured to determine the position of the UE by being configured to receive the crowdsourced beam relation database from a server and estimate the position of the UE using the crowdsourced beam relation database received from the server.

81. The UE of any of clauses 78-80, wherein the at least one process is further configured to measure one or more signal based parameters for each of the plurality of radio beams, wherein the at least one process is configured to determine the position of the UE further based on the one or more signal based parameters.

82. The UE of clause 81, wherein the one or more signal based parameters for each of the plurality of radio beams comprises at least one of Reference Signal Received Power (RSRP), Reference Signal Received Quality (RSRQ), or a combination thereof.

83. The UE of any of clauses 78-82, wherein the at least one process is further configured to determine a beam width related parameter for each of the plurality of radio beams, wherein the at least one process is configured to determine the position of the UE further based on the beam width related parameter for each of the plurality of radio beams.

84. The UE of clause 83, wherein the at least one process is configured to determine the position of the UE further based on the beam width related parameter for each of the plurality of radio beams by being configured to weight measurements from radio beams with a higher beam count more than measurements from radio beams with a lower beam count.

85. The UE of any of clauses 78-84, wherein the at least one process is further configured to determine an angular measurement parameter for each of the plurality of radio beams, wherein the at least one process is configured to determine the position of the UE further based on the angular measurement parameter for each of the plurality of radio beams.

86. The UE of any of clauses 78-85, wherein the at least one process is further configured to:
receive the crowdsourced beam relation database;
receive positioning assistance data that includes a number of measurement objects;
determine relevant measurement objects in the positioning assistance data using a relationship between the cell ID and the beam ID determined for each of the plurality of radio beams and the plurality of positions associated with cell IDs and beam IDs for radio beams provided in the crowdsourced beam relation database.

87. A user equipment (UE) configured for supporting location services comprising:
means for receiving a plurality of radio beams transmitted by a plurality of base stations;
means for determining a cell identifier (ID) and a beam ID for each of the plurality of radio beams; and
means for determining a position of the UE based on the cell ID and the beam ID for each of the plurality of radio beams using a crowdsourced beam relation database that comprises a plurality of positions associated with cell IDs and beam IDs for radio beams.

88. The UE of clause 87, wherein the means for determining the position of the UE comprises means for reporting the cell ID and the beam ID for each of the plurality of radio beams to a server that estimates the position of the UE using the crowdsourced beam relation database.

89. The UE of any of clauses 87-88, wherein the means for determining the position of the UE comprises means for receiving the crowdsourced beam relation database from a server and estimating the position of the UE using the crowdsourced beam relation database received from the server.

90. The UE of any of clauses 87-89, further comprising means for measuring one or more signal based parameters for each of the plurality of radio beams, wherein the position of the UE is further determined based on the one or more signal based parameters.

91. The UE of clause 90, wherein the one or more signal based parameters for each of the plurality of radio beams comprises at least one of Reference Signal Received Power (RSRP), Reference Signal Received Quality (RSRQ), or a combination thereof.

92. The UE of any of clauses 87-91, further comprising the means for determining a beam width related parameter for each of the plurality of radio beams, wherein the position of the UE is further determined based on the beam width related parameter for each of the plurality of radio beams.

93. The UE of clause 92, wherein the means for determining the position of the UE further based on the beam width related parameter for each of the plurality of radio beams comprises means for weighting measurements from radio beams with a higher beam count more than measurements from radio beams with a lower beam count.

94. The UE of any of clauses 87-93, further comprising means for determining an angular measurement parameter for each of the plurality of radio beams, wherein determining the position of the UE is further based on the angular measurement parameter for each of the plurality of radio beams.

95. The UE of any of clauses 87-94, further comprising:
means for receiving the crowdsourced beam relation database;
means for receiving positioning assistance data that includes a number of measurement objects;
means for determining relevant measurement objects in the positioning assistance data using a relationship between the cell ID and the beam ID determined for each of the plurality of radio beams and the plurality of positions associated with cell IDs and beam IDs for radio beams provided in the crowdsourced beam relation database.

96. A non-transitory storage medium including program code stored thereon, the program code is operable to configure at least one processor in a user equipment (UE) for supporting location services comprising:
program code to receiving a plurality of radio beams transmitted by a plurality of base stations;
program code to determine a cell identifier (ID) and a beam ID for each of the plurality of radio beams; and
program code to determine a position of the UE based on the cell ID and the beam ID for each of the plurality of radio beams using a crowdsourced beam relation database that comprises a plurality of positions associated with cell IDs and beam IDs for radio beams.

97. The non-transitory storage medium of clause 96, wherein the program code to determine the position of the UE comprises program code to report the cell ID and the beam ID for each of the plurality of radio beams to a server that estimates the position of the UE using the crowdsourced beam relation database.

98. The non-transitory storage medium of any of clauses 96-97, wherein the program code to determine the position of the UE comprises program code to receive the crowdsourced beam relation database from a server and estimating the position of the UE using the crowdsourced beam relation database received from the server.

99. The non-transitory storage medium of any of clauses 96-98, further comprising program code to measure one or more signal based parameters for each of the plurality of radio beams, wherein the position of the UE is further determined based on the one or more signal based parameters.

100. The non-transitory storage medium of clause 99, wherein the one or more signal based parameters for each of the plurality of radio beams comprises at least one of Reference Signal Received Power (RSRP), Reference Signal Received Quality (RSRQ), or a combination thereof.

101. The non-transitory storage medium of any of clauses 96-100, further comprising program code to determine a beam width related parameter for each of the plurality of radio beams, wherein the program code to determine the position of the UE is further based on the beam width related parameter for each of the plurality of radio beams.

102. The non-transitory storage medium of clause 101, wherein the program code to determine the position of the UE further based on the beam width related parameter for each of the plurality of radio beams comprises program code to weight measurements from radio beams with a higher beam count more than measurements from radio beams with a lower beam count.

103. The non-transitory storage medium of any of clauses 96-102, further comprising program code to determine an angular measurement parameter for each of the plurality of radio beams, wherein determining the position of the UE is further based on the angular measurement parameter for each of the plurality of radio beams.

104. The non-transitory storage medium of any of clauses 69-103, further comprising:
program code to receive the crowdsourced beam relation database;
program code to receive positioning assistance data that includes a number of measurement objects;
program code to determine relevant measurement objects in the positioning assistance data using a relationship between the cell ID and the beam ID determined for each of the plurality of radio beams and the plurality of positions associated with cell IDs and beam IDs for radio beams provided in the crowdsourced beam relation database.

105. A method for supporting location services for a user equipment (UE) in a wireless network performed by a location server comprising:
receiving from the UE a position information message comprising a cell identifier (ID) and a beam ID for each of a plurality of radio beams received by the UE; and
determining a position of the UE based on the cell ID and the beam ID for each of the plurality of radio beams using a crowdsourced beam relation database that comprises a plurality of positions associated with cell IDs and beam IDs for radio beams.

106. The method of clause 105, further comprising receiving in the position information message one or more signal based parameters measured by the UE for each of the plurality of radio beams, wherein determining the position of the UE is further based on the one or more signal based parameters.

107. The method of clause 106, wherein the one or more signal based parameters for each of the plurality of radio beams comprises at least one of Reference Signal Received Power (RSRP), Reference Signal Received Quality (RSRQ), or a combination thereof.

108. The method of any of clauses 105-107, further comprising receiving in the position information message a beam width related parameter for each of the plurality of radio beams, wherein determining the position of the UE is further based on the beam width related parameter for each of the plurality of radio beams.

109. The method of clause 108, wherein determining the position of the UE further based on the beam width related parameter for each of the plurality of radio beams comprises weighting measurements from radio beams with a higher beam count more than measurements from radio beams with a lower beam count.

110. The method of any of clauses 105-109, further comprising receiving in the position information message an angular measurement parameter for each of the plurality of radio beams, wherein determining the position of the UE is further based on the angular measurement parameter for each of the plurality of radio beams.

111. The method of any of clauses 105-110, wherein the position of the UE is an initial estimate of the position of the UE, the method further comprising:
generating positioning assistance data for the UE based on the initial estimate and the crowdsourced beam relation database to include measurement objects that are known to be discoverable at the position of the UE; and
sending the positioning assistance data to the UE.

112. A location server configured for supporting location services for a user equipment (UE) in a wireless network comprising:
an external interface configured to communicate with a UE in the wireless network;
at least one memory; and
at least one processor coupled to the external interface and the at least one memory and configured to:
receive from the UE a position information message comprising a cell identifier (ID) and a beam ID for each of a plurality of radio beams received by the UE; and
determine a position of the UE based on the cell ID and the beam ID for each of the plurality of radio beams using a crowdsourced beam relation database that comprises a plurality of positions associated with cell IDs and beam IDs for radio beams.

113. The location server of clause 112, wherein the at least one process is further configured to receive in the position information message one or more signal based parameters measured by the UE for each of the plurality of radio beams, wherein the at least one process is configured to determine the position of the UE further based on the one or more signal based parameters.

114. The location server of clause 113, wherein the one or more signal based parameters for each of the plurality of radio beams comprises at least one of Reference Signal Received Power (RSRP), Reference Signal Received Quality (RSRQ), or a combination thereof.

115. The location server of any of clauses 112-114, wherein the at least one process is further configured to receive in the position information message a beam width related parameter for each of the plurality of radio beams, wherein the at least one process is configured to determine the position of the UE further based on the beam width related parameter for each of the plurality of radio beams.

116. The location server of clause 115, wherein the at least one process is configured to determine the position of the UE further based on the beam width related parameter for each of the plurality of radio beams by being configured to weight measurements from radio beams with a higher beam count more than measurements from radio beams with a lower beam count.

117. The location server of any of clauses 112-116, wherein the at least one process is further configured to receive in the position information message an angular measurement parameter for each of the plurality of radio beams, wherein the at least one process is configured to determine the position of the UE further based on the angular measurement parameter for each of the plurality of radio beams.

118. The location server of any of clauses 112-117, wherein the position of the UE is an initial estimate of the position of the UE, wherein the at least one process is further configured to:
generate positioning assistance data for the UE based on the initial estimate and the crowdsourced beam relation database to include measurement objects that are known to be discoverable at the position of the UE; and
send the positioning assistance data to the UE.

119. A location server configured for supporting location services for a user equipment (UE) in a wireless network comprising:
means for receiving from the UE a position information message comprising a cell identifier (ID) and a beam ID for each of a plurality of radio beams received by the UE; and
means for determining a position of the UE based on the cell ID and the beam ID for each of the plurality of radio beams using a crowdsourced beam relation database that comprises a plurality of positions associated with cell IDs and beam IDs for radio beams.

120. The location server of clause 119, further comprising means for receiving in the position information message one or more signal based parameters measured by the UE for each of the plurality of radio beams, wherein the position of the UE is determined further based on the one or more signal based parameters.

121. The location server of clause 120, wherein the one or more signal based parameters for each of the plurality of radio beams comprises at least one of Reference Signal Received Power (RSRP), Reference Signal Received Quality (RSRQ), or a combination thereof.

122. The location server of any of clauses 119-121, further comprising means for receiving in the position information message a beam width related parameter for each of the plurality of radio beams, wherein the position of the UE is determined further based on the beam width related parameter for each of the plurality of radio beams.

123. The location server of clause 122, wherein the means for determining the position of the UE further based on the beam width related parameter for each of the plurality of radio beams comprises means for weighting measurements from radio beams with a higher beam count more than measurements from radio beams with a lower beam count.

124. The location server of any of clauses 119-123, further comprising means for receiving in the position information message an angular measurement parameter for each of the plurality of radio beams, wherein the position of the UE is determined further based on the angular measurement parameter for each of the plurality of radio beams.

125. The location server of any of clauses 119-124, wherein the position of the UE is an initial estimate of the position of the UE, the location server further comprising:
means for generating positioning assistance data for the UE based on the initial estimate and the crowdsourced beam relation database to include measurement objects that are known to be discoverable at the position of the UE; and
means for sending the positioning assistance data to the UE.

126. A non-transitory storage medium including program code stored thereon, the program code is operable to configure at least one processor in a location server for supporting location services for a user equipment (UE) in a wireless network comprising:
program code to receive from the UE a position information message comprising a cell identifier (ID) and a beam ID for each of a plurality of radio beams received by the UE; and
program code to determine a position of the UE based on the cell ID and the beam ID for each of the plurality of radio beams using a crowdsourced beam relation database that comprises a plurality of positions associated with cell IDs and beam IDs for radio beams.

127. The non-transitory storage medium of clause 126, further comprising program code to receive in the position information message one or more signal based parameters measured by the UE for each of the plurality of radio beams, wherein the position of the UE is determined further based on the one or more signal based parameters.

128. The non-transitory storage medium of clause 127, wherein the one or more signal based parameters for each of the plurality of radio beams comprises at least one of Reference Signal Received Power (RSRP), Reference Signal Received Quality (RSRQ), or a combination thereof.

129. The non-transitory storage medium of any of clauses 126-128, further comprising program code to receive in the position information message a beam width related parameter for each of the plurality of radio beams, wherein the position of the UE is determined further based on the beam width related parameter for each of the plurality of radio beams.

130. The non-transitory storage medium of clause 129, wherein the program code to determine the position of the UE further based on the beam width related parameter for each of the plurality of radio beams comprises program code to weight measurements from radio beams with a higher beam count more than measurements from radio beams with a lower beam count.

131. The non-transitory storage medium of any of clauses 126-130, further comprising program code to receive in the position information message an angular measurement parameter for each of the plurality of radio beams, wherein the position of the UE is determined further based on the angular measurement parameter for each of the plurality of radio beams.

132. The non-transitory storage medium of any of clauses 126-131, wherein the position of the UE is an initial estimate of the position of the UE, the non-transitory storage medium further comprising:
program code to generate positioning assistance data for the UE based on the initial estimate and the crowdsourced beam relation database to include measurement objects that are known to be discoverable at the position of the UE; and
program code to send the positioning assistance data to the UE.

Therefore, it is intended that claimed subject matter not be limited to the particular examples disclosed, but that such claimed subject matter may also include all aspects falling within the scope of appended claims, and equivalents thereof.

What is claimed is:

1. A method for supporting location services performed by a user equipment (UE) comprising:
receiving a plurality of radio beams transmitted by a plurality of base stations;
measuring a signal based parameter for each of the plurality of radio beams;
comparing the signal based parameter for each of the plurality of radio beams to a predetermined threshold;
determining a cell identifier (ID) and a beam ID for each of the plurality of radio beams;
determining a position of the UE; and
providing, to a crowdsourced beam relation database, the position of the UE and the cell ID and the beam ID associated with the position of the UE for each of the plurality of radio beams with the signal based parameter that exceeds the predetermined threshold.

2. The method of claim 1, further comprising determining one or more signal based parameters for each of the plurality of radio beams, and providing the one or more signal based parameters with the cell ID and the beam ID associated with the position of the UE for each of the plurality of radio beams to the crowdsourced beam relation database.

3. The method of claim 2, wherein the one or more signal based parameters for each of the plurality of radio beams comprises at least one of Reference Signal Received Power (RSRP), Reference Signal Received Quality (RSRQ), or a combination thereof.

4. The method of claim 1, further comprising determining a beam width related parameter for each of the plurality of radio beams, and providing the beam width related parameter with the cell ID and the beam ID associated with the position of the UE for each of the plurality of radio beams to the crowdsourced beam relation database.

5. The method of claim 1, further comprising determining an angular measurement parameter for each of the plurality of radio beams, and providing the angular measurement parameter with the cell ID and the beam ID associated with the position of the UE for each of the plurality of radio beams to the crowdsourced beam relation database.

6. The method of claim 1, wherein the signal based parameter for each of the plurality of radio beams comprises at least one of Reference Signal Received Power (RSRP), Signal-to-Interference-plus-Noise Ratio (SINR), or a combination thereof.

7. The method of claim 1, wherein determining the position of the UE is based on measurements of signals received from a Global Navigation Satellite System, a cellular network, a WiFi network, a wireless personal area network (WPAN) network, sensor measurements, or any combination thereof.

8. The method of claim 1, wherein providing the cell ID and the beam ID associated with the position of the UE for each of the plurality of radio beams to the crowdsourced beam relation database comprises sending a report to a remote server, wherein the remote server maintains the crowdsourced beam relation database.

9. A user equipment (UE) configured for supporting location services comprising:
at least one wireless transceiver configured to wirelessly communicate with entities in a wireless network;
at least one memory; and
at least one processor coupled to the at least one wireless transceiver and the at least one memory and configured to:
receive a plurality of radio beams transmitted by a plurality of base stations;
measure a signal based parameter for each of the plurality of radio beams;
compare the signal based parameter for each of the plurality of radio beams to a predetermined threshold;
determine a cell identifier (ID) and a beam ID for each of the plurality of radio beams;
determine a position of the UE; and
provide, to a crowdsourced beam relation database, the position of the UE and the cell ID and the beam ID associated with the position of the UE for each of the plurality of radio beams with the signal based parameter that exceeds the predetermined threshold.

10. The UE of claim 9, wherein the at least one processor is further configured to determine one or more signal based parameters for each of the plurality of radio beams, and provide the one or more signal based parameters with the cell ID and the beam ID associated with the position of the UE for each of the plurality of radio beams to the crowdsourced beam relation database.

11. The UE of claim 10, wherein the one or more signal based parameters for each of the plurality of radio beams comprises at least one of Reference Signal Received Power (RSRP), Reference Signal Received Quality (RSRQ), or a combination thereof.

12. The UE of claim 9, wherein the at least one processor is further configured to determine a beam width related parameter for each of the plurality of radio beams, and provide the beam width related parameter with the cell ID and the beam ID associated with the position of the UE for each of the plurality of radio beams to the crowdsourced beam relation database.

13. The UE of claim 9, wherein the at least one processor is further configured to determine an angular measurement parameter for each of the plurality of radio beams, and provide the angular measurement parameter with the cell ID and the beam ID associated with the position of the UE for each of the plurality of radio beams to the crowdsourced beam relation database.

14. The UE of claim 9, wherein the signal based parameter for each of the plurality of radio beams comprises at least one of Reference Signal Received Power (RSRP), Signal-to-Interference-plus-Noise Ratio (SINR), or a combination thereof.

15. The UE of claim 9, wherein the at least one processor is configured to determine the position of the UE is based on measurements of signals received from a Global Navigation Satellite System, a cellular network, a WiFi network, a wireless personal area network (WPAN) network, sensor measurements, or any combination thereof.

16. The UE of claim 9, wherein the at least one processor is configured to provide the cell ID and the beam ID associated with the position of the UE for each of the plurality of radio beams to the crowdsourced beam relation database by being configured to send a report to a remote server, wherein the remote server maintains the crowdsourced beam relation database.

17. A method for supporting location services for user equipment (UE) performed by a server in a wireless network, comprising:
receiving from a UE a position of the UE and a cell identifier (ID) and a beam ID associated with the position of the UE for each of a plurality of radio beams received by the UE, wherein the cell ID and the beam ID for each of the plurality of radio beams is from a radio beam with a measured signal based parameter that exceeds a predetermined threshold; and storing the position and the cell ID and the beam ID associated with the position of the UE for each of the plurality of radio beams received by the UE in a crowdsourced beam relation database.

18. The method of claim 17, further comprising receiving with the cell ID and the beam ID from the UE one or more signal based parameters measured for each of the plurality of radio beams, and wherein the one or more signal parameters are stored with the cell ID and the beam ID for each of the plurality of radio beams in the crowdsourced beam relation database.

19. The method of claim 18, wherein the one or more signal based parameters measured for each of the plurality of radio beams comprises at least one of Reference Signal Received Power (RSRP), Reference Signal Received Quality (RSRQ), or a combination thereof.

20. The method of claim 17, further comprising receiving with the cell ID and the beam ID from the UE a beam width related parameter for each of the plurality of radio beams, and wherein the beam width related parameters are stored with the cell ID and the beam ID for each of the plurality of radio beams in the crowdsourced beam relation database.

21. The method of claim 17, further comprising receiving with the cell ID and the beam ID from the UE an angular measurement parameter for each of the plurality of radio beams, and wherein the angular measurement parameters are stored with the cell ID and the beam ID for each of the plurality of radio beams in the crowdsourced beam relation database.

22. The method of claim 17, wherein the measured signal based parameter for each of the plurality of radio beams comprises at least one of Reference Signal Received Power (RSRP), Signal-to-Interference-plus-Noise Ratio (SINR), or a combination thereof.

23. The method of claim 17, wherein the position of the UE is determined based on measurements of signals received from a Global Navigation Satellite System, a cellular network, a WiFi network, a wireless personal area network (WPAN) network, sensor measurements, or any combination thereof.

24. A server configured for supporting location services for user equipment (UE) in a wireless network, comprising:
an external interface configured to communicate with a plurality of UEs in the wireless network;
at least one memory; and
at least one processor coupled to the external interface and the at least one memory and configured to:

receive from a UE a position of the UE and a cell identifier (ID) and a beam ID associated with the position of the UE for each of a plurality of radio beams received by the UE, wherein the cell ID and the beam ID for each of the plurality of radio beams is from a radio beam with a measured signal based parameter that exceeds a predetermined threshold; and store the position and the cell ID and the beam ID associated with the position of the UE for each of the plurality of radio beams received by the UE in a crowdsourced beam relation database.

25. The server of claim 24, wherein the at least one processor is further configured to receive with the cell ID and the beam ID from the UE one or more signal based parameters measured for each of the plurality of radio beams, and wherein the one or more signal parameters are stored with the cell ID and the beam ID for each of the plurality of radio beams in the crowdsourced beam relation database.

26. The server of claim 25, wherein the one or more signal based parameters measured for each of the plurality of radio beams comprises at least one of Reference Signal Received Power (RSRP), Reference Signal Received Quality (RSRQ), or a combination thereof.

27. The server of claim 24, wherein the at least one processor is further configured to receive with the cell ID and the beam ID from the UE a beam width related parameter for each of the plurality of radio beams, and wherein the beam width related parameters are stored with the cell ID and the beam ID for each of the plurality of radio beams in the crowdsourced beam relation database.

28. The server of claim 24, wherein the at least one processor is further configured to receive with the cell ID and the beam ID from the UE an angular measurement parameter for each of the plurality of radio beams, and wherein the angular measurement parameters are stored with the cell ID and the beam ID for each of the plurality of radio beams in the crowdsourced beam relation database.

29. The server of claim 24, wherein the measured signal based parameter for each of the plurality of radio beams comprises at least one of Reference Signal Received Power (RSRP), Signal-to-Interference-plus-Noise Ratio (SINR), or a combination thereof.

30. The server of claim 24, wherein the position of the UE is determined based on measurements of signals received from a Global Navigation Satellite System, a cellular network, a WiFi network, a wireless personal area network (WPAN) network, sensor measurements, or any combination thereof.

* * * * *